United States Patent
Patton et al.

(10) Patent No.: US 11,208,502 B2
(45) Date of Patent: Dec. 28, 2021

(54) CATALYST SYSTEM FOR MULTI-BLOCK COPLOYMER FORMATION

(71) Applicant: Dow Global Technologies LLC, Midland, MI (US)

(72) Inventors: Jasson T. Patton, Midland, MI (US); Todd D. Senecal, Midland, MI (US); Daniel J. Arriola, Midland, MI (US); Matthew D. Christianson, Midland, MI (US); Gordon R. Roof, Midland, MI (US); Jerzy Klosin, Midland, MI (US); David D. Devore, Midland, MI (US); Anna V. Davis, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 104 days.

(21) Appl. No.: 16/494,150

(22) PCT Filed: Mar. 15, 2018

(86) PCT No.: PCT/US2018/022579
§ 371 (c)(1),
(2) Date: Sep. 13, 2019

(87) PCT Pub. No.: WO2018/170227
PCT Pub. Date: Sep. 20, 2018

(65) Prior Publication Data
US 2020/0071428 A1 Mar. 5, 2020

Related U.S. Application Data

(60) Provisional application No. 62/471,543, filed on Mar. 15, 2017.

(51) Int. Cl.
*C08F 4/76* (2006.01)
*C08F 4/64* (2006.01)
*C08F 4/54* (2006.01)
*C08F 210/16* (2006.01)

(52) U.S. Cl.
CPC ............... *C08F 4/545* (2013.01); *C08F 4/76* (2013.01); *C08F 210/16* (2013.01); *C08F 4/64044* (2013.01); *C08F 4/64193* (2013.01); *C08F 2410/04* (2013.01)

(58) Field of Classification Search
CPC ...... C08F 4/52; C08F 4/64; C08F 4/76; C08F 4/64044; C08F 4/64193; B01J 31/26; B01J 31/28
See application file for complete search history.

(56) References Cited

U.S. PATENT DOCUMENTS

| 8,202,954 B2* | 6/2012 | Klosin | C07F 7/003 526/172 |
| 8,372,927 B2* | 2/2013 | Figueroa | C07F 7/00 526/172 |
| 8,389,655 B2* | 3/2013 | Arriola | C08F 297/08 526/113 |
| 8,981,028 B2* | 3/2015 | Hustad | B32B 27/08 526/348 |
| 2010/0048842 A1 | 2/2010 | Figueroa et al. | |
| 2014/0088276 A1* | 3/2014 | Hou | C08F 236/10 526/118 |

FOREIGN PATENT DOCUMENTS

| EP | 2436703 | 4/2012 |
| WO | 2005/090426 A1 | 9/2005 |
| WO | 2005/090427 | 9/2005 |
| WO | 2006101596 | 9/2006 |
| WO | 2014/105411 A1 | 7/2014 |

OTHER PUBLICATIONS

PCT/US2018/022579, International Search Report and Written Opinion dated Jun. 27, 2018.
PCT/US2018/022579, International Preliminary Report on Patentability dated Sep. 17, 2019.

* cited by examiner

*Primary Examiner* — Rip A Lee
(74) *Attorney, Agent, or Firm* — Cheney Huang

(57) ABSTRACT

The present disclosure relates to an olefin polymerization catalyst system for use in forming a multi-block copolymer, said copolymer containing therein two or more segments or blocks differing in chemical or physical properties, a polymerization process using the same, and the resulting polymers, wherein the composition comprises the admixture or reaction product resulting from combining: (A) a first olefin polymerization procatalyst, (B) a second olefin polymerization procatalyst capable of preparing polymers differing in chemical or physical properties from the polymer prepared by procatalyst (A) under equivalent polymerization conditions, and (C) a chain shuttling agent.

18 Claims, 3 Drawing Sheets

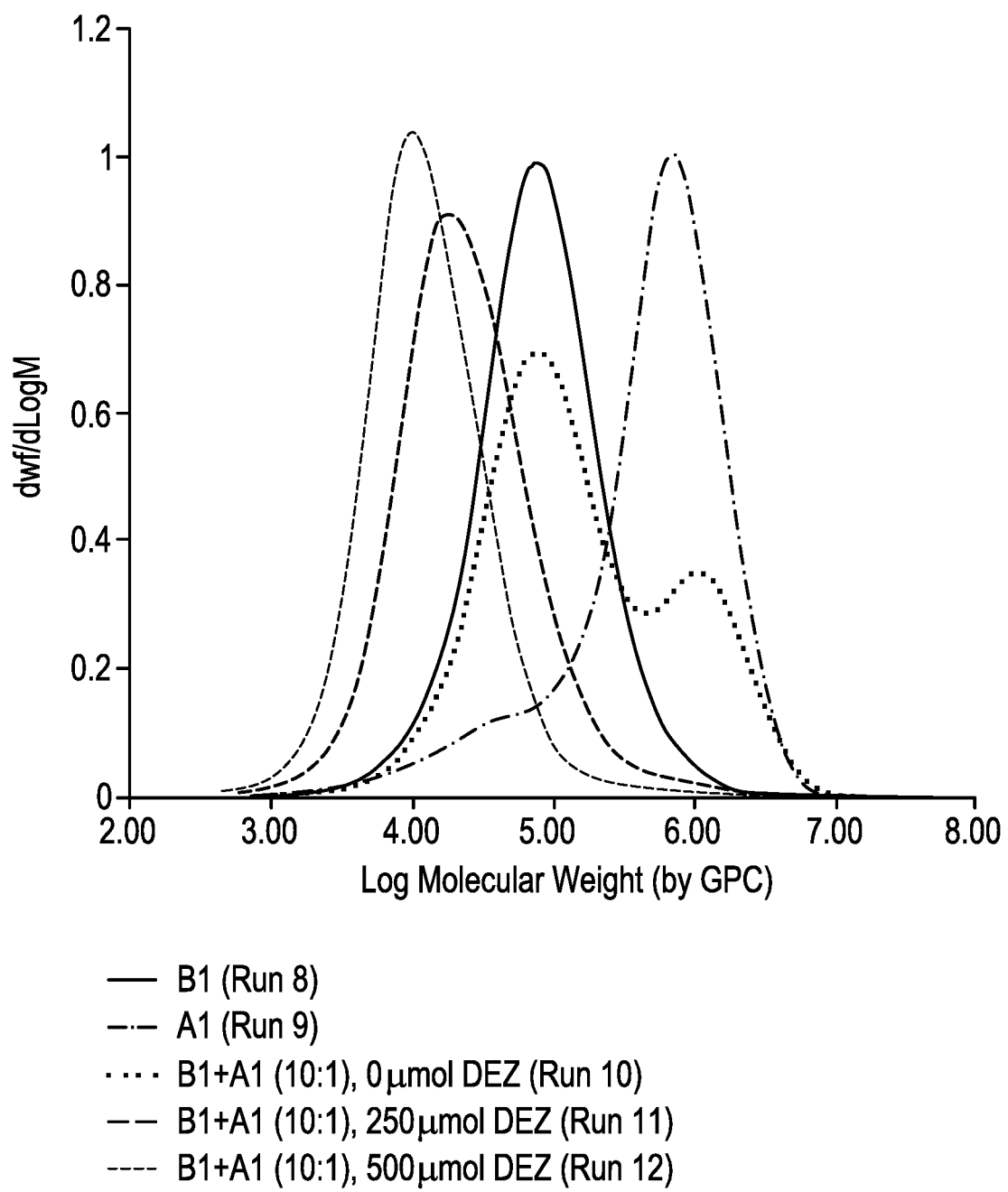

CATALYST SYSTEM FOR MULTI-BLOCK COPLOYMER FORMATION

CROSS-REFERENCE TO RELATED APPLICATIONS

This application claims the benefit of priority to U.S. Provisional Application No. 62/471,543, filed on Mar. 15, 2017, which is incorporated herein by reference in its entirety.

Embodiments relate to olefin polymerization catalysts, their manufacture, and the production of polyolefins using specific catalyst compositions, including the use of chain shuttling agents in the olefin polymerization process.

INTRODUCTION

The properties and applications of polyolefins depend to varying degrees upon the specific features of the catalysts used in their preparation. Specific catalyst compositions, activation conditions, steric and electronic features, and the like all can factor into the characteristics of the resulting polymer product. Indeed, a multitude of polymer features, such as co-monomer incorporation, molecular weight, polydispersity, long-chain branching, and the related physical properties (e.g., density, modulus, melt properties, tensile features, and optical properties), can all be affected by catalyst design.

In recent years, the use of well-defined molecular procatalysts generally has allowed enhanced control over polymer properties, including branching architecture, stereochemistry, and block copolymer construction. This latter aspect of polymer design, in which both "hard" (semicrystalline or high glass transition temperature) blocks and "soft" (low crystallinity or amorphous with low glass transition temperature) blocks are assembled in a polymer chain, has been especially challenging. Advances in block copolymer formation have been seen with the use of chain-shuttling agents (CSAs), which can exchange a growing polymer chain between different catalytic sites, such that portions of a single polymer molecule are synthesized by at least two different catalysts. In this manner, block copolymers can be prepared from a common monomer environment by using a mixture of catalysts of different selectivities, such as different stereoselectivities or monomer selectivities. Under the right conditions, efficient chain shuttling can produce a multi-block copolymer that features a random distribution of hard and soft blocks of random length.

Even with the advent of CSA and dual catalyst combinations in multi-block copolymer preparation processes, further improvements to said processes can be made. For example, novel catalysts that enable a wider range of processing conditions would be valuable for commercial production.

SUMMARY

In certain embodiments, the present disclosure relates to a composition comprising an admixture or reaction product resulting from combining:
(A) a first olefin polymerization procatalyst,
(B) a second olefin polymerization procatalyst, and
(C) a chain shuttling agent,
wherein the second olefin polymerization procatalyst comprises a metal-ligand complex of Formula (I):

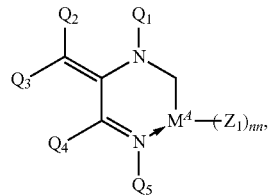

(I)

wherein:
each Z1 independently is $(C_1-C_{40})$hydrocarbon, $(C_1-C_{40})$heterohydrocarbon, $(C_1-C_{40})$hydrocarbyl, $(C_1-C_{40})$heterohydrocarbyl, $Si(R^{C1})_3$, $Ge(R^{C1})_3$, $P(R^{C1})_2$, $N(R^{C1})_2$, $OR^{C1}$, $SR^{C1}$, CN, $CF_3$, $R^{C1}S(O)$—, $R^{C1}S(O)_2$—, $(R^{C1})_2C=N$—, $R^{C1}C(O)O$—, $R^{C1}OC(O)$—, $R^{C1}C(O)N(R)$—, $(R^{C1})_2NC(O)$—, halogen atom, or hydrogen atom;

each $R^{C1}$ independently is $(C_1-C_{30})$hydrocarbyl or $(C_1-C_{30})$heterohydrocarbyl;

each $M^4$ independently is a metal of any one of Groups 3 to 6 or Groups 7 to 9 of a Periodic Table of the Elements, the metal being in a formal oxidation state of +2, +3, +4, +5, or +6;

nn is an integer of 1 or 2;

each $Q^1$ independently is hydrogen, $(C_1-C_{40})$hydrocarbyl, or $(C_1-C_{40})$heterohydrocarbyl;

each of $Q^2$, $Q^3$, and $Q^4$ independently is hydrogen, $(C_1-C_{40})$hydrocarbyl, $(C_1-C_{40})$hydrocarbylO—, $(C_1-C_{40})$hydrocarbylS—, $(C_1-C_{40})$hydrocarbylS(O)—, $(C_1-C_{40})$hydrocarbylS(O)_2$—, $((C_1-C_{40})$hydrocarbyl$)_2$N—, $((C_1-C_{40})$hydrocarbyl$)_2$P—, or $(C_1-C_{40})$heterohydrocarbyl;

each $Q^5$ independently is $(C_1-C_{40})$hydrocarbyl or $(C_1-C_{40})$heterohydrocarbyl;

wherein $Q^1$ and $Q^2$, $Q^2$ and $Q^3$, $Q^3$ and $Q^4$, and $Q^4$ and $Q^5$ optionally are taken together to form a $(C_1-C_{40})$hydrocarbylene or $(C_1-C_{40})$heterohydrocarbylene, or any three or four of $Q^1$ to $Q^5$ optionally are taken together to form a respective trivalent or tetravalent analog of $(C_1-C_{40})$hydrocarbylene or $(C_1-C_{40})$heterohydrocarbylene, and the remainder of QI to $Q^5$, are as defined above;

each of the hydrocarbyl, heterohydrocarbyl, $Si(R^{C1})_3$, $Ge(R^{C1})_3$, $P(R^{C1})_2$, $N(R^{C1})_2$, $OR^{C1}$, $SR^{C1}$, $R^{C1}S(O)$—, $R^{C1}S(O)_2$—, $(R^{C1})_2C=N$—, $R^{C1}C(O)O$—, $R^{C1}OC(O)$—, $R^{C1}C(O)N(R)$—, $(R^{C1})_2NC(O)$—, hydrocarbylene, and heterohydrocarbylene groups independently is unsubstituted or substituted with one or more $R^S$ substituents; and each $R^S$ independently is a halogen atom, polyfluoro substitution, perfluoro substitution, unsubstituted $(C_1-C_{18})$alkyl, $F_3C$—, $FCH_2O$—, $F_2HCO$—, $F_3CO$—, oxo (i.e., =O), $R_3Si$—, $R_3Ge$—, RO—, RS—, RS(O)—, $RS(O)_2$—, $R_2P$—, $R_2N$—, $R_2C=N$—, NC—, RC(O)O—, ROC(O)—, RC(O)N(R)—, or $R_2NC(O)$—, or two of the $R^S$ are taken together to form an unsubstituted $(C_1-C_{18})$alkylene, wherein each R independently is an unsubstituted $(C_1-C_{18})$alkyl; and optionally, $R^{C1}$ or $R^S$ may have an additional interaction with $M^4$.

In certain embodiments, the present disclosure relates to a composition for use in the polymerization of at least one addition polymerizable monomer to form a multi-block (segmented) copolymer, said copolymer containing therein two or more blocks or segments differing in one or more chemical or physical properties, the composition comprising an admixture or reaction product resulting from combining:
(A) a first olefin polymerization procatalyst,
(B) a second olefin polymerization procatalyst, and
(C) a chain shuttling agent, wherein the second olefin polymerization procatalyst comprises a metal-ligand complex of Formula (I).

In certain embodiments, the present disclosure relates to a composition for use in the polymerization of ethylene and at least one copolymerizable comonomer other than ethylene to form a multi-block (segmented) copolymer, said copolymer containing therein two or more blocks or segments differing in one or more chemical or physical properties, the composition comprising an admixture or reaction product resulting from combining:
  (A) a first olefin polymerization procatalyst,
  (B) a second olefin polymerization procatalyst, and
  (C) a chain shuttling agent,
wherein the second olefin polymerization procatalyst comprises a metal-ligand complex of Formula (I).

In certain embodiments, the present disclosure relates to an olefin polymerization catalyst system comprising:
  (A) a first olefin polymerization procatalyst,
  (B) a second olefin polymerization procatalyst, and
  (C) a chain shuttling agent,
wherein the second olefin polymerization procatalyst comprises a metal-ligand complex of Formula (I).

In further embodiments, the present disclosure relates to a process for preparing a multi-block (segmented) copolymer, said process comprising contacting one or more addition polymerizable monomers under addition polymerizable conditions with a composition comprising an admixture or reaction product resulting from combining:
  (A) a first olefin polymerization procatalyst,
  (B) a second olefin polymerization procatalyst, and
  (C) a chain shuttling agent,
wherein the second olefin polymerization procatalyst comprises a metal-ligand complex of Formula (I).

In further embodiments, the present disclosure relates to a process for preparing a multi-block (segmented) copolymer comprising ethylene and at least one copolymerizable comonomer other than ethylene, said process comprising contacting ethylene and one or more addition polymerizable monomers other than ethylene under addition polymerizable conditions with a composition comprising an admixture or reaction product resulting from combining:
  (A) a first olefin polymerization procatalyst,
  (B) a second olefin polymerization procatalyst, and
  (C) a chain shuttling agent,
wherein the second olefin polymerization procatalyst comprises a metal-ligand complex of Formula (I).

In further embodiments, the present disclosure relates to a process for preparing a multi-block (segmented) copolymer, said process comprising contacting one or more addition polymerizable monomers under addition polymerizable conditions with an olefin polymerization catalyst system comprising:
  (A) a first olefin polymerization procatalyst,
  (B) a second olefin polymerization procatalyst, and
  (C) a chain shuttling agent,
wherein the second olefin polymerization procatalyst comprises a metal-ligand complex of Formula (I).

In further embodiments, the present disclosure relates to a process for preparing a multi-block (segmented) copolymer comprising ethylene and at least one copolymerizable comonomer other than ethylene, said process comprising contacting ethylene and one or more addition polymerizable monomers other than ethylene under addition polymerizable conditions with an olefin polymerization catalyst system comprising:
  (A) a first olefin polymerization procatalyst,
  (B) a second olefin polymerization procatalyst, and
  (C) a chain shuttling agent,
wherein the second olefin polymerization procatalyst comprises a metal-ligand complex of Formula (I).

In certain embodiments, the foregoing processes take the form of continuous solution processes for forming block copolymers, such as multi-block copolymers (preferably linear multi-block copolymers of two or more monomers, especially ethylene and a $C_{3-20}$ olefin or cycloolefin, and most especially ethylene and a $C_{3-20}$ α-olefin), using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers according to the present disclosure, are formed in high efficiency.

In another embodiment of the present disclosure, there is provided a segmented copolymer (multi-block copolymer), especially a copolymer comprising ethylene in polymerized form, said copolymer containing therein two or more (preferably three or more) segments differing in comonomer content or density or other chemical or physical properties. The copolymer preferably possesses a molecular weight distribution, Mw/Mn, of equal to or less than 10.0 (e.g., equal to or less than 9.0, equal to or less than 8.0, equal to or less than 7.0, equal to or less than 6.0, equal to or less than 5.0, equal to or less than 4.0, equal to or less than 3.0, equal to or less than 2.8, etc.). Most preferably, the polymers of the present disclosure are ethylene multi-block copolymers.

In yet another embodiment of the present disclosure, there are provided functionalized derivatives of the foregoing segmented or multi-block copolymers.

BRIEF DESCRIPTION OF THE DRAWINGS

FIGS. 2 and 3 provide GPC traces for certain examples of the present disclosure.

DETAILED DESCRIPTION

Definitions

Figure 1:
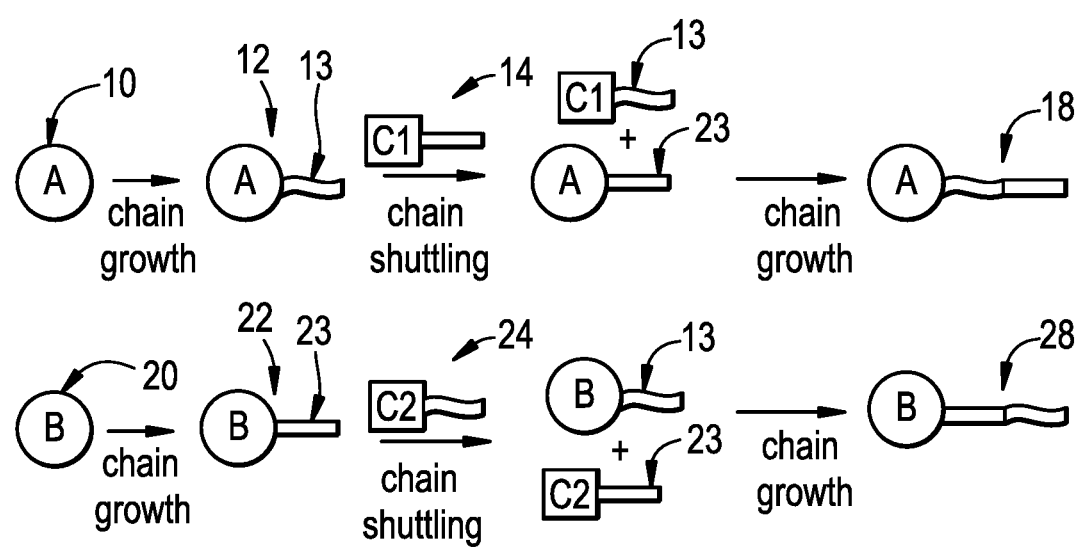
FIG. 1 exemplifies the chain shuttling process that occurs in the polymerization processes of the present disclosure.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference in its entirety), especially with respect to the disclosure of synthetic techniques, product and processing designs, polymers, catalysts, definitions (to the extent not inconsistent with any definitions specifically provided in this disclosure), and general knowledge in the art.

Number ranges in this disclosure and as they relate to the compositions disclosed herein are approximate, and thus may include values outside of the range unless otherwise indicated. Number ranges include all values from and including the lower and the upper values and include fractional numbers or decimals.

The terms "chain shuttling agent" and "chain transfer agent" refer to those known to one of ordinary skill in the art. Specifically, the term "shuttling agent" or "chain shuttling agent" refers to a compound or mixture of compounds that is capable of causing polymeryl transfer between various active catalyst sites under conditions of polymerization. That is, transfer of a polymer fragment occurs both to and from an active catalyst site in a facile and reversible manner. In contrast to a shuttling agent or chain shuttling agent, an agent that acts merely as a "chain transfer agent," such as some main-group alkyl compounds, may exchange, for example, an alkyl group on the chain transfer agent with the growing polymer chain on the catalyst, which generally results in termination of the polymer chain growth. In this event, the main-group center may act as a repository for a dead polymer chain, rather than engaging in reversible transfer with a catalyst site in the manner in which a chain shuttling agent does. Desirably, the intermediate formed between the chain shuttling agent and the polymeryl chain is not sufficiently stable relative to exchange between this intermediate and any other growing polymeryl chain, such that chain termination is relatively rare.

The term "procatalyst" or "catalyst precursor" used herein refers to a transition metal species that, once combined with an activator co-catalyst, is capable of polymerization of unsaturated monomers. For example, $Cp_2Zr(CH_3)_2$ is a catalyst precursor, which, when combined with an activating cocatalyst, becomes the active catalyst species "$Cp_2Zr(CH_3)$" which is capable of polymerization of unsaturated monomers. For the sake of simplicity, the terms "procatalysts," "transition metal catalysts," "transition metal catalyst precursors," "catalysts," "catalyst precursors," "polymerization catalysts or catalyst precursors," "metal complexes," "complexes," "metal-ligand complexes" and like terms are meant to be interchangeable in the present disclosure. Catalysts or procatalysts include those known in the art and those disclosed in WO 2005/090426, WO 2005/090427, WO 2007/035485, WO 2009/012215, WO 2014/105411, U.S. Patent Publication Nos. 2006/0199930, 2007/0167578, 2008/0311812, and U.S. Pat. Nos. 7,355,089 B2, 8,058,373 B2, and 8,785,554 B2, all of which are incorporated herein by reference in their entirety.

"Co-catalyst" or "activator" refer to those known in the art, e.g., those disclosed in WO 2005/090427 and U.S. Pat. No. 8,501,885 B2, that can activate a procatalyst by combining with or contacting the procatalyst to form an active catalyst composition.

The terms "addition polymerizable conditions," "polymerization conditions," and like terms refer to conditions known to one of ordinary skill in the art for polymerization of unsaturated monomers.

"Polymer" refers to a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc. "Interpolymer" and "copolymer" refer to a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc. The term "polyethylene" includes homopolymers of ethylene and copolymers of ethylene and one or more $C_{3-8}$ α-olefins in which ethylene comprises at least 50 mole percent. The term "crystalline," if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The terms "olefin block copolymer (OBC)," "block copolymer," "multi-block copolymer," and "segmented copolymer" refer to a polymer comprising two or more chemically distinct regions or segments (referred to as "blocks") preferably joined in a linear manner, that is, a polymer comprising chemically differentiated units which are joined (covalently bonded) end-to-end with respect to polymerized functionality, rather than in pendent or grafted fashion. The blocks may differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. For example, the olefin block copolymer may contain "hard blocks" (semicrystalline or high glass transition temperature) having lower comonomer content and "soft blocks" (low crystallinity or amorphous with low glass transition temperature) having higher comonomer content. Compared to block copolymers of the prior art, including copolymers produced by sequential monomer addition, fluxional catalysts, or anionic polymerization techniques, the block copolymers of the present disclosure are characterized by unique distributions of polymer polydispersity (PDI or Mw/Mn), block length distribution, and/or block number distribution, due, in a preferred embodiment, to the effect of the shuttling agent(s) in combination with catalysts. More specifically, when produced in a continuous process, the block copolymers desirably possess PDI from 1.0 to 10.0 (e.g., from 1.0 to 9.0, from 1.0 to 8.0, from 1.0 to 7.0, from 1.0 to 6.0, from 1.0 to 5.0, from 1.0 to 4.0, from 1.0 to 3.5, from 1.0 to 3.0, from 1.7 to 2.9, from 1.8 to 2.5, from 1.8 to 2.2, and/or from 1.8 to 2.1). When produced in a batch or semi-batch process, the block polymers desirably possess PDI from 1.0 to 10.0 (e.g., from 1.0 to 9.0, from 1.0 to 8.0, from 1.0 to 7.0, from 1.0 to 6.0, from 1.0 to 5.0, from 1.0 to 4.0, from 1.0 to 3.5, from 1.0 to 3.0, from 1.7 to 2.9, from 1.8 to 2.5, from 1.8 to 2.2, and/or from 1.8 to 2.1).

The term "ethylene multi-block copolymer" means a multi-block copolymer comprising ethylene and one or more copolymerizable comonomers, wherein ethylene comprises a plurality of the polymerized monomer units of at least one block or segment in the polymer, preferably at least 90 mole percent, more preferably at least 95 mole percent, and most preferably at least 98 mole percent of said block. Based on total polymer weight, the ethylene multi-block copolymers of the present disclosure preferably have an ethylene content from 25 to 97 weight percent, more preferably from 40 to 96 weight percent, even more preferably from 55 to 95 percent weight, and most preferably from 65 to 85 weight percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents.

In a preferred embodiment, the quantity of extractable polymer using either a dialkyl ether- or an alkane-solvent is less than 10 percent, preferably less than 7 percent, more preferably less than 5 percent and most preferably less than 2 percent of the total polymer weight.

In addition, the multi-block copolymers of the present disclosure desirably possess a PDI fitting a Schulz-Flory distribution rather than a Poisson distribution. The use of the present polymerization process results in a product having both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57(6), pp. 6902-6912, and Dobrynin, *J. Chem. Phys.* (1997) 107(21), pp. 9234-9238.

In a further embodiment, the polymers of the present disclosure, especially those made in a continuous, solution polymerization reactor, possess a most probable distribution of block lengths. Exemplary copolymers according to the present disclosure are multi-block copolymers containing 4 or more blocks or segments including terminal blocks.

The following mathematical treatment of the resulting polymers is based on theoretically derived parameters that are believed to apply to the presently disclosed polymers and demonstrate that, especially in a steady-state, continuous, well-mixed reactor, the block lengths of the resulting polymer prepared using 2 or more catalysts will each conform to a most probable distribution, derived in the following manner, wherein pi is the probability of propagation with respect to block sequences from catalyst i. The theoretical treatment is based on standard assumptions and methods known in the art and used in predicting the effects of polymerization kinetics on molecular architecture, including the use of mass action reaction rate expressions that are not affected by chain or block lengths. Such methods have been previously disclosed in W. H. Ray, *J. Macromol. Sci., Rev. Macromol. Chem.*, C8, 1 (1972) and A. E. Hamielec and J. F. MacGregor, "Polymer Reaction Engineering", K. H. Reichert and W. Geisler, Eds., Hanser, Munich, 1983. In addition, it is assumed that adjacent sequences formed by the same catalyst form a single block. For catalyst i, the fraction of sequences of length n is given by $X_i[n]$, where n is an integer from 1 to infinity representing the number of monomer units in the block.

$$X_i[n] = (1-p_i)p_i^{(n-1)} \quad \text{most probable distribution of block lengths}$$

$$N_i = \frac{1}{1-p_i} \quad \text{number average block length}$$

Each catalyst has a probability of propagation (pi) and forms a polymer segment having a unique average block length and distribution. In a most preferred embodiment, the probability of propagation is defined as:

$$p_i = \frac{Rp[i]}{Rp[i] + Rt[i] + Rs[i] + [C_i]}$$

for each catalyst i={1, 2, . . . }, where,

Rp[i]=Rate of monomer consumption by catalyst i, (moles/L),

Rt[i]=Total rate of chain transfer and termination for catalyst i, (moles/L),

Rs[i]=Rate of chain shuttling with dormant polymer to other catalysts, (moles/L), and $[C_i]$=Concentration of catalyst i (moles/L).

Dormant polymer chains refers to polymer chains that are attached to a CSA. The overall monomer consumption or polymer propagation rate, Rp[i], is defined using an apparent rate constant, $\overline{k_{pi}}$, multiplied by a total monomer concentration, [M], as follows:

$$Rp[i] = \theta \overline{k_{pi}}[M][C_i].$$

The total chain transfer rate is given below including values for chain transfer to hydrogen ($H_2$), beta hydride elimination, and chain transfer to chain shuttling agent (CSA). The reactor residence time is given by θ and each subscripted k value is a rate constant.

$$Rt[i] = \theta k_{H2i}[H_2][C_i] + \theta k_{\beta i}[C_i] + \theta k_{ai}[CSA][C_i]$$

For a dual catalyst system, the rate of chain shuttling of polymer between catalysts 1 and 2 is given as follows:

$$Rs[1] = Rs[2] = \theta k_{a1}[CSA]\theta k_{a2}[C_1][C_2].$$

If more than 2 catalysts are employed, then added terms and complexity in the theoretical relation for Rs[i] result, but the ultimate conclusion that the resulting block length distributions are most probable is unaffected.

As used herein with respect to a chemical compound, unless specifically indicated otherwise, the singular includes all isomeric forms and vice versa (for example, "hexane," includes all isomers of hexane individually or collectively). The terms "compound" and "complex" are used interchangeably herein to refer to organic-, inorganic- and organometal compounds. The term "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge.

The term "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The terms "heteroatom containing hydrocarbyl" or "heterohydrocarbyl" refer to univalent groups in which at least one atom other than hydrogen or carbon is present along with one or more carbon atom and one or more hydrogen atoms. The term "heterocarbyl" refers to groups containing one or more carbon atoms and one or more heteroatoms and no hydrogen atoms. The bond between the carbon atom and any heteroatom, as well as the bonds between any two heteroatoms, may be a single or multiple covalent bond or a coordinating or other donative bond. Thus, an alkyl group substituted with a heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylseleno-group is within the scope of the term heteroalkyl. Examples of suitable heteroalkyl groups include cyanomethyl-, benzoylmethyl-, (2-pyridyl)methyl-, and trifluoromethyl-groups.

As used herein, the term "aromatic" refers to a polyatomic, cyclic, conjugated ring system containing $(4\delta+2)$ $\pi$-electrons, wherein $\delta$ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (e.g., $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone or oxygen as in diphenylether or nitrogen in diphenylamine.

For copolymers produced by a given catalyst, the relative amounts of comonomer and monomer in the copolymer and hence the copolymer composition is determined by relative rates of reaction of comonomer and monomer. Mathematically the molar ratio of comonomer to monomer is given by $$\frac{F_2}{F_1} = \left(\frac{[\text{comonomer}]}{[\text{monomer}]}\right)_{polymer} = \frac{R_{p2}}{R_{p1}} \qquad (1)$$

Here $R_{p2}$ and $R_{p1}$ are the rates of polymerization of comonomer and monomer respectively and $F_2$ and $F_1$ are the mole fractions of each in the copolymer. Because $F_2 + F_1 = 1$ we can rearrange this equation to $$F_2 = \frac{R_{p2}}{R_{p1} + R_{p2}} \qquad (2)$$

The individual rates of polymerization of comonomer and monomer are typically complex functions of temperature, catalyst, and monomer/comonomer concentrations. In the limit as comonomer concentration in the reaction media drops to zero, $R_{p2}$ drops to zero, $F_2$ becomes zero and the polymer consists of pure monomer. In the limiting case of no monomer in the reactor, $R_{p1}$ becomes zero and $F_2$ is one (provided the comonomer can polymerize alone).

For most homogeneous catalysts, the ratio of comonomer to monomer in the reactor largely determines polymer composition as determined according to either the Terminal Copolymerization Model or the Penultimate Copolymerization Model.

For random copolymers in which the identity of the last monomer inserted dictates the rate at which subsequent monomers insert, the terminal copolymerization model is employed. In this model, insertion reactions of the type $$\ldots M_i C^* + M_j \xrightarrow{k_{ij}} \ldots M_i M_j C^* \qquad (3)$$

Where $C^*$ represents the catalyst, $M_i$ represents monomer i, and $k_{ij}$ is the rate constant having the rate equation $$R_{p_{ij}} = k_{ij}[\ldots M_i C^*][M_j] \qquad (4)$$

The comonomer mole fraction (i=2) in the reaction media is defined by the equation:

$$f_2 = \frac{[M_2]}{[M_1] + [M_2]} \qquad (5)$$

A simplified equation for comonomer composition can be derived as disclosed in George Odian, *Principles of Polymerization*, Second Edition, John Wiley and Sons, 1970, as follows:

$$F_2 = \frac{r_1(1-f_2)^2 + (1-f_2)f_2}{r_1(1-f_2)^2 + 2(1-f_2)f_2 + r_2 f_2^2}. \qquad (6)$$

From this equation, the mole fraction of comonomer in the polymer is solely dependent on the mole fraction of comonomer in the reaction media and two temperature dependent reactivity ratios defined in terms of the insertion rate constants as:

$$r_1 = \frac{k_{11}}{k_{12}} \quad r_2 = \frac{k_{22}}{k_{21}}. \qquad (7)$$

Alternatively, in the penultimate copolymerization model, the identities of the last two monomers inserted in the growing polymer chain dictate the rate of subsequent monomer insertion. The polymerization reactions are of the form $$(8)$$

$$\ldots M_i M_j C^* + M_k \xrightarrow{k_{ijk}} \ldots M_i M_j M_k C^*$$

and the individual rate equations are:

$$R_{p_{ijk}} = k_{ijk}[\ldots M_i M_j = C^*][M_k] \qquad (9).$$

The comonomer content can be calculated (again as disclosed in George Odian, Supra.) as:

$$\frac{(1-F_2)}{F_2} = \frac{1 + \dfrac{r_1' X (r_1 X + 1)}{(r_1' X + 1)}}{1 + \dfrac{r_2'(r_2 + X)}{X(r_2' + X)}} \qquad (10)$$

where X is defined as:

$$X = \frac{(1-f_2)}{f_2} \qquad (11)$$

and the reactivity ratios are defined as:

$$r_1 = \frac{k_{111}}{k_{112}} \quad r_1' = \frac{k_{211}}{k_{212}} \qquad (12)$$

-continued $$r_2 = \frac{k_{222}}{k_{221}} \quad r'_2 = \frac{k_{122}}{k_{121}}.$$

For this model as well, the polymer composition is a function only of temperature dependent reactivity ratios and comonomer mole fraction in the reactor. The same is also true when reverse comonomer or monomer insertion may occur or in the case of the interpolymerization of more than two monomers.

Reactivity ratios for use in the foregoing models may be predicted using well known theoretical techniques or empirically derived from actual polymerization data. Suitable theoretical techniques are disclosed, for example, in B. G. Kyle, *Chemical and Process Thermodynamics*, Third Addition, Prentice-Hall, 1999 and in Redlich-Kwong-Soave (RKS) Equation of State, *Chemical Engineering Science*, 1972, pp. 1197-1203. Commercially available software programs may be used to assist in deriving reactivity ratios from experimentally derived data. One example of such software is Aspen Plus from Aspen Technology, Inc., Ten Canal Park, Cambridge, Mass. 02141-2201 USA.

Based on the foregoing theoretical considerations, the present disclosure may alternatively be related to a composition or catalyst system for use in the polymerization of two or more addition polymerizable monomers, especially ethylene and at least one copolymerizable comonomer, to form a high molecular weight, segmented copolymer (multi-block copolymer), said copolymer containing therein two or more (preferably three or more) segments or blocks differing in one or more chemical or physical properties as further disclosed herein, the catalyst system or composition comprising the admixture or reaction product resulting from combining:

(A) a first olefin polymerization procatalyst,
(B) a second olefin polymerization procatalyst capable of preparing polymers differing in chemical or physical properties from the polymer prepared by the first olefin polymerization procatalyst (A) under equivalent polymerization conditions, and
(C) a chain shuttling agent;
wherein the:
$r_1$ of the first olefin polymerization procatalyst ($r_{1A}$), and
$r_1$ of the second olefin polymerization procatalyst ($r_{1B}$),
are selected such that the ratio of the reactivity ratios ($r_{1A}/r_{1B}$) under the polymerization conditions is 0.5 or less (e.g., 0.25 or less, 0.125 or less, 0.08 or less, 0.04 or less).

Additionally, there is now provided a process, preferably a solution process (and most preferably a continuous solution process), for use in the polymerization of two or more addition polymerizable monomers (especially ethylene and at least one copolymerizable comonomer) to form a high molecular weight, segmented copolymer (multi-block copolymer), said copolymer containing therein two or more (preferably three or more) segments or blocks differing in one or more chemical or physical properties as further disclosed herein, the process comprising the steps of combining two or more addition polymerizable monomers (especially ethylene and at least one copolymerizable comonomer) under polymerization conditions with the catalyst system or composition comprising the admixture or reaction product resulting from combining:

(A) a first olefin polymerization procatalyst,
(B) a second olefin polymerization procatalyst capable of preparing polymers differing in chemical or physical properties from the polymer prepared by the first olefin polymerization procatalyst (A) under equivalent polymerization conditions, and
(C) a chain shuttling agent; and
wherein the:
$r_1$ of the first olefin polymerization procatalyst ($r_{1A}$), and
$r_1$ of the second olefin polymerization procatalyst ($r_{1B}$),
are selected such that the ratio of the reactivity ratios ($r_{1A}/r_{1B}$) under the polymerization conditions is 0.5 or less (e.g., 0.25 or less, 0.125 or less, 0.08 or less, 0.04 or less).

Further, there is now provided a composition or catalyst system for use in the polymerization of two or more addition polymerizable monomers (referred to as monomer and comonomer(s) respectively), especially ethylene and at least one copolymerizable comonomer, to form a high molecular weight, segmented copolymer (multi-block copolymer), said copolymer containing therein two or more (preferably three or more) segments or blocks differing in one or more chemical or physical properties as further disclosed herein, the catalyst system or composition comprising the admixture or reaction product resulting from combining:

(A) a first olefin polymerization procatalyst,
(B) a second olefin polymerization procatalyst capable of preparing polymers differing in chemical or physical properties from the polymer prepared by the first olefin polymerization procatalyst (A) under equivalent polymerization conditions, and
(C) a chain shuttling agent; wherein:
the comonomer content in mole percent of the copolymer resulting from the first olefin polymerization procatalyst ($F_1$), and
the comonomer content in mole percent of the copolymer resulting from the second olefin polymerization procatalyst ($F_2$),
are selected such that the ratio ($F_1/F_2$) under the polymerization conditions is 2 or more (e.g., 4 or more, 10 or more, 15 or more, and 20 or more).

Additionally, there is now provided a process, preferably a solution process (more preferably a continuous solution process), for use in the polymerization of two or more addition polymerizable monomers (referred to as monomer and comonomer(s) respectively), especially ethylene and at least one copolymerizable comonomer, to form a high molecular weight, segmented copolymer (multi-block copolymer), said copolymer containing therein two or more (preferably three or more) segments or blocks differing in one or more chemical or physical properties as further disclosed herein, the process comprising the steps of combining under polymerization conditions:

(A) a first olefin polymerization procatalyst,
(B) a second olefin polymerization procatalyst capable of preparing polymers differing in chemical or physical properties from the polymer prepared by the first olefin polymerization procatalyst (A) under equivalent polymerization conditions, and
(C) a chain shuttling agent; wherein:
the comonomer content in mole percent of the copolymer resulting from the first olefin polymerization procatalyst ($F_1$), and
the comonomer content in mole percent of the copolymer resulting from the second olefin polymerization procatalyst ($F_2$),
are selected such that the ratio ($F_1/F_2$) under the polymerization conditions is 2 or more (e.g., 4 or more, 10 or more, 15 or more, and 20 or more, and recovering the polymer product.

Monomers

Suitable monomers for use in preparing the olefin block copolymers or multi-block copolymers of the present disclosure include ethylene and one or more addition polymerizable monomers (i.e., comonomers) other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl, 4,8-decatriene; aromatic vinyl compounds such as mono or poly alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene, a-methylstyrene, vinylchloride, 1,2-difluoroethylene, 1,2-dichloroethylene, tetrafluoroethylene, and 3,3,3-trifluoro-1-propene.

Chain Shuttling Agents (CSA's)

The term "shuttling agent" refers to a compound or mixture of compounds employed in the composition/catalyst system/process of the present disclosure that is capable of causing polymeryl exchange between at least two active catalyst sites of the catalysts included in the composition/catalyst system/process under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. Preferably, the shuttling agent has an activity ratio $R_{A-B}/R_{B-A}$ of from 0.01 and 100, more preferably from 0.1 to 10, most preferably from 0.5 to 2.0, and most highly preferably from 0.8 to 1.2, wherein $R_{A-B}$ is the rate of polymeryl transfer from catalyst A active site to catalyst B active site via the shuttling agent, and $R_{B-A}$ is the rate of reverse polymeryl transfer, i.e., the rate of exchange starting from the catalyst B active site to catalyst A active site via the shuttling agent. Desirably, the intermediate formed between the shuttling agent and the polymeryl chain is sufficiently stable such that chain termination is relatively rare. Desirably, less than 90 percent, preferably less than 75 percent, more preferably less than 50 percent and most desirably less than 10 percent of shuttle-polymeryl products are terminated prior to attaining 3 distinguishable polymer segments or blocks. Ideally, the rate of chain shuttling (defined by the time required to transfer a polymer chain from a catalyst site to the chain shuttling agent and then back to a catalyst site) is similar to or faster than the rate of polymer termination, even up to 10 or even 100 times faster than the rate of polymer termination. This permits polymer block formation on the same time scale as polymer propagation.

Suitable chain shuttling agents for use herein include Group 1, 2, 12 or 13 metal compounds or complexes containing at least one $C_{1-20}$ hydrocarbyl group, preferably hydrocarbyl substituted magnesium, aluminum, gallium or zinc compounds containing from 1 to 12 carbons in each hydrocarbyl group, and reaction products thereof with a proton source. Preferred hydrocarbyl groups are alkyl groups, preferably linear or branched, $C_{2-8}$ alkyl groups. Most preferred shuttling agents for use in the present invention are trialkyl aluminum and dialkyl zinc compounds, especially triethylaluminum, tri(i-propyl) aluminum, tri(i-butyl)aluminum, tri(n-hexyl)aluminum, tri(n-octyl)aluminum, triethylgallium, or diethylzinc. Additional suitable shuttling agents include the reaction product or mixture formed by combining the foregoing organometal compounds, preferably a tri($C_{1-8}$) alkyl aluminum or di($C_{1-8}$) alkyl zinc compound, especially triethylaluminum, tri(i-propyl) aluminum, tri(i-butyl)aluminum, tri(n-hexyl)aluminum, tri(n-octyl)aluminum, or diethylzinc, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl)amine, 2,6-di (t-butyl)phenol, ethyl(1-naphthyl)amine, bis(2,3,6,7-dibenzo-1-azacycloheptaneamine), or 2,6-diphenylphenol. Sufficient amine or hydroxyl reagent is used such that one hydrocarbyl group remains per metal atom. The primary reaction products of the foregoing combinations most useful in the present disclosure as shuttling agents are n-octylaluminum di(bis(trimethylsilyl)amide), i-propylaluminum bis (dimethyl(t-butyl)siloxide), and n-octylaluminum di(pyridinyl-2-methoxide), i-butylaluminum bis(dimethyl(t-butyl) siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl) amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

In further embodiments of the present disclosure, suitable chain shuttling agents include metal alkyls containing a divalent metal (e.g., Zn), a trivalent metal (e.g., Al), or a mixture of divalent metal and trivalent metal. In certain embodiments, the chain shuttling agent is a divalent metal alkyl, such as dialkylzinc. In certain embodiments, the chain shuttling agent is a trivalent metal alkyl, such as trialkyl-aluminum. In certain embodiments, the organometallic compound is a mixture of divalent metal alkyl (e.g., dialkylzinc) and trivalent metal alkyl (e.g., trialkylaluminum). In certain embodiments, the chain shuttling agent is a mixture of trivalent metal and divalent metal at a trivalent/divalent metal ratio from 99:1 to 1:99 (e.g., from 95:5 to 50:50, from 90:10 to 80:20, from 90:10 to 70:30, etc.). In certain embodiments, the chain shuttling agent is a metal alkyl containing a mixture of aluminum and zinc metals at an aluminum/zinc ratio from 99:1 to 1:99 (e.g., from 95:5 to 50:50, from 90:10 to 80:20, from 90:10 to 70:30, etc.).

It will be appreciated by the skilled artisan that a suitable shuttling agent for one catalyst or catalyst combination may not necessarily be as good or even satisfactory for use with a different catalyst or catalyst combination. Some potential shuttling agents may adversely affect the performance of one or more catalysts and may be undesirable for use for that reason as well. Accordingly, the activity of the chain shuttling agent desirably is balanced with the catalytic activity of the catalysts to achieve the desired polymer properties. In some embodiments of the present disclosure, best results may be obtained by use of shuttling agents having a chain shuttling activity (as measured by a rate of chain transfer) that is less than the maximum possible rate.

Generally however, preferred shuttling agents possess the highest rates of polymer transfer as well as the highest transfer efficiencies (reduced incidences of chain termination). Such shuttling agents may be used in reduced concentrations and still achieve the desired degree of shuttling. In addition, such shuttling agents result in production of the shortest possible polymer block lengths. Highly desirably, chain shuttling agents with a single exchange site are employed due to the fact that the effective molecular weight of the polymer in the reactor is lowered, thereby reducing viscosity of the reaction mixture and consequently reducing operating costs.

First Olefin Polymerization Procatalyst (A)

Suitable procatalysts that would fall within the scope of the first olefin polymerization procatalyst (A) of the present disclosure include the catalysts/complexes discussed below that are adapted for preparing polymers of the desired composition or type and capable of reversible chain transfer with a chain shuttling agent. As noted above, the terms "procatalysts," "catalysts," "metal complexes," and "complexes" used herein are to be interchangeable. In certain embodiments, the first olefin polymerization procatalyst (A) is the soft block/segment catalyst (i.e., high comonomer incorporator) of the olefin block copolymers of the present disclosure.

Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. Preferably, the catalysts for use herein are homogeneous catalysts comprising a relatively pure organometallic compound or metal complex, especially compounds or complexes based on metals selected from Groups 3-15 or the Lanthanide series of the Periodic Table of the Elements.

Metal complexes for use herein may be selected from Groups 3 to 15 of the Periodic Table of the Elements containing one or more delocalized, π-bonded ligands or polyvalent Lewis base ligands. Examples include metallocene, half-metallocene, constrained geometry, and polyvalent pyridylamine, or other polychelating base complexes. The complexes are generically depicted by the formula: $MK_kX_xZ_z$, or a dimer thereof, wherein M is a metal selected from Groups 3-15, preferably 3-10, more preferably 4-10, and most preferably Group 4 of the Periodic Table of the Elements;

K independently at each occurrence is a group containing delocalized π-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently at each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto; or two X groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state;

Z independently at each occurrence is a neutral, Lewis base donor ligand of up to 50 non-hydrogen atoms containing at least one unshared electron pair through which Z is coordinated to M;

k is an integer from 0 to 3; x is an integer from 1 to 4; z is a number from 0 to 3; and the sum, k+x, is equal to the formal oxidation state of M.

Suitable metal complexes include those containing from 1 to 3 π-bonded anionic or neutral ligand groups, which may be cyclic or non-cyclic delocalized a-bonded anionic ligand groups. Exemplary of such π-bonded groups are conjugated or nonconjugated, cyclic or non-cyclic diene and dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized R-bonded group may independently be substituted with a radical selected from the group consisting of hydrogen, halogen, hydrocarbyl, halohydrocarbyl, hydrocarbyl-substituted heteroatoms wherein the heteroatom is selected from Group 14-16 of the Periodic Table of the Elements, and such hydrocarbyl-substituted heteroatom radicals further substituted with a Group 15 or 16 hetero atom containing moiety. In addition two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, triethylsilyl, t-butyldimethylsilyl, methyldi(t-butyl)silyl, triphenylgermyl, and trimethylgermyl groups. Examples of Group 15 or 16 hetero atom containing moieties include amine, phosphino, alkoxy, or alkylthio moieties or divalent derivatives thereof, for example, amide, phosphide, alkyleneoxy or alkylenethio groups bonded to the transition metal or Lanthanide metal, and bonded to the hydrocarbyl group, π-bonded group, or hydrocarbyl-substituted heteroatom.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_{1-10}$ hydrocarbyl-substituted or tris($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(l)phenanthren-1-yl, and tetrahydroindenyl.

The boratabenzenyl ligands are anionic ligands which are boron containing analogues to benzene. They are previously known in the art having been described by G. Herberich, et al., in *Organometallics*, 14, 1, 471-480 (1995). Preferred boratabenzenyl ligands correspond to the formula:

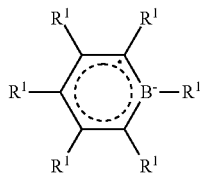

wherein $R^1$ is an inert substituent, preferably selected from the group consisting of hydrogen, hydrocarbyl, silyl, halo or germyl, said $R^1$ having up to 20 atoms not counting hydrogen, and optionally two adjacent $R^1$ groups may be joined together. In complexes involving divalent derivatives of such delocalized π-bonded groups one atom thereof is bonded by means of a covalent bond or a covalently bonded divalent group to another atom of the complex thereby forming a bridged system.

Phospholes are anionic ligands that are phosphorus containing analogues to a cyclopentadienyl group. They are previously known in the art having been described by WO 98/50392, and elsewhere. Preferred phosphole ligands correspond to the formula:

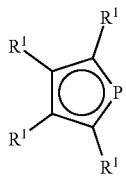

wherein $R^1$ is as previously defined.

Suitable transition metal complexes for use herein correspond to the formula: $MK_kX_xZ_z$, or a dimer thereof, wherein:

M is a Group 4 metal;

K is a group containing delocalized n-electrons through which K is bound to M, said K group containing up to 50 atoms not counting hydrogen atoms, optionally two K groups may be joined together forming a bridged structure, and further optionally one K may be bound to X or Z;

X at each occurrence is a monovalent, anionic moiety having up to 40 non-hydrogen atoms, optionally one or more X and one or more K groups are bonded together to form a metallocycle, and further optionally one or more X and one or more Z groups are bonded together thereby forming a moiety that is both covalently bound to M and coordinated thereto;

Z independently at each occurrence is a neutral, Lewis base donor ligand of up to 50 non-hydrogen atoms containing at least one unshared electron pair through which Z is coordinated to M;

k is an integer from 0 to 3; x is an integer from 1 to 4; z is a number from 0 to 3; and the sum, k+x, is equal to the formal oxidation state of M.

Suitable complexes include those containing either one or two K groups. The latter complexes include those containing a bridging group linking the two K groups. Suitable bridging groups are those corresponding to the formula $(ER'_2)_e$ wherein E is silicon, germanium, tin, or carbon, R' independently at each occurrence is hydrogen or a group selected from silyl, hydrocarbyl, hydrocarbyloxy and combinations thereof, said R' having up to 30 carbon or silicon atoms, and e is 1 to 8. Illustratively, R' independently at each occurrence is methyl, ethyl, propyl, benzyl, tert-butyl, phenyl, methoxy, ethoxy or phenoxy.

Examples of the complexes containing two K groups are compounds corresponding to the formula:

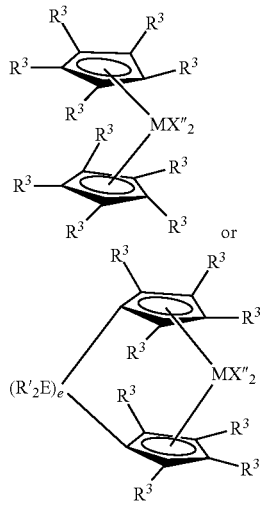

wherein:

M is titanium, zirconium or hafnium, preferably zirconium or hafnium, in the +2 or +4 formal oxidation state; $R^3$ at each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently at each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms bound by means of delocalized n-electrons to M, whereupon M is in the +2 formal oxidation state, and R', E and e are as previously defined.

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl) propane, dimethylbis(inden-1-yl)silane, dimethylbis (tetrahydroinden-1-yl)silane, dimethylbis(fluoren-1-yl) silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl)(fluoren-1-yl)silane, dimethyl(cyclopentadienyl)(octahydrofluoren-1-yl)silane, dimethyl(cyclopentadienyl)(tetrahydrofluoren-1-yl)silane, (1, 1, 2, 2-tetramethyl)-1, 2-bis(cyclopentadienyl)disilane, (1, 2-bis(cyclopentadienyl) ethane, and dimethyl(cyclopentadienyl)-1-(fluoren-1-yl) methane.

Suitable X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Exemplary X" groups are C1-20 hydrocarbyl groups.

Examples of metal complexes of the foregoing formula suitable for use in the present disclosure include:

bis(cyclopentadienyl)zirconiumdimethyl, bis(cyclopentadienyl)zirconium dibenzyl, bis(cyclopentadienyl)zirconium methyl benzyl, bis(cyclopentadienyl)zirconium methyl phenyl, bis(cyclopentadienyl)zirconiumdiphenyl, bis(cyclopentadienyl)titanium-allyl, bis(cyclopentadienyl)zirconiummethylmethoxide, bis(cyclopentadienyl)zirconiummethylchloride, bis(pentamethylcyclopentadienyl)zirconiumdimethyl, bis(pentamethylcyclopentadienyl)titaniumdimethyl, bis(indenyl)zirconiumdimethyl, indenylfluorenylzirconiumdimethyl, bis(indenyl)zirconiummethyl(2-(dimethylamino)benzyl), bis(indenyl)zirconiummethyltrimethylsilyl, bis(tetrahydroindenyl)zirconiummethyltrimethylsilyl, bis(pentamethylcyclopentadienyl)zirconiummethylbenzyl, bis(pentamethylcyclopentadienyl)zirconiumdibenzyl, bis(pentamethylcyclopentadienyl)zirconiummethylmethoxide, bis(pentamethylcyclopentadienyl)zirconiummethylchloride, bis(methylethylcyclopentadienyl)zirconiumdimethyl, bis(butylcyclopentadienyl)zirconiumdibenzyl, bis(t-butylcyclopentadienyl)zirconiumdimethyl, bis(ethyltetramethylcyclopentadienyl)zirconiumdimethyl, bis(methylpropylcyclopentadienyl)zirconiumdibenzyl, bis(trimethylsilylcyclopentadienyl)zirconiumdibenzyl, dimethylsilylbis(cyclopentadienyl)zirconiumdichloride, dimethylsilylbis(cyclopentadienyl)zirconiumdimethyl, dimethylsilylbis(tetramethylcyclopentadienyl)titanium (III) allyl dimethylsilylbis(t-butylcyclopentadienyl)zirconiumdichloride, dimethylsilylbis(n-butylcyclopentadienyl)zirconiumdichloride, (dimethylsilylbis(tetramethylcyclopentadienyl)titanium(III) 2-(dimethylamino)benzyl, (dimethylsilylbis(n-butylcyclopentadienyl)titanium(III) 2-(dimethylamino)benzyl, dimethylsilylbis(indenyl)zirconiumdichloride, dimethylsilylbis(indenyl)zirconiumdimethyl, dimethylsilylbis(2-methylindenyl)zirconiumdimethyl, dimethylsilylbis(2-methyl-4-phenylindenyl)zirconiumdimethyl, dimethylsilylbis(2-methylindenyl)zirconium-1,4-diphenyl-1,3-butadiene, dimethylsilylbis(2-methyl-4-phenylindenyl)zirconium (II) 1,4-diphenyl-1,3-butadiene, dimethylsilylbis(4,5,6,7-tetrahydroinden-1-yl)zirconiumdichloride, dimethylsilylbis(4,5,6,7-tetrahydroinden-1-yl)zirconiumdimethyl, dimethylsilylbis(tetrahydroindenyl)zirconium (II) 1,4-diphenyl-1,3-butadiene, dimethylsilylbis(tetramethylcyclopentadienyl)zirconium dimethyl, dimethylsilylbis(fluorenyl)zirconiumdimethyl, dimethylsilylbis(tetrahydrofluorenyl)zirconium bis(trimethylsilyl), ethylenebis(indbnyl)zirconiumdichloride, ethylenebis(indenyl)zirconiumdimethyl, ethylenebis(4,5,6,7-tetrahydroindenyl)zirconiumdichloride, ethylenebis(4,5,6,7-tetrahydroindenyl)zirconiumdimethyl, (isopropylidene)(cyclopentadienyl)(fluorenyl)zirconiumdibenzyl, and dimethylsilyl(tetramethylcyclopentadienyl)(fluorenyl)zirconium dimethyl.

A further class of metal complexes utilized in the present disclosure corresponds to the preceding formula: $MKZ_zX_x$, or a dimer thereof, wherein M, K, X, x and z are as previously defined, and Z is a substituent of up to 50 non-hydrogen atoms that together with K forms a metallocycle with M.

Suitable Z substituents include groups containing up to 30 non-hydrogen atoms comprising at least one atom that is oxygen, sulfur, boron or a member of Group 14 of the Periodic Table of the Elements directly attached to K, and a different atom, selected from the group consisting of nitrogen, phosphorus, oxygen or sulfur that is covalently bonded to M.

More specifically this class of Group 4 metal complexes used according to the present invention includes "constrained geometry catalysts" corresponding to the formula:

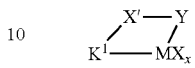

wherein: M is titanium or zirconium, preferably titanium in the +2, +3, or +4 formal oxidation state;

$K^1$ is a delocalized, $\pi$-bonded ligand group optionally substituted with from 1 to 5 $R^2$ groups, $R^2$ at each occurrence independently is selected from the group consisting of hydrogen, hydrocarbyl, silyl, germyl, cyano, halo and combinations thereof, said $R^2$ having up to 20 non-hydrogen atoms, or adjacent $R^2$ groups together form a divalent derivative (that is, a hydrocarbadiyl, siladiyl or germadiyl group) thereby forming a fused ring system, each X is a halo, hydrocarbyl, heterohydrocarbyl, hydrocarbyloxy or silyl group, said group having up to 20 non-hydrogen atoms, or two X groups together form a neutral C5-30 conjugated diene or a divalent derivative thereof;

x is 1 or 2;

Y is —O—, —S—, —NR'—, —PR'—;

and X' is SiR'2, CR'2, SiR'2SiR'2, CR'2CR'2, CR'=CR', CR'2SiR'2, or GeR'2, wherein R' independently at each occurrence is hydrogen or a group selected from silyl, hydrocarbyl, hydrocarbyloxy and combinations thereof, said R' having up to 30 carbon or silicon atoms.

Specific examples of the foregoing constrained geometry metal complexes include compounds corresponding to the formula:

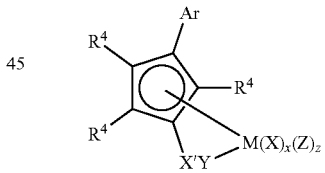

wherein,

Ar is an aryl group of from 6 to 30 atoms not counting hydrogen;

$R^4$ independently at each occurrence is hydrogen, Ar, or a group other than Ar selected from hydrocarbyl, trihydrocarbylsilyl, trihydrocarbylgermyl, halide, hydrocarbyloxy, trihydrocarbylsiloxy, bis(trihydrocarbylsilyl)amino, di(hydrocarbyl)amino, hydrocarbadiylamino, hydrocarbylimino, di(hydrocarbyl)phosphino, hydrocarbadiylphosphino, hydrocarbylsulfido, halo-substituted hydrocarbyl, hydrocarbyloxy-substituted hydrocarbyl, trihydrocarbylsilyl-substituted hydrocarbyl, trihydrocarbylsiloxy-substituted hydrocarbyl, bis(trihydrocarbylsilyl)amino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R group having up to 40 atoms not counting hydrogen atoms, and optionally two adjacent $R^4$ groups may be joined together forming a polycyclic fused ring group;

M is titanium;

X' is $SiR^6{}_2$, $CR^6{}_2$, $SiR^6{}_2SiR^6{}_2$, $CR^6{}_2CR^6{}_2$, $CR^6=CR^6$, $CR^6{}_2SiR^6{}_2$, $BR^6$, $BR^6L''$, or $GeR^6{}_2$;

Y is —O—, —S—, —$NR^5$—, —$PR^5$—; —$NR^5{}_2$, or —$PR^5{}_2$;

$R^5$, independently at each occurrence is hydrocarbyl, trihydrocarbylsilyl, or trihydrocarbylsilylhydrocarbyl, said $R^5$ having up to 20 atoms other than hydrogen, and optionally two $R^5$ groups or $R^5$ together with Y or Z form a ring system;

$R^6$, independently at each occurrence, is hydrogen, or a member selected from hydrocarbyl, hydrocarbyloxy, silyl, halogenated alkyl, halogenated aryl, —$NR^5{}_2$, and combinations thereof, said $R^6$ having up to 20 non-hydrogen atoms, and optionally, two $R^6$ groups or $R^6$ together with Z forms a ring system;

Z is a neutral diene or a monodentate or polydentate Lewis base optionally bonded to $R^5$, $R^6$, or X;

X is hydrogen, a monovalent anionic ligand group having up to 60 atoms not counting hydrogen, or two X groups are joined together thereby forming a divalent ligand group;

x is 1 or 2; and z is 0, 1 or 2.

Suitable examples of the foregoing metal complexes are substituted at both the 3- and 4-positions of a cyclopentadienyl or indenyl group with an Ar group. Examples of the foregoing metal complexes include:

(3-phenylcyclopentadien-1-yl)dimethyl(t-butylamido)silanetitanium dichloride, (3-phenylcyclopentadien-1-yl)dimethyl(t-butylamido)silanetitanium dimethyl, (3-phenylcyclopentadien-1-yl)dimethyl(t-butylamido)silanetitanium (II) 1,3-diphenyl-1,3-butadiene;

(3-(pyrrol-1-yl)cyclopentadien-1-yl)dimethyl(t-butylamido)silanetitanium dichloride, (3-(pyrrol-1-yl)cyclopentadien-1-yl)dimethyl(t-butylamido)silanetitanium dimethyl, (3-(pyrrol-1-yl)cyclopentadien-1-yl))dimethyl(t-butylamido)silanetitanium (II) 1,4-diphenyl-1,3-butadiene;

(3-(1-methylpyrrol-3-yl)cyclopentadien-1-yl)dimethyl(t-butylamido)silanetitanium dichloride, (3-(1-methylpyrrol-3-yl)cyclopentadien-1-yl)dimethyl(t-butylamido)silanetitanium dimethyl, (3-(1-methylpyrrol-3-yl)cyclopentadien-1-yl)dimethyl(t-butylamido)silanetitanium (II) 1,4-diphenyl-1,3-butadiene;

(3,4-diphenylcyclopentadien-1-yl)dimethyl(t-butylamido)silanetitanium dichloride, (3,4-diphenylcyclopentadien-1-yl)dimethyl(t-butylamido)silanetitanium dimethyl, (3,4-diphenylcyclopentadien-1-yl)dimethyl(t-butylamido)silanetitanium (II) 1,3-pentadiene;

(3-(3-N,N-dimethylamino)phenyl)cyclopentadien-1-yl)dimethyl(t-butylamido)silanetitanium dichloride, (3-(3-N,N-dimethylamino)phenylcyclopentadien-1-yl)dimethyl(t-butylamido)silanetitanium dimethyl, (3-(3-N,N-dimethylamino)phenylcyclopentadien-1-yl)dimethyl(t-butylamido)silanetitanium (II) 1,4-diphenyl-1,3-butadiene;

(3-(4-methoxyphenyl)-4-methylcyclopentadien-1-yl)dimethyl(t-butylamido)silanetitanium dichloride, (3-(4-methoxyphenyl)-4-phenylcyclopentadien-1-yl)dimethyl(t-butylamido)silanetitanium dimethyl, (3-4-methoxyphenyl)-4-phenylcyclopentadien-1-yl)dimethyl(t-butylamido)silanetitanium (II) 1,4-diphenyl-1,3-butadiene;

(3-phenyl-4-methoxycyclopentadien-1-yl)dimethyl(t-butylamido)silanetitanium dichloride, (3-phenyl-4-methoxycyclopentadien-1-yl)dimethyl(t-butylamido)silanetitanium dimethyl, (3-phenyl-4-methoxycyclopentadien-1-yl)dimethyl(t-butylamido)silanetitanium (II) 1,4-diphenyl-1,3-butadiene;

(3-phenyl-4-(N,N-dimethylamino)cyclopentadienyl-1-yl)dimethyl(t-butylamido)silanetitanium dichloride, (3-phenyl-4-(N,N-dimethylamino)cyclopentadien-1-yl)dimethyl(t-butylamido)silanetitanium dimethyl, (3-phenyl-4-(N,N-dimethylamino)cyclopentadienyl-1-yl)dimethyl(t-butylamido)silanetitanium (II) 1,4-diphenyl-1,3-butadiene;

2-methyl-(3,4-di(4-methylphenyl)cyclopentadien-1-yl)dimethyl(t-butylamido)silanetitanium dichloride, 2-methyl-(3,4-di(4-methylphenyl)cyclopentadien-1-yl)dimethyl(t-butylamido)silanetitanium dimethyl, 2-methyl-(3,4-di(4-methylphenyl)cyclopentadien-1-yl)dimethyl(t-butylamido)silanetitanium (II) 1,4-diphenyl-1,3-butadiene;

((2,3-diphenyl)-4-(N,N-dimethylamino)cyclopentadien-1-yl)dimethyl(t-butylamido)silane titanium dichloride, ((2,3-diphenyl)-4-(N,N-dimethylamino)cyclopentadien-1-yl)dimethyl(t-butylamido)silane titanium dimethyl, ((2,3-diphenyl)-4-(N,N-dimethylamino)cyclopentadien-1-yl)dimethyl(t-butylamido)silanetitanium (II) 1,4-diphenyl-1,3-butadiene;

(2,3,4-triphenyl-5-methylcyclopentadien-1-yl)dimethyl(t-butylamido)silanetitanium dichloride, (2,3,4-triphenyl-5-methylcyclopentadien-1-yl)dimethyl(t-butylamido)silanetitanium dimethyl, (2,3,4-triphenyl-5-methylcyclopentadien-1-yl)dimethyl(t-butylamido)silanetitanium (II) 1,4-diphenyl-1,3-butadiene;

(3-phenyl-4-methoxycyclopentadien-1-yl)dimethyl(t-butylamido)silanetitanium dichloride, (3-phenyl-4-methoxycyclopentadien-1-yl)dimethyl(t-butylamido)silanetitanium dimethyl, (3-phenyl-4-methoxycyclopentadien-1-yl)dimethyl(t-butylamido)silanetitanium (II) 1,4-diphenyl-1,3-butadiene;

(2,3-diphenyl-4-(n-butyl)cyclopentadien-1-yl)dimethyl(t-butylamido)silanetitanium dichloride, (2,3-diphenyl-4-(n-butyl)cyclopentadien-1-yl)dimethyl(t-butylamido)silanetitanium dimethyl, (2,3-diphenyl-4-(n-butyl)cyclopentadien-1-yl)dimethyl(t-butylamido)silanetitanium (II) 1,4-diphenyl-1,3-butadiene;

(2,3,4,5-tetmphenylcyclopentadien-1-yl)dimethyl(t-butylamido)silanetitanium dichloride, (2,3,4,5-tetraphenylcyclopentadien-1-yl)dimethyl(t-butylamido)silanetitanium dimethyl, and (2,3,4,5-tetraphenylcyclopentadien-1-yl)dimethyl(t-butylamido)silanetitanium (II 1,4-diphenyl-1,3-butadiene.

Additional examples of suitable metal complexes herein are polycyclic complexes corresponding to the formula:

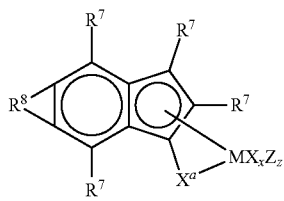

where M is titanium in the +2, +3 or +4 formal oxidation state;

R[7] independently at each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylene-phosphino-substituted hydrocarbyl, or hydrocarbylsulfido-substituted hydrocarbyl, said R[7] group having up to 40 atoms not counting hydrogen, and optionally two or more of the foregoing groups may together form a divalent derivative;

R[8] is a divalent hydrocarbylene- or substituted hydrocarbylene group forming a fused system with the remainder of the metal complex, said R[8] containing from 1 to 30 atoms not counting hydrogen;

X[a] is a divalent moiety, or a moiety comprising one σ-bond and a neutral two electron pair able to form a coordinate-covalent bond to M, said X[a] comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, π-bound ligand groups and optionally two X groups together form a divalent ligand group;

Z independently at each occurrence is a neutral ligating compound having up to 20 atoms;

x is 0, 1 or 2; and z is zero or 1.

Suitable examples of such complexes are 3-phenyl-substituted s-indecenyl complexes corresponding to the formula:

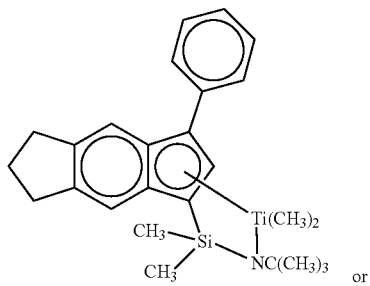

or

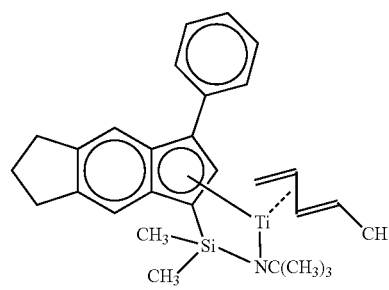

2,3-dimethyl-substituted s-indecenyl complexes corresponding to the formulas:

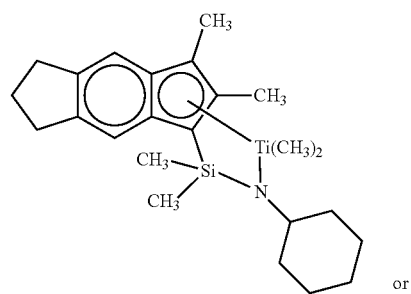

or

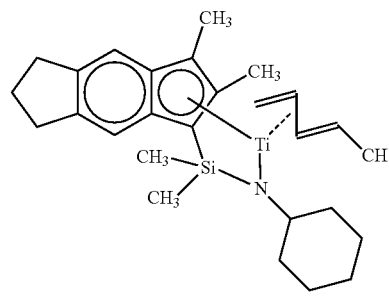

or 2-methyl-substituted s-indecenyl complexes corresponding to the formula:

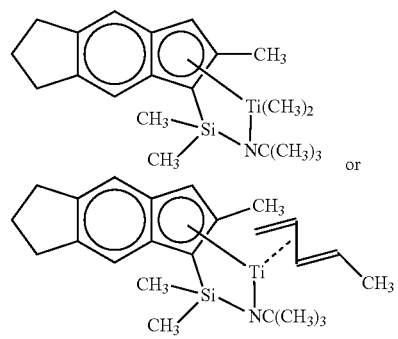

Additional examples of metal complexes that are usefully employed as catalysts according to the present invention include those of the formula:

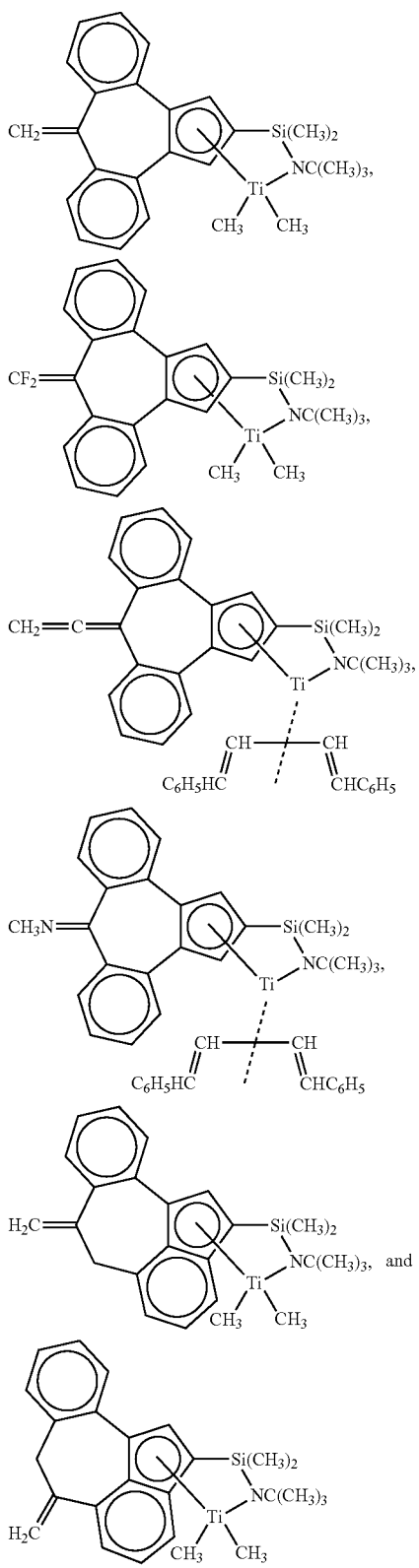

Specific metal complexes include:

(8-methylene-1,8-dihydrodibenzo[e,h]azulen-1-yl)-N-(1,1-dimethylethyl)dimethylsilanamide titanium (II) 1,4-diphenyl-1,3-butadiene,
(8-methylene-1,8-dihydrodibenzo[e,h]azulen-1-yl)-N-(1,1-dimethylethyl)dimethylsilanamide titanium (II) 1,3-pentadiene,
(8-methylene-1,8-dihydrodibenzo[e,h]azulen-1-yl)-N-(1,1-dimethylethyl)dimethylsilanamide titanium (III) 2-(N,N-dimethylamino)benzyl,
(8-methylene-1,8-dihydrodibenzo[e,h]azulen-1-yl)-N-(1,1-dimethylethyl)dimethylsilanamide titanium (IV) dichloride,
(8-methylene-1,8-dihydrodibenzo[e,h]azulen-1-yl)-N-(1,1-dimethylethyl)dimethylsilanamide titanium (IV) dimethyl,
(8-methylene-1,8-dihydrodibenzo[e,h]azulen-1-yl)-N-(1,1-dimethylethyl)dimethylsilanamide titanium (IV) dibenzyl,
(8-difluoromethylene-1,8-dihydrodibenzo[e,h]azulen-1-yl)-N-(1,1-dimethylethyl)dimethylsilanamide titanium (II) 1,4-diphenyl-1,3-butadiene,
(8-difluoromethylene-1,8-dihydrodibenzo[e,h]azulen-1-yl)-N-(1,1-dimethylethyl)dimethylsilanamide titanium (II) 1,3-pentadiene,
(8-difluoromethylene-1,8-dihydrodibenzo[e,h]azulen-1-yl)-N-(1,1-dimethylethyl)dimethylsilanamide titanium (III) 2-(N,N-dimethylamino)benzyl,
(8-difluoromethylene-1,8-dihydrodibenzo[e,h]azulen-1-yl)-N-(1,1-dimethylethyl)dimethylsilanamide titanium (IV) dichloride,
(8-difluoromethylene-1,8-dihydrodibenzo[e,h]azulen-1-yl)-N-(1,1-dimethylethyl)dimethylsilanamide titanium (IV) dimethyl,
(8-difluoromethylene-1,8-dihydrodibenzo[e,h]azulen-1-yl)-N-(1,1-dimethylethyl)dimethylsilanamide titanium (IV) dibenzyl,
(8-methylene-1,8-dihydrodibenzo[e,h]azulen-2-yl)-N-(1,1-dimethylethyl)dimethylsilanamide titanium (II) 1,4-diphenyl-1,3-butadiene,
(8-methylene-1,8-dihydrodibenzo[e,h]azulen-2-yl)-N-(1,1-dimethylethyl)dimethylsilanamide titanium (II) 1,3-pentadiene,
(8-methylene-1,8-dihydrodibenzo[e,h]azulen-2-yl)-N-(1,1-dimethylethyl)dimethylsilanamide titanium (III) 2-(N,N-dimethylamino)benzyl,
(8-methylene-1,8-dihydrodibenzo[e,h]azulen-2-yl)-N-(1,1-dimethylethyl)dimethylsilanamide titanium (IV) dichloride,
(8-methylene-1,8-dihydrodibenzo[e,h]azulen-2-yl)-N-(1,1-dimethylethyl)dimethylsilanamide titanium (IV) dimethyl,
(8-methylene-1,8-dihydrodibenzo[e,h]azulen-2-yl)-N-(1,1-dimethylethyl)dimethylsilanamide titanium (IV) dibenzyl,
(8-difluoromethylene-1,8-dihydrodibenzo[e,h]azulen-2-yl)-N-(1,1-dimethylethyl)dimethylsilanamide titanium (II) 1,4-diphenyl-1,3-butadiene,
(8-difluoromethylene-1,8-dihydrodibenzo[e,h]azulen-2-yl)-N-(1,1-dimethylethyl)dimethylsilanamide titanium (II) 1,3-pentadiene,
(8-difluoromethylene-1,8-dihydrodibenzo[e,h]azulen-2-yl)-N-(1,1-dimethylethyl)dimethylsilanamide titanium (III) 2-(N,N-dimethylamino)benzyl,
(8-difluoromethylene-1,8-dihydrodibenzo[e,h]azulen-2-yl)-N-(1,1-dimethylethyl)dimethylsilanamide titanium (IV) dichloride,
(8-difluoromethylene-1,8-dihydrodibenzo[e,h]azulen-2-yl)-N-(1,1-dimethylethyl)dimethylsilanamide titanium (IV) dimethyl, (8-difluoromethylene-1,8-dihydrodibenzo[e,h]azulen-2-yl)-N-(1,1-dimethylethyl)dimethylsilanamide titanium (IV) dibenzyl, and mixtures thereof, especially mixtures of positional isomers.

Further illustrative examples of metal complexes for use according to the present invention correspond to the formula:

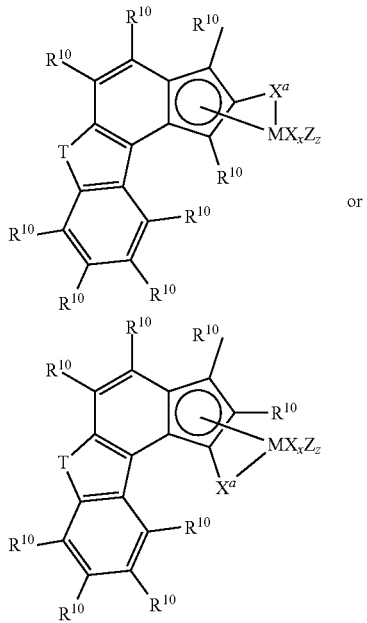

where M is titanium in the +2, +3 or +4 formal oxidation state;

T is —$NR^9$— or —O—;

$R^9$ is hydrocarbyl, silyl, germyl, dihydrocarbylboryl, or halohydrocarbyl or up to 10 atoms not counting hydrogen;

$R^{10}$ independently at each occurrence is hydrogen, hydrocarbyl, trihydrocarbylsilyl, trihydrocarbylsilylhydrocarbyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said $R^{10}$ group having up to 40 atoms not counting hydrogen atoms, and optionally two or more of the foregoing adjacent $R^{10}$ groups may together form a divalent derivative thereby forming a saturated or unsaturated fused ring;

$X^a$ is a divalent moiety lacking in delocalized π-electrons, or such a moiety comprising one σ-bond and a neutral two electron pair able to form a coordinate-covalent bond to M, said $X^a$ comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic ligand groups bound to M through delocalized π-electrons or two X groups together are a divalent anionic ligand group;

Z independently at each occurrence is a neutral ligating compound having up to 20 atoms;

x is 0, 1, 2, or 3;

and z is 0 or 1.

Illustratively, T is =$N(CH_3)$, X is halo or hydrocarbyl, x is 2, $X^a$ is dimethylsilane, z is 0, and $R^{10}$ at each occurrence is hydrogen, a hydrocarbyl, hydrocarbyloxy, dihydrocarbylamino, hydrocarbyleneamino, dihydrocarbylamino-substituted hydrocarbyl group, or hydrocarbyleneamino-substituted hydrocarbyl group of up to 20 atoms not counting hydrogen, and optionally two $R^{10}$ groups may be joined together.

Illustrative metal complexes of the foregoing formula that may be employed in the practice of the present invention further include the following compounds:

(t-butylamido)dimethyl-[6,7]benzo-[4,5:2',3'](1-methylisoindol)-(3H)-indene-2-yl)silanetitanium (II)1,4-diphenyl-1,3-butadiene, (t-butylamido)dimethyl-[6,7]benzo-[4,5:2',3'](1-methylisoindol)-(3H)-indene-2-yl)silanetitanium (II) 1,3-pentadiene, (t-butylamido)dimethyl-[6,7]benzo-[4,5:2',3'](1-methylisoindol)-(3H)-indene-2-yl)silanetitanium (III) 2-(N,N-dimethylamino)benzyl, (t-butylamido)dimethyl-[6,7]benzo-[4,5:2',3'](1-methylisoindol)-(3H)-indene-2-yl)silanetitanium (IV) dichloride, (t-butylamido)dimethyl-[6,7]benzo-[$^4$,5:2',3'](1-methylisoindol)-(3H)-indene-2-yl)silanetitanium (IV) dimethyl, (t-butylamido)dimethyl-[6J]benzo-[4,5:2',3'](1-methylisoindol)-(3H)-indene-2-yl)silanetitanium (IV) dibenzyl, (t-butylamido)dimethyl-[6,7]benzo-[4,5:2',3'](1-methylisoindol)-(3H)-indene-2-yl)silanetitanium (IV) bis(trimethylsilyl), (cyclohexylamido)dimethyl-[6,7]benzo-[4,5:2',3'](1-methylisoindol)-(3H)-indene-2-yl)silanetitanium (II) 1,4-diphenyl-1,3-butadiene, (cyclohexylamido)dimethyl-[6,7]benzo-[4,5:2',3'](1-methylisoindol)-(3H)-indene-2-yl)silanetitanium (II) 1,3-pentadiene, (cyclohexylamido)dimethyl-[6,7]benzo-[4,5:2',3'](1-methylisoindol)-(3H)-indene-2-yl)silanetitanium (III) 2-(N,N-dimethylamino)benzyl, (cyclohexylamido)dimethyl-[6,7]benzo-[4,5:2',3'](1-methylisoindol)-(3H)-indene-2-yl)silanetitanium (IV) dichloride, (cyclohexylamido)dimethyl-[6,7]benzo-[4,5:2',3'](1-methylisoindol)-(3H)-indene-2-yl)silanetitanium (IV) dimethyl, (cyclohexylamido)dimethyl-[6,7]benzo-[4,5:2',3'](1-methylisoindol)-(3H)-indene-2-yl)silanetitanium (IV) dibenzyl, (cyclohexylamido)dimethyl-[6,7]benzo-[4,5:2',3'](1-methylisoindol)-(3H)-indene-2-yl)silanetitanium (IV) bis(trimethylsilyl), (t-butylamido)di(p-methylphenyl)-[6,7]benzo-[4,5:2',3'](1-methylisoindol)-(3H)-indene-2-yl)silanetitanium (II) 1,4-diphenyl-1,3-butadiene, (t-butylamido)di(p-methylphenyl)-[6,7]benzo-[4,5:2',3'](1-methylisoindol)-(3H)-indene-2-yl)silanetitanium (II) 1,3-pentadiene, (t-butylamido)di(p-methylphenyl)-[6,7]benzo-[4,5:2',3'](1-methylisoindol)-(3H)-indene-2-yl)silanetitanium (III) 2-(N,N-dimethylamino)benzyl, (t-butylamido)di(p-methylphenyl)-[6,7]benzo-[4,5:2',3'](1-methylisoindol)-(3H)-indene-2-yl)silanetitanium (IV) dichloride, (t-butylamido)di(p-methylphenyl)-[6,7]benzo-[4,5:2',3'](1-methylisoindol)-(3H)-indene-2-yl)silanetitanium (IV) dimethyl,
(t-butylamido)di(p-methylphenyl)-[6,7]benzo-[4,5:2',3'](1-methylisoindol)-(3H)-indene-2-yl)silanetitanium (IV) dibenzyl,
(t-butylamido)di(p-methylphenyl)-[6,7]benzo-[4,5:2',3'](1-methylisoindol)-(3H)-indene-2-yl)silanetitanium (IV) bis(trimethylsilyl),
(cyclohexylamido)di(p-methylphenyl)-[6,7]benzo-[4,5:2',3'](1-methylisoindol)-(3H)-indene-2-yl)silanetitanium (II) 1,4-diphenyl-1,3-butadiene,
(cyclohexylamido)di(p-methylphenyl)-[6,7]benzo-[4,5:2',3'](1-methylisoindol)-(3H)-indene-2-yl)silanetitanium (II) 1,3-pentadiene,
(cyclohexylamido)di(p-methylphenyl)-[6,7]benzo-[4,5:2',3'](1-methylisoindol)-(3H)-indene-2-yl)silanetitanium (III) 2-(N,N-dimethylamino)benzyl,
(cyclohexylamido)di(p-methylphenyl)-[6,7]benzo-[4,5:2',3'](1-methylisoindol)-(3H)-indene-2-yl)silanetitanium (IV) dichloride,
(cyclohexylamido)di(p-methylphenyl)-[6,7]benzo-[4,5:2',3'](1-methylisoindol)-(3H)-indene-2-yl)silanetitanium (IV) dimethyl,
(cyclohexylamido)di(p-methylphenyl)-[6,7]benzo-[4,5:2',3'](1-methylisoindol)-(3H)-indene-2-yl)silanetitanium (IV) dibenzyl; and
(cyclohexylamido)di(p-methylphenyl)-[6,7]benzo-[4,5:2',3'](1-methylisoindol)-(3H)-indene-2-yl)silanetitanium (IV) bis(trimethylsilyl).

Illustrative Group 4 metal complexes that may be employed in the practice of the present disclosure further include:
(tert-butylamido)(1,1-dimethyl-2,3,4,9,10-η-1,4,5,6,7,8-hexahydronaphthalenyl)dimethylsilanetitaniumdimethyl
(tert-butylamido)(1,1,2,3-tetramethyl-2,3,4,9,10-η-1,4,5,6,7,8-hexahydronaphthalenyl)dimethylsilanetitaniumdimethyl,
(tert-butylamido)(tetramethyl-$\eta^5$-cyclopentadienyl) dimethylsilanetitanium dibenzyl,
(tert-butylamido)(tetramethyl-$\eta^5$-cyclopentadienyl)dimethylsilanetitanium dimethyl,
(tert-butylamido)(tetramethyl-$\eta^5$-cyclopentadienyl)-1,2-ethanediyltitanium dimethyl,
(tert-butylamido)(tetramethyl-$\eta^5$-indenyl)dimethylsilanetitanium dimethyl,
(tert-butylamido)(tetramethyl-$\eta^5$-cyclopentadienyl)dimethylsilane titanium (III) 2-(dimethylamino)benzyl;
(tert-butylamido)(tetramethyl-$\eta^5$-cyclopentadienyl)dimethylsilanetitanium (III) allyl,
(tert-butylamidoxtetramethyl-$\eta^5$-cyclopentadienyl)dimethylsilanetitanium (III) 2,4-dimethylpentadienyl,
(tert-butylamido)(tetramethyl-$\eta^5$-cyclopentadienyl)dimethylsilanetitanium (II) 1,4-diphenyl-1,3-butadiene,
(tert-butylamido)(tetramethyl-$\eta^5$-cyclopentadienyl)dimethylsilanetitanium (II) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (IV) 2,3-dimethyl-1,3-butadiene,
(tert-butylamido)(2-methylindenyl)dimethylsilanetitanium (IV) isoprene,
(tert-butylamido)(2-methylindenyl)dimethylsilanetitanium (IV) 1,3-butadiene,
(tert-butylamido)(2,3-dimethylindenyl)dimethylsilanetitanium (IV) 2,3-dimethyl-1,3-butadiene,
(tert-butylamido)(2,3-dimethylindenyl)dimethylsilanetitanium (IV) isoprene,
(tert-butylamido)(2,3-dimethylindenyl)dimethylsilanetitanium (IV) dimethyl,
(tert-butylamido)(2,3-dimethylindenyl)dimethylsilanetitanium (IV) dibenzyl,
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2,3-dimethylindenyl)dimethylsilanetitanium (II) 1,4-diphenyl-1,3-butadiene,
(tert-butylamido)(2-methylindenyl)dimethylsilanetitanium (Q) 1,3-pentadiene,
(tert-butylamido)(2-methylindenyl)dimethylsilanetitanium (IV) dimethyl,
(tert-butylamido)(2-methylindenyl)dimethylsilanetitanium (IV) dibenzyl,
(tert-butylamido)(2-methyl-4-phenylindenyl)dimethylsilanetitanium (1) 1,4-diphenyl-1,3-butadiene,
(tert-butylamido)(2-methyl-4-phenylindenyl)dimethylsilanetitanium (II) 1,3-pentadiene,
(tert-butylamido)(2-methyl-4-phenylindenyl)dimethylsilanetitanium (II) 2,4-hexadiene,
(tert-butylamido)(tetramethyl-$\eta^5$-cyclopentadienyl)dimethyl-silanetitanium (IV) 1,3-butadiene,
(tert-butylamido)(tetramethyl-$\eta^5$-cyclopentadienyl)dimethylsilanetitanium (IV) 2,3-dimethyl-1,3-butadiene,
(tert-butylamido)(tetramethyl-$\eta^5$-cyclopentadienyl)dimethylsilanetitanium (IV) isoprene,
(tert-butylamido)(tetramethyl-$\eta^5$-cyclopentadienyl)dimethyl-silanetitanium (II) 1,4-dibenzyl-1,3-butadiene,
(tert-butylamido)(tetramethyl-$\eta^5$-cyclopentadienyl)dimethylsilanetitanium (II) 2,4-hexadiene,
(tert-butylamido)(tetramethyl-$\eta^5$-cyclopentadienyl)dimethyl-silanetitanium (II) 3-methyl-1,3-pentadiene,
(tert-butylamido)(2,4-dimethylpentadien-3-yl)dimethylsilanetitaniumdimethyl,
(tert-butylamido)(6,6-dimethylcyclohexadienyl)dimethylsilanetitaniumdimethyl,
(tert-butylamido)(1,1-dimethyl-2,3,4,9,10--1,4,5,6,7,8-hexahydronaphthalen-4-yl)dimethylsilanetitaniumdimethyl,
(tert-butylamido)(1,1,2,3-tetramethyl-2,3,4,9,10-η-1,4,5,6,7,8-hexahydronaphthalen-4-yl)dimethylsilanetitaniumdimethyl,
(tert-butylamido)(tetramethyl-$\eta^5$-cyclopentadienyl methylphenylsilanetitanium (IV) dimethyl,
(tert-butylamido)(tetramethyl-$\eta^5$-cyclopentadienyl methylphenylsilanetitanium (II) 1,4-diphenyl-1,3-butadiene,
1-(tert-butylamido)-2-(tetramethyl-$\eta^5$-cyclopentadienyl) ethanediyltitanium (IV) dimethyl, and
1-(tert-butylamido)-2-(tetramethyl-$\eta^5$-cyclopentadienyl) ethanediyl-titanium (II) 1,4-diphenyl-1,3-butadiene.

Other delocalized, π-bonded complexes, especially those containing other Group 4 metals, will, of course, be apparent to those skilled in the art, and are disclosed among other places in: WO 0378480, WO 03/78483, WO 02/92610, WO 02/02577, US 2003/0004286 and U.S. Pat. Nos. 6,515,155, 6,555,634, 6,150,297, 6,034,022, 6,268,444, 6,015,868, 5,866,704, and 5,470,993.

Additional examples of metal complexes that are usefully employed as catalysts are complexes of polyvalent Lewis bases, such as compounds corresponding to the formula:

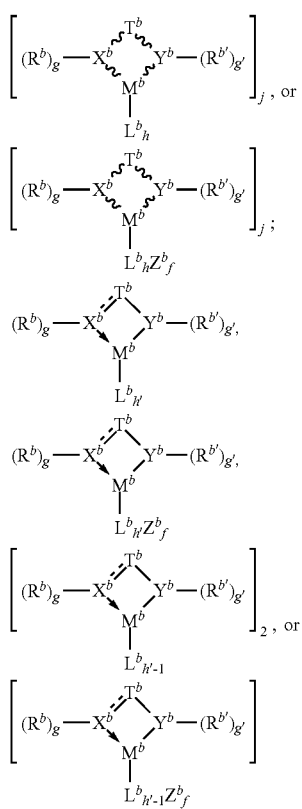

wherein $T^b$ is a bridging group, preferably containing 2 or more atoms other than hydrogen, $X^b$ and $Y^b$ are each independently selected from the group consisting of nitrogen, sulfur, oxygen and phosphorus; more preferably both $X^b$ and $Y^b$ are nitrogen, $R^b$ and $R^{b\prime}$ independently each occurrence are hydrogen or $C_{1-50}$ hydrocarbyl groups optionally containing one or more heteroatoms or inertly substituted derivative thereof. Non-limiting examples of suitable $R^b$ and $R^{b\prime}$ groups include alkyl, alkenyl, aryl, aralkyl, (poly)alkylaryl and cycloalkyl groups, as well as nitrogen, phosphorus, oxygen and halogen substituted derivatives thereof. Specific examples of suitable Rb and Rb' groups include methyl, ethyl, isopropyl, octyl, phenyl, 2,6-dimethylphenyl, 2,6-di(isopropyl)phenyl, 2,4,6-trimethylphenyl, pentafluorophenyl, 3,5-trifluoromethylphenyl, and benzyl;

g and g' are each independently 0 or 1;

$M^b$ is a metallic element selected from Groups 3 to 15, or the Lanthanide series of the Periodic Table of the Elements. Preferably, $M^b$ is a Group 3-13 metal, more preferably $M^b$ is a Group 4-10 metal;

$L^b$ is a monovalent, divalent, or trivalent anionic ligand containing from 1 to 50 atoms, not counting hydrogen. Examples of suitable $L^b$ groups include halide; hydride; hydrocarbyl, hydrocarbyloxy; di(hydrocarbyl)amido, hydrocarbyleneamido, di(hydrocarbyl)phosphido; hydrocarbylsulfido; hydrocarbyloxy, tri(hydrocarbylsilyl)alkyl; and carboxylates. More preferred $L^b$ groups are C1-20 alkyl, $C_{7-20}$ aralkyl, and chloride;

h and h' are each independently an integer from 1 to 6, preferably from 1 to 4, more preferably from 1 to 3, and j is 1 or 2, with the value h x j selected to provide charge balance;

Z is a neutral ligand group coordinated to $M^b$, and containing up to 50 atoms not counting hydrogen. Preferred $Z^b$ groups include aliphatic and aromatic amines, phosphines, and ethers, alkenes, alkadienes, and inertly substituted derivatives thereof. Suitable inert substituents include halogen, alkoxy, aryloxy, alkoxycarbonyl, aryloxycarbonyl, di(hydrocarbyl)amine, tri(hydrocarbyl)silyl, and nitrile groups. Preferred $Z^b$ groups include triphenylphosphine, tetrahydrofuran, pyridine, and 1,4-diphenylbutadiene;

f is an integer from 1 to 3;

two or three of $T^b$, $R^b$ and $R^{b\prime}$ may be joined together to form a single or multiple ring structure;

h is an integer from 1 to 6, preferably from 1 to 4, more preferably from 1 to 3;

⌇⌇⌇ indicates any form of electronic interaction, especially coordinate or covalent bonds, including multiple bonds, arrows signify coordinate bonds, and dotted lines indicate optional double bonds.

In one embodiment, it is preferred that $R^b$ have relatively low steric hindrance with respect to $X^b$. In this embodiment, most preferred $R^b$ groups are straight chain alkyl groups, straight chain alkenyl groups, branched chain alkyl groups wherein the closest branching point is at least 3 atoms removed from $X^b$, and halo, dihydrocarbylamino, alkoxy or trihydrocarbylsilyl substituted derivatives thereof. Highly preferred $R^b$ groups in this embodiment are C1-8 straight chain alkyl groups.

At the same time, in this embodiment $R^{b\prime}$ preferably has relatively high steric hindrance with respect to $Y^b$. Non-limiting examples of suitable $R^{b\prime}$ groups for this embodiment include alkyl or alkenyl groups containing one or more secondary or tertiary carbon centers, cycloalkyl, aryl, alkaryl, aliphatic or aromatic heterocyclic groups, organic or inorganic oligomeric, polymeric or cyclic groups, and halo, dihydrocarbylamino, alkoxy or trihydrocarbylsilyl substituted derivatives thereof. Preferred $R^{b\prime}$ groups in this embodiment contain from 3 to 40, more preferably from 3 to 30, and most preferably from 4 to 20 atoms not counting hydrogen and are branched or cyclic. Examples of preferred $T^b$ groups are structures corresponding to the following formulas:

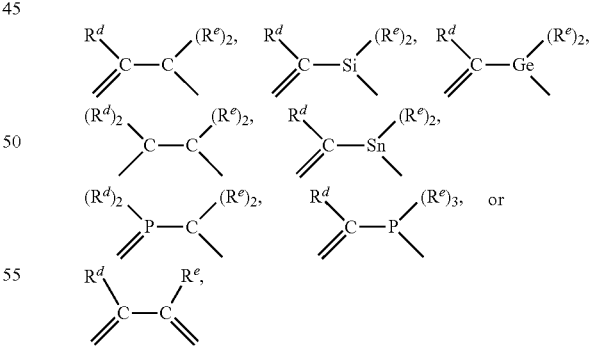

wherein

Each $R^d$ is C1-10 hydrocarbyl group, preferably methyl, ethyl, n-propyl, i-propyl, t-butyl, phenyl, 2,6-dimethylphenyl, benzyl, or tolyl. Each $R^e$ is C1-10 hydrocarbyl, preferably methyl, ethyl, n-propyl, i-propyl, t-butyl, phenyl, 2,6-dimethylphenyl, benzyl, or tolyl. In addition, two or more $R^d$ or $R^e$ groups, or mixtures of Rd and Re groups may together form a polyvalent derivative of a hydrocarbyl group, such as, 1,4-butylene, 1,5-pentylene, or a multicyclic, fused ring, polyvalent hydrocarbyl- or heterohydrocarbyl-group, such as naphthalene-1,8-diyl.

Suitable examples of the foregoing polyvalent Lewis base complexes include:

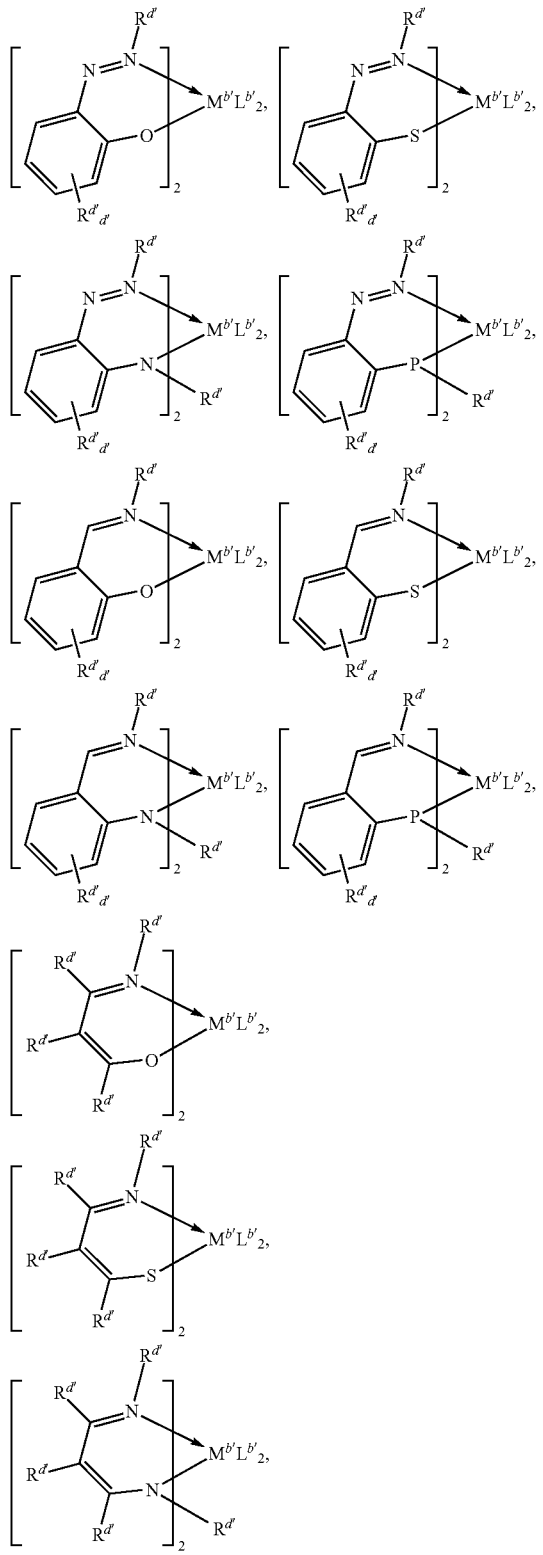

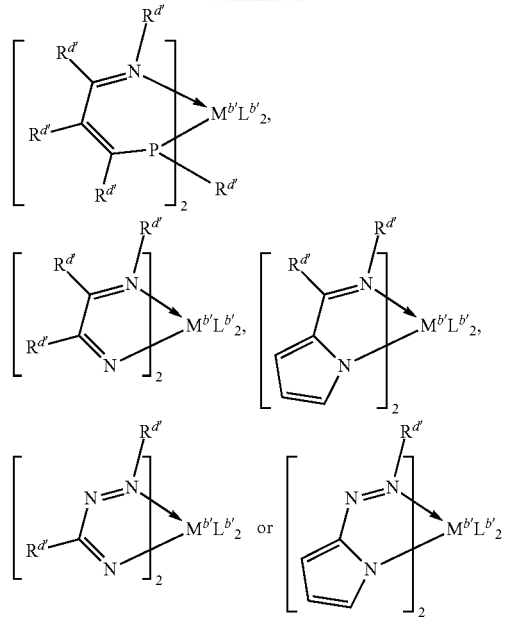

wherein $R^{d'}$ at each occurrence is independently selected from the group consisting of hydrogen and C1-50 hydrocarbyl groups optionally containing one or more heteroatoms, or inertly substituted derivative thereof, or further optionally, two adjacent $R^{d'}$ groups may together form a divalent bridging group;

d' is 4;

$M^{b'}$ is a Group 4 metal, preferably titanium or hafnium, or a Group 10 metal, preferably Ni or Pd;

$L^{b'}$ is a monovalent ligand of up to 50 atoms not counting hydrogen, preferably halide or hydrocarbyl, or two $L^{b'}$ groups together are a divalent or neutral ligand group, preferably a $C_{2-50}$ hydrocarbylene, hydrocarbadiyl or diene group.

The polyvalent Lewis base complexes for use in the present invention especially include Group 4 metal derivatives, especially hafnium derivatives of hydrocarbylamine substituted heteroaryl compounds corresponding to the formula:

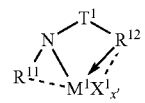

wherein:

$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent bridging group of from 1 to 41 atoms other than hydrogen, preferably 1 to 20 atoms other than hydrogen, and most preferably a mono- or di-C1-20 hydrocarbyl substituted methylene or silane group; and $R^{12}$ is a $C_{5-20}$ heteroaryl group containing Lewis base functionality, especially a pyridin-2-yl- or substituted pyridin-2-yl group or a divalent derivative thereof;

$M^1$ is a Group 4 metal, preferably hafnium;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

Suitable complexes are those wherein ligand formation results from hydrogen elimination from the amine group and optionally from the loss of one or more additional groups, especially from $R^{12}$. In addition, electron donation from the Lewis base functionality, preferably an electron pair, provides additional stability to the metal center. Suitable metal complexes correspond to the formula:

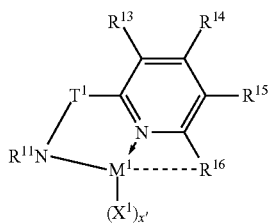

wherein $M^1$, $X^1$, x', $R^{11}$ and $T^1$ are as previously defined, $R^{13}$, $R^{14}$, $R^{15}$ and $R^{16}$ are hydrogen, halo, or an alkyl, cycloalkyl, heteroalkyl, heterocycloalkyl, aryl, or silyl group of up to 20 atoms not counting hydrogen, or adjacent $R^{13}$, $R^{14}$, $R^{15}$ or $R^{16}$ groups may be joined together thereby forming fused ring derivatives, and bonds, optional bonds and electron pair donative interactions are represented by lines, dotted lines and arrows respectively. Suitable examples of the foregoing metal complexes correspond to the formula:

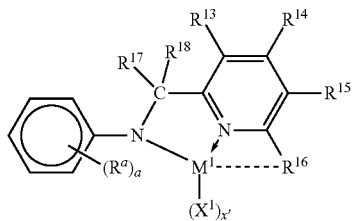

wherein $M^1$, $X^1$, and x' are as previously defined, $R^{13}$, $R^{14}$, $R^{15}$ and $R^{16}$ are as previously defined, preferably $R^{13}$, $R^{14}$, and $R^{15}$ are hydrogen, or C1-4 alkyl, and $R^{16}$ is $C_{6-20}$ aryl, most preferably naphthalenyl;

$R^a$ independently at each occurrence is $C_{1-4}$ alkyl, and a is 1-5, most preferably $R^a$ in two ortho-positions to the nitrogen is isopropyl or t-butyl;

$R^{17}$ and $R^{18}$ independently at each occurrence are hydrogen, halogen, or a $C_{1-20}$ alkyl or aryl group, most preferably one of $R^{17}$ and $R^{18}$ is hydrogen and the other is a C6-20 aryl group, especially 2-isopropyl, phenyl or a fused polycyclic aryl group, most preferably an anthracenyl group, and bonds, optional bonds and electron pair donative interactions are represented by lines, dotted lines and arrows respectively.

Exemplary metal complexes for use herein as catalysts correspond to the formula:

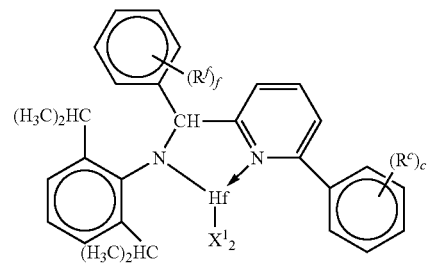

wherein $X^1$ at each occurrence is halide, N,N-dimethyl-amido, or $C_{1-4}$ alkyl, and preferably at each occurrence $X^1$ is methyl;

$R^f$ independently at each occurrence is hydrogen, halogen, C1-20 alkyl, or C6-20 aryl, or two adjacent $R^f$ groups are joined together thereby forming a ring, and f is 1-5; and $R^c$ independently at each occurrence is hydrogen, halogen, $C_{1-20}$ alkyl, or $C_{6-20}$ aryl, or two adjacent $R^c$ groups are joined together thereby forming a ring, and c is 1-5.

Suitable examples of metal complexes for use as catalysts according to the present invention are complexes of the following formulas:

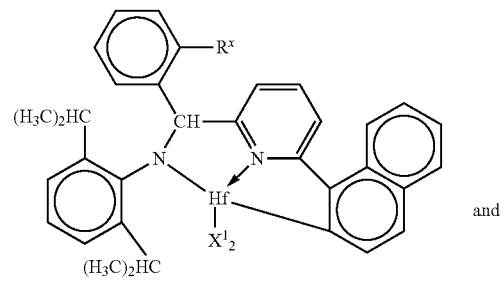

and

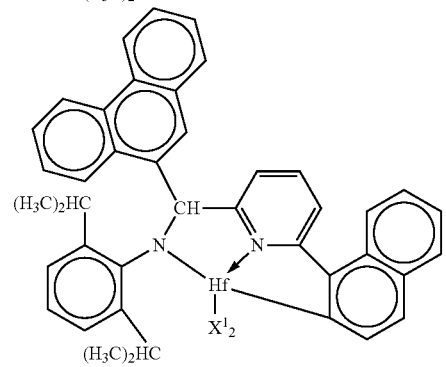

wherein $R^x$ is C1-4 alkyl or cycloalkyl, preferably methyl, isopropyl, t-butyl or cyclohexyl; and $X^1$ at each occurrence is halide, N,N-dimethylamido, or C1-4 alkyl, preferably methyl.

Examples of metal complexes usefully employed as catalysts according to the present invention include:

[N-(2,6-di(1-methylethyl)phenyl)amido)(o-tolyl)(α-naph-thalen-2-diyl(6-pyridin-2-diyl)methane)]hafnium dimethyl;

[N-(2,6-di(1-methylethyl)phenyl)amido)(o-tolyl)(α-naph-thalen-2-diyl(6-pyridin-2-diyl)methane)]hafnium di(N,N-dimethylamido);

[N-(2,6-di(1-methylethyl)phenyl)amido)(o-tolyl)(α-naph-thalen-2-diyl(6-pyridin-2-diyl)methane)]hafnium dichloride;

[N-(2,6-di(1-methylethyl)phenyl)amido)(2-isopropylphe-
  nyl)(α-naphthalen-2-diyl(6-pyridin-2-diyl)methane)]haf-
  nium dimethyl;
[N-(2,6-di(1-methylethyl)phenyl)amido)(2-isopropylphe-
  nyl)α-naphthalen-2-diyl(6-pyridin-2-diyl)methane)]haf-
  nium di(N,N-dimethylamido);
[N-(2,6-di(1-methylethyl)phenyl)amido)(2-isopropylphe-
  nyl)(α-naphthalen-2-diyl(6-pyridin-2-diyl)methane)]haf-
  nium dichloride;
[N-(2,6-di(1-methylethyl)phenyl)amido)(phenanthren-5-yl)
  (α-naphthalen-2-diyl(6-pyridin-2-diyl)methane)]hafnium
  dimethyl;
[N-(2,6-di(1-methylethyl)phenyl)amido)(phenanthren-5-yl)
  (α-naphthalen-2-diyl(6-pyridin-2-diyl)methane)]hafnium
  di(N,N-dimethylamido); and
[N-(2,6-di(1-methylethyl)phenyl)amido)(phenanthren-5-yl)
  (α-naphthalen-2-diyl(6-pyridin-2-diyl)methane)]hafnium
  dichloride.

Under the reaction conditions used to prepare the metal complexes used in the present disclosure, the hydrogen of the 2-position of the α-naphthalene group substituted at the 6-position of the pyridin-2-yl group is subject to elimination, thereby uniquely forming metal complexes wherein the metal is covalently bonded to both the resulting amide group and to the 2-position of the α-naphthalenyl group, as well as stabilized by coordination to the pyridinyl nitrogen atom through the electron pair of the nitrogen atom.

Additional suitable metal complexes of polyvalent Lewis bases for use herein include compounds corresponding to the formula:

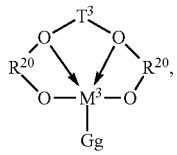

wherein:
R$^{20}$ is an aromatic or inertly substituted aromatic group containing from 5 to 20 atoms not counting hydrogen, or a polyvalent derivative thereof;
T$^3$ is a hydrocarbylene or hydrocarbyl silane group having from 1 to 20 atoms not counting hydrogen, or an inertly substituted derivative thereof;
M$^3$ is a Group 4 metal, preferably zirconium or hafnium;
G is an anionic, neutral or dianionic ligand group; preferably a halide, hydrocarbyl, silane, trihydrocarbylsilylhydrocarbyl, trihydrocarbylsilyl, or dihydrocarbylamide group having up to 20 atoms not counting hydrogen;
g is a number from 1 to 5 indicating the number of such G groups; and bonds and electron donative interactions are represented by lines and arrows respectively.

Illustratively, such complexes correspond to the formula:

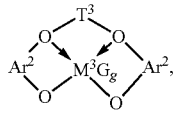

wherein:
T$^3$ is a divalent bridging group of from 2 to 20 atoms not counting hydrogen, preferably a substituted or unsubstituted, C3-6 alkylene group;

and Ar$^2$ independently at each occurrence is an arylene or an alkyl- or aryl-substituted arylene group of from 6 to 20 atoms not counting hydrogen;
M$^3$ is a Group 4 metal, preferably hafnium or zirconium;
G independently at each occurrence is an anionic, neutral or dianionic ligand group;
g is a number from 1 to 5 indicating the number of such X groups; and electron donative interactions are represented by arrows.

Suitable examples of metal complexes of foregoing formula include the following compounds

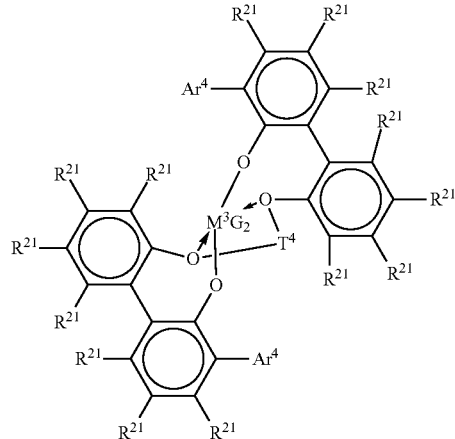

where M$^3$ is Hf or Zr;
Ar$^4$ is C$_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and
T$^4$ independently at each occurrence comprises a C$_{3-6}$ alkylene group, a C$_{3-6}$ cycloalkylene group, or an inertly substituted derivative thereof;
R$^{21}$ independently at each occurrence is hydrogen, halo, hydrocarbyl, trihydrocarbylsilyl, or trihydrocarbylsilylhydrocarbyl of up to 50 atoms not counting hydrogen; and
G, independently at each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Suitable compounds are compounds of the formulas:

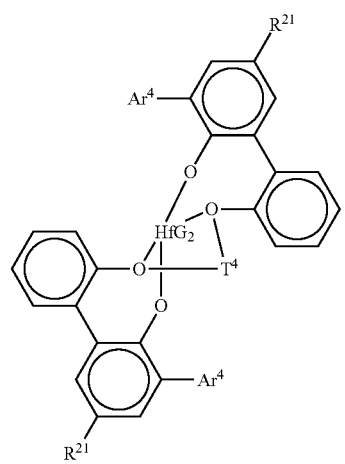

wherein Ar⁴ is 3,5-di(isopropyl)phenyl, 3,5-di(isobutyl)phenyl, dibenzo-1H-pyrrole-1-yl, or anthracen-5-yl,
$R^{21}$ is hydrogen, halo, or C1-4 alkyl, especially methyl
$T^4$ is propan-1,3-diyl or butan-1,4-diyl, and
G is chloro, methyl or benzyl.

An exemplary metal complex of the foregoing formula is:

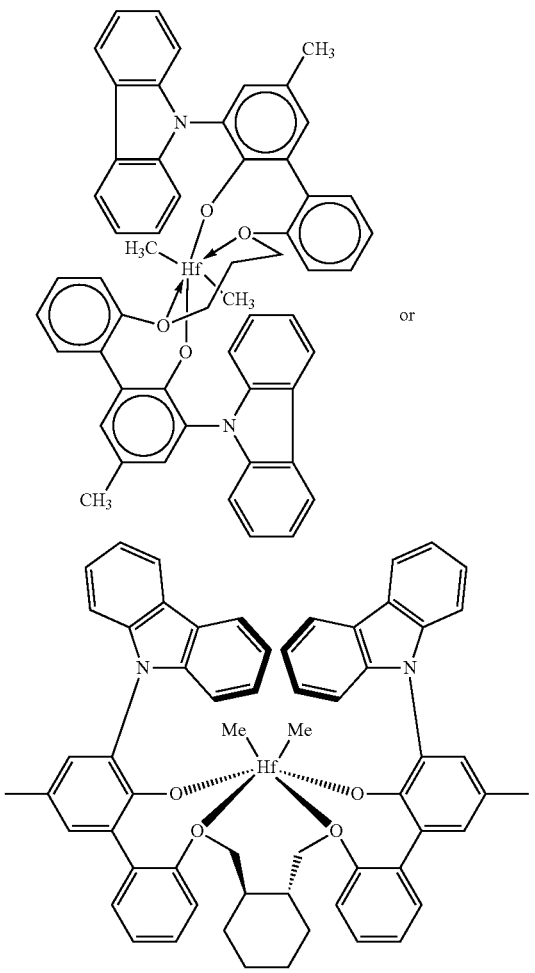

or

Suitable metal complexes for use according to the present disclosure further include compounds corresponding to the formula:

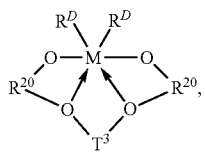

where:
M is zirconium or hafnium;
$R^{20}$ independently at each occurrence is a divalent aromatic or inertly substituted aromatic group containing from 5 to 20 atoms not counting hydrogen;
$T^3$ is a divalent hydrocarbon or silane group having from 3 to 20 atoms not counting hydrogen, or an inertly substituted derivative thereof; and
$R^D$ independently at each occurrence is a monovalent ligand group of from 1 to 20 atoms, not counting hydrogen, or two $R^D$ groups together are a divalent ligand group of from 1 to 20 atoms, not counting hydrogen.

Such complexes may correspond to the formula:

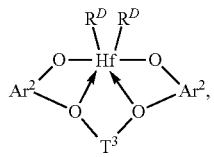

wherein:
$Ar^2$ independently at each occurrence is an arylene or an alkyl-, aryl-, alkoxy- or amino-substituted arylene group of from 6 to 20 atoms not counting hydrogen or any atoms of any substituent;
$T^3$ is a divalent hydrocarbon bridging group of from 3 to 20 atoms not counting hydrogen, preferably a divalent substituted or unsubstituted $C_{3-6}$ aliphatic, cycloaliphatic, or bis(alkylene)-substituted cycloaliphatic group having at least 3 carbon atoms separating oxygen atoms; and
$R^D$ independently at each occurrence is a monovalent ligand group of from 1 to 20 atoms, not counting hydrogen, or two $R^D$ groups together are a divalent ligand group of from 1 to 40 atoms, not counting hydrogen.

Further examples of metal complexes suitable for use herein include compounds of the formula:

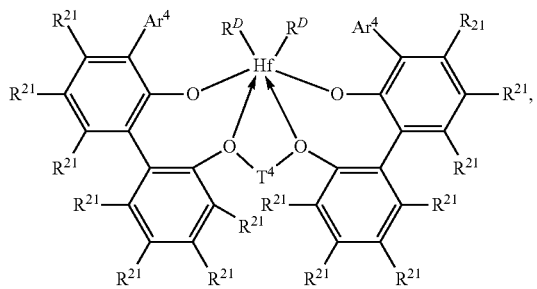

where
$Ar^4$ independently at each occurrence is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;
$T^4$ independently at each occurrence is a propylene-1,3-diyl group, a bis(alkylene)cyclohexan-1,2-diyl group, or an inertly substituted derivative thereof substituted with from 1 to 5 alkyl, aryl or aralkyl substituents having up to 20 carbons each;
$R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen; and
$R^D$, independently at each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

Exemplary metal complexes are compounds of the formula:

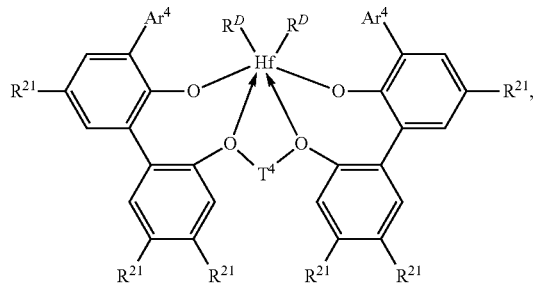

where, Ar⁴, independently at each occurrence, is 3,5-di(isopropyl)phenyl, 3,5-di(isobutyl)phenyl, dibenzo-1H-pyrrole-1-yl, or anthracen-5-yl, $R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen;

$T^4$ is propan-1,3-diyl or bis(methylene)cyclohexan-1,2-diyl; and $R^D$, independently at each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

Suitable metal complexes according to the present disclosure correspond to the formulas:

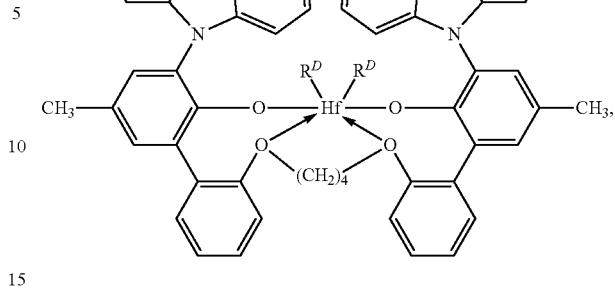

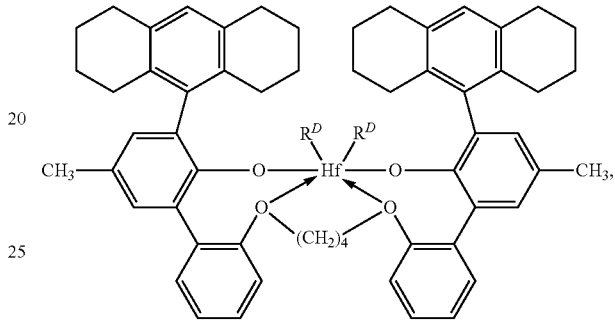

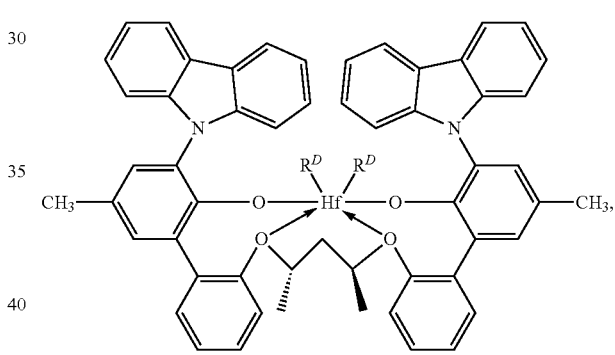

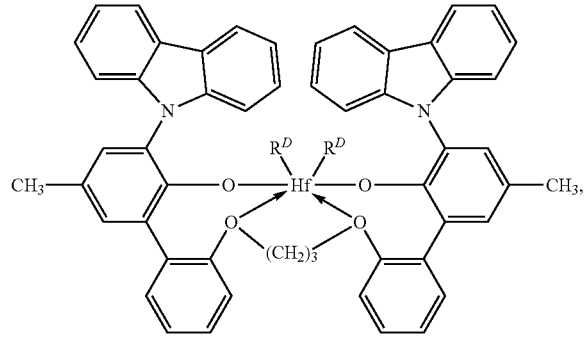

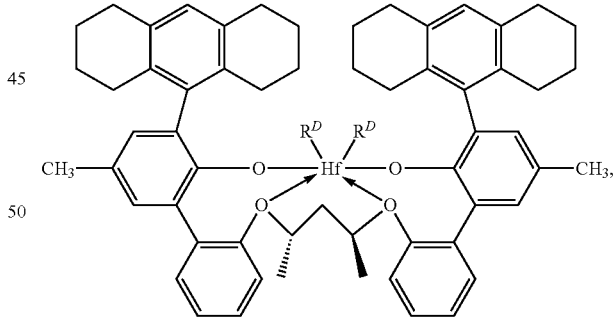

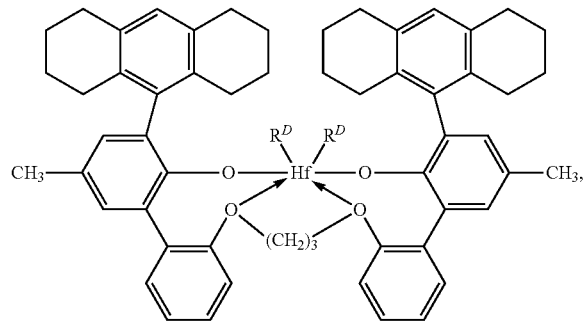

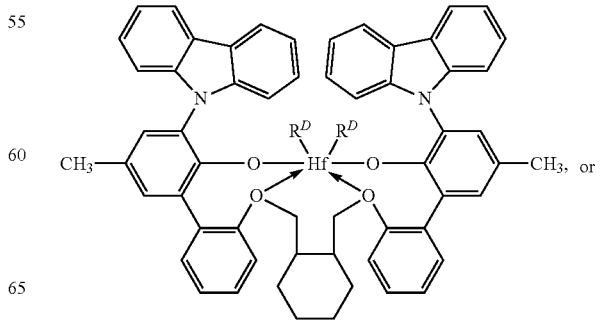

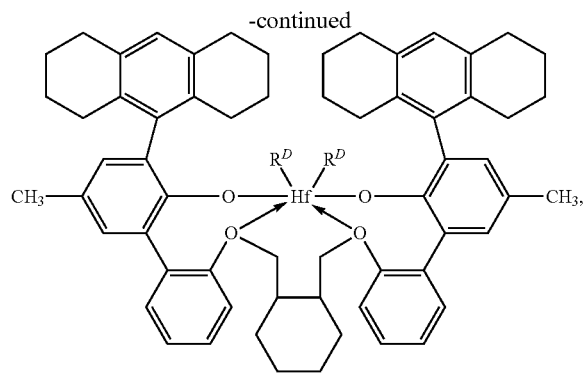

wherein, $R^D$ independently at each occurrence is chloro, methyl or benzyl.

Specific examples of suitable metal complexes are the following compounds:
A) bis((2-oxoyl-3-(1,2,3,4,6,7,8,9-octahydroanthracen-5-yl)-5-(methyl)phenyl)-2-phenoxy)-1,3-propanediylhafnium (IV) dimethyl,
bis((2-oxoyl-3-(1,2,3,4,6,7,8,9-octahydroanthracen-5-yl)-5-(methyl)phenyl)-2-phenoxy)-1,3-propanediylhafnium (IV) dichloride,
bis((2-oxoyl-3-(1,2,3,4,6,7,8,9-octahydroanthracen-5-yl)-5-(methyl)phenyl)-2-phenoxy)-1,3-propanediylhafnium (IV) dibenzyl,
bis((2-oxoyl-3-(dibenzo-1H-pyrrole-1-yl)-5-(methyl)phenyl)-2-phenoxy)-1,3-propanediylhafnium (IV) dimethyl,
bis((2-oxoyl-3-(dibenzo-1H-pyrrole-1-yl)-5-(methyl)phenyl)-2-phenoxy)-1,3-propanediylhafnium (IV) dichloride,
bis((2-oxoyl-3-(dibenzo-1H-pyrrole-1-yl)-5-(methyl)phenyl)-2-phenoxy)-1,3-propanediylhafnium (IV) dibenzyl,
B) bis((2-oxoyl-3-(1,2,3,4,6,7,8,9-octahydroanthracen-5-yl)-5-(methyl)phenyl)-2-phenoxymethyl)-1,4-butanediylhafnium (IV) dimethyl,
bis((2-oxoyl-3-(1,2,3,4,6,7,8,9-octahydroanthracen-5-yl)-5-(methyl)phenyl)-2-phenoxymethyl)-1,4-butanediylhafnium (IV) dichloride,
bis((2-oxoyl-3-(1,2,3,4,6,7,8,9-octahydroanthracen-5-yl)-5-(methyl)phenyl)-2-phenoxymethyl)-1,4-butanediylhafnium (IV) dibenzyl,
bis((2-oxoyl-3-(dibenzo-1H-pyrrole-1-yl)-5-(methyl)phenyl)-2-phenoxymethyl)-1,4-butanediylhafnium (IV) dimethyl,
bis((2-oxoyl-3-(dibenzo-1H-pyrrole-1-yl)-5-(methyl)phenyl)-2-phenoxymethyl)-1,4-butanediylhafnium (IV) dichloride,
bis((2-oxoyl-3-(dibenzo-1H-pyrrole-1-yl)-5-(methyl)phenyl)-2-phenoxymethyl)-1,4-butanediylhafnium (IV) dibenzyl,
C) bis((2-oxoyl-3-(1,2,3,4,6,7,8,9-octahydroanthracen-5-yl)-5-(methyl)phenyl)-2-phenoxy)-2,4-pentanediylhafnium (IV) dimethyl,
bis((2-oxoyl-3-(1,2,3,4,6,7,8,9-octahydroanthracen-5-yl)-5-(methyl)phenyl)-2-phenoxy)-2,4-pentanediylhafnium (IV) dichloride,
bis((2-oxoyl-3-(1,2,3,4,6,7,8,9-octahydroanthracen-5-yl)-5-(methyl)phenyl)-2-phenoxy)-2,4-pentanediylhafnium (IV) dibenzyl,
bis((2-oxoyl-3-(dibenzo-1H-pyrrole-1-yl)-5-(methyl)phenyl)-2-phenoxy)-2,4-pentanediylhafnium (IV) dimethyl,
bis((2-oxoyl-3-(dibenzo-1H-pyrrole-1-yl)-5-(methyl)phenyl)-2-phenoxy)-2,4-pentanediylhafnium (IV) dichloride,
bis((2-oxoyl-3-(dibenzo-1H-pyrrole-1-yl)-5-(methyl)phenyl)-2-phenoxy)-2,4-pentanediylhafnium (IV) dibenzyl,
D) bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dimethyl,
bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dichloride,
bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dibenzyl,
bis((2-oxoyl-3-(dibenzo-1H-pyrrole-1-yl)-5-(methyl)phenyl)-2-phenoxymethyl)-methylenetrans-1,2-cyclohexanediylhafnium (IV) dimethyl,
bis((2-oxoyl-3-(dibenzo-1H-pyrrole-1-yl)-5-(methyl)phenyl)-2-phenoxymethyl)-methylenetrans-1,2-cyclohexanediylhafnium (IV) dichloride, and
bis((2-oxoyl-3-(dibenzo-1H-pyrrole-1-yl)-5-(methyl)phenyl)-2-phenoxymethyl)-methylenetrans-1,2-cyclohexanediylhafnium (IV) dibenzyl.

The foregoing metal complexes may be conveniently prepared by standard metallation and ligand exchange procedures involving a source of the transition metal and a neutral polyfunctional ligand source. The techniques employed are the same as or analogous to those disclosed in U.S. Pat. No. 6,827,976 and US2004/0010103, and elsewhere.

The metal complex is activated to form the active catalyst composition by combination with the cocatalyst. The activation may occur prior to addition of the catalyst composition to the reactor with or without the presence of other components of the reaction mixture, or in situ through separate addition of the metal complex and activating cocatalyst to the reactor.

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, WO 02/38628, WO 03/40195, and U.S. Ser. No. 04/022,0050.

Catalysts having high comonomer incorporation properties are also known to reincorporate in situ prepared long chain olefins resulting incidentally during the polymerization through p-hydride elimination and chain termination of growing polymer, or other process. The concentration of such long chain olefins is particularly enhanced by use of continuous solution polymerization conditions at high conversions, especially ethylene conversions of 95 percent or greater, more preferably at ethylene conversions of 97 percent or greater. Under such conditions a small but detectable quantity of olefin terminated polymer may be reincorporated into a growing polymer chain, resulting in the formation of long chain branches, that is, branches of a carbon length greater than would result from other deliberately added comonomer. Moreover, such chains reflect the presence of other comonomers present in the reaction mixture. That is, the chains may include short chain or long chain branching as well, depending on the comonomer composition of the reaction mixture. Long chain branching of olefin polymers is further described in U.S. Pat. Nos. 5,272,236, 5,278,272, and 5,665,800.

Alternatively, branching, including hyper-branching, may be induced in a particular segment of the present multi-block copolymers by the use of specific catalysts known to result in "chain-walking" in the resulting polymer. For example, certain homogeneous bridged bis indenyl- or partially hydrogenated bis indenyl-zirconium catalysts, disclosed by Kaminski, et al., *J. Mol. Catal. A: Chemical.* 102 (1995) 59-65; Zambelli, et al., *Macromolecules,* 1988, 21, 617-622; or Dias, et al., *L Mol. Catal. A: Chemical,* 185 (2002) 57-64 may be used to prepare branched copolymers from single monomers, including ethylene. Higher transition metal catalysts, especially nickel and palladium catalysts are also known to lead to hyper-branched polymers (the branches of which are also branched) as disclosed in Brookhart, et al., *J. Am. Chem. Soc.,* 1995, 117, 64145-6415.

In one embodiment of the invention, the presence of such branching (long chain branching, 1,3-addition, or hyper-branching) in the polymers of the invention can be confined to only the blocks or segments resulting from activity of the first olefin polymerization procatalyst (A). Accordingly, in one embodiment of the disclosure a multi-block copolymer containing blocks or segments differing in the presence of such branching in combination with other segments or blocks substantially lacking such branching (especially high density or highly crystalline polymer blocks), can be produced from a single monomer containing reaction mixture, that is, without the addition of a deliberately added comonomer. Highly preferably, in a specific embodiment of the disclosure, a multi-block copolymer comprising alternating unbranched, ethylene homopolymer segments and branched polyethylene segments, especially ethylene/propylene copolymer segments, may be prepared from an initial reaction mixture consisting essentially of ethylene as the addition polymerizable monomer. The presence of such branching in the multi-block copolymers of the invention can be detected by certain physical properties of the resulting copolymers, such as reduced surface imperfections during melt extrusion (reduced melt fracture), reduced glass transition temperature, Tg, for the amorphous segments compared to a non-branched polymer segment, and/or the presence of 1,3-addition sequences or hyper-branching as detected by NMR techniques. The quantity of the foregoing types of branching present in the polymers of the invention (as a portion of the blocks or segments containing the same), is normally in the range from 0.01 to 10 branches per 1,000 carbons.

Exemplary procatalysts that fall within the scope of the first olefin polymerization procatalyst (A) of the present disclosure include but are not limited to Procatalysts (A1)-(A7), as listed below.

Procatalyst (A1): [N-(2,6-di(1-methylethyl)phenyl)amido)(2-isopropylphenyl)(α-naphthalen-2-diyl(6-pyridin-2-diyl)methane)]hafnium dimethyl]prepared according to the teachings of WO 03/40195 and WO 04/24740 as well as methods known in the art.

(A1)

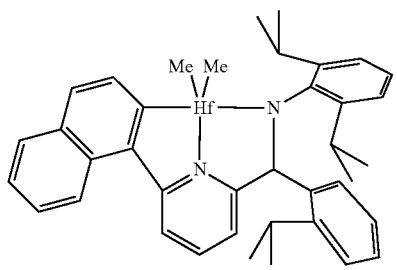

Procatalyst (A2): (E)-((2,6-diisopropylphenyl)(2-methyl-3-(octylimino)butan-2-yl)amino)trimethyl hafnium prepared according to methods known in the art.

(A2)

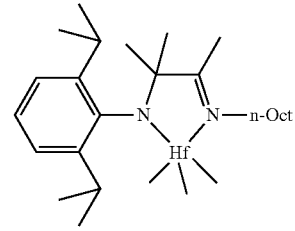

Procatalyst(A3): [[2',2'''-[1,2-cyclohexanediylbis(methyleneoxy-κO)]bis[3-(9H-carbazol-9-yl)-5-methyl[1,1'-biphenyl]-2-olato-κO]](2-)]dimethyl hafnium prepared according to methods known in the art.

(A3)

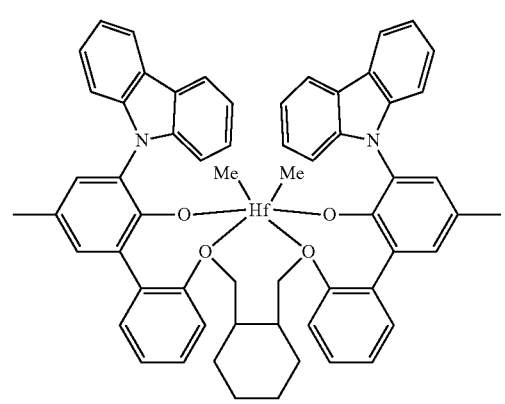

Procatalyst (A4): [[6',6'''-[1,4-butanediylbis(oxy-κO)]bis[3-(9H-carbazol-9-yl)-3'-fluoro-5-methyl-[1,1'-biphenyl]-2-olato-κO]](2-)]-dimethyl hafnium prepared according to methods known in the art.

(A4)

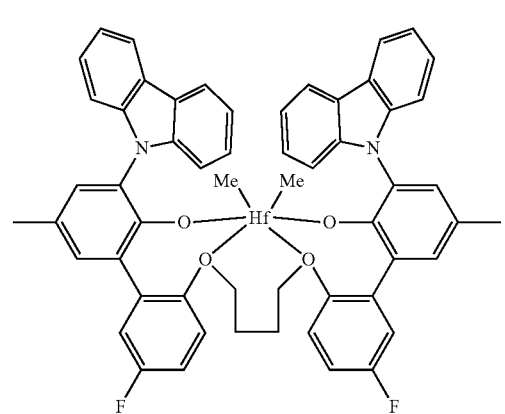

Procatalyst(A5): [[6',6'''-[1,4-butanediylbis(oxy-κO)]bis[3-(9H-carbazol-9-yl)-3'-fluoro-5-octyl-[1,1'-biphenyl]-2-olato-κO]](2-)]-dimethyl hafnium prepared according to methods known in the art.

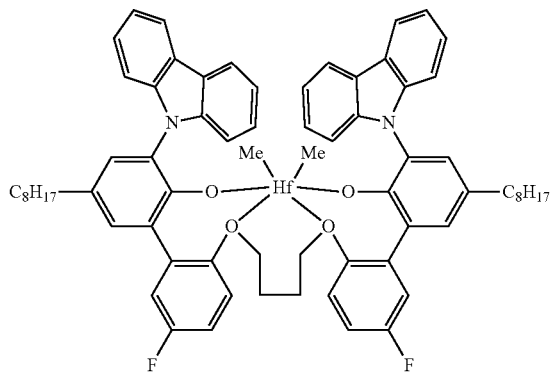

Procatalyst (A6): [[6',6'''-[1,4-butanediylbis(oxy-κO)]bis[3-(9H-carbazol-9-yl)-3'-fluoro-5-(butyldimethylsilyl)-[1,1'-biphenyl]-2-olato-κO]](2-)]-dimethyl hafnium prepared according to methods known in the art.

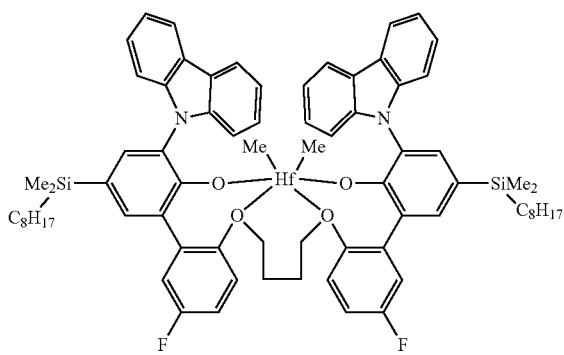

Procatalyst (A7): (N—((6E)-6-(Butylimino-κN)-1-cyclohexen-1-yl)-2,6-bis(1-methylethyl)benzenaminato-κN) trimethyl-hafnium prepared according to the disclosures of WO2010/022228 as well as methods known in the art.

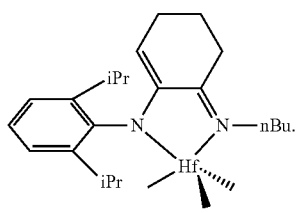

Second Olefin Polymerization Catalyst (B)

The second olefin polymerization procatalyst (B) of the present disclosure comprises a metal-ligand complex of Formula (I):

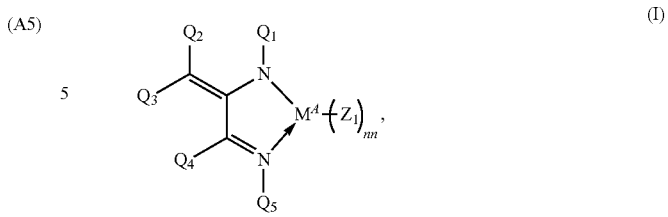

wherein:

each $Z^1$ independently is $(C_1-C_{40})$hydrocarbon, $(C_1-C_{40})$heterohydrocarbon, $(C_1-C_{40})$hydrocarbyl, $(C_1-C_{40})$heterohydrocarbyl, $Si(R^{C1})_3$, $Ge(R^{C1})_3$, $P(R^{C1})_2$, $N(R^{C1})_2$, $OR^{C1}$, $SR^{C1}$, CN, $CF_3$, $R^{C1}S(O)$—, $R^{C1}S(O)_2$—, $(R^{C1})_2C=N$—, $R^{C1}C(O)O$—, $R^{C1}OC(O)$—, $R^{C1}C(O)N(R)$—, $(R^{C1})_2NC(O)$—, halogen atom, or hydrogen atom;

each $R^{C1}$ independently is $(C_1-C_{30})$hydrocarbyl or $(C_1-C_{30})$heterohydrocarbyl;

each $M^A$ independently is a metal of any one of Groups 3 to 6 or Groups 7 to 9 of a Periodic Table of the Elements, the metal being in a formal oxidation state of +2, +3, +4, +5, or +6;

nn is an integer of 1 or 2;

each $Q^1$ independently is hydrogen, $(C_1-C_{40})$hydrocarbyl, or $(C_1-C_{40})$heterohydrocarbyl;

each of $Q^2$, $Q^3$, and $Q^4$ independently is hydrogen, $(C_1-C_{40})$hydrocarbyl, $(C_1-C_{40})$hydrocarbylO—, $(C_1-C_{40})$hydrocarbylS—, $(C_1-C_{40})$hydrocarbylS(O)—, $(C_1-C_{40})$hydrocarbylS(O)_2$—, $((C_1-C_{40})$hydrocarbyl$)_2$N—, $((C_1-C_{40})$hydrocarbyl$)_2$P—, or $(C_1-C_{40})$heterohydrocarbyl;

each $Q^5$ independently is $(C_1-C_{40})$hydrocarbyl or $(C_1-C_{40})$heterohydrocarbyl;

wherein $Q^1$ and $Q^2$, $Q^2$ and $Q^3$, $Q^3$ and $Q^4$, and $Q^4$ and $Q^5$ optionally are taken together to form a $(C_1-C_{40})$hydrocarbylene or $(C_1-C_{40})$heterohydrocarbylene, or any three or four of $Q^1$ to $Q^5$ optionally are taken together to form a respective trivalent or tetravalent analog of $(C_1-C_{40})$hydrocarbylene or $(C_1-C_{40})$heterohydrocarbylene, and the remainder of $Q^1$ to $Q^5$, are as defined above;

each of the hydrocarbyl, heterohydrocarbyl, $Si(R^{C1})_3$, $Ge(R^{C1})_3$, $P(R^{C1})_2$, $N(R^{C1})_2$, $OR^{C1}$, $SR^{C1}$, $R^{C1}S(O)$—, $R^{C1}S(O)_2$—, $(R^{C1})_2C=N$—, $R^{C1}C(O)O$—, $R^{C1}OC(O)$—, $R^{C1}C(O)N(R)$—, $(R^{C1})_2NC(O)$—, hydrocarbylene, and heterohydrocarbylene groups independently is unsubstituted or substituted with one or more $R^S$ substituents; and each $R^S$ independently is a halogen atom, polyfluoro substitution, perfluoro substitution, unsubstituted $(C_1-C_{18})$ alkyl, $F_3C$—, $FCH_2O$—, $F_2HCO$—, $F_3CO$—, oxo (i.e., =O), $R_3Si$—, $R_3Ge$—, $RO$—, $RS$—, $RS(O)$—, $RS(O)_2$—, $R_2P$—, $R_2N$—, $R_2C=N$—, $NC$—, $RC(O)O$—, $ROC(O)$—, $RC(O)N(R)$—, or $R_2NC(O)$—, or two of the $R^S$ are taken together to form an unsubstituted $(C_1-C_{18})$alkylene, wherein each R independently is an unsubstituted $(C_1-C_{18})$alkyl; and optionally, $R^{C1}$ or $R^S$ may have an additional interaction with $M^A$.

In some embodiments, $M^A$ is a metal of any one of Groups 3 to 6. In other embodiments, $M^A$ is a metal of any one of Groups 7 to 9. In some embodiments, $M^A$ is a metal of Group 3 (e.g., Sc, Y, La, etc.), including all the lanthanides, in a +3 formal oxidation state.

In certain embodiments, the second olefin polymerization procatalyst (B) is the hard block/segment catalyst (i.e., low comonomer incorporator) of the olefin block copolymers of the present disclosure. In some embodiments, the metal-ligand complex of formula (I) is catalytically active in its cationic state. In other words, the metal-ligand complex of formula (I) becomes an active catalyst when cationic and requires an activator (co-catalyst). In certain embodiments, the second olefin polymerization procatalyst (B) is active when neutral and requires no activator (cocatalyst) in order to become an active catalyst. Neutral Group III catalysts described in this disclosure do not require an activator to polymerize olefins.

In certain embodiments, Z1 is $(C_1-C_{40})$hydrocarbyl, $(C_1-C_{40})$heterohydrocarbyl, $Si(R^{C1})_3$, or a hydrido group. In certain embodiments, Z1 is a substituted benzyl or heteroarylbenzyl. In certain embodiments, Z1 is selected from the group consisting of

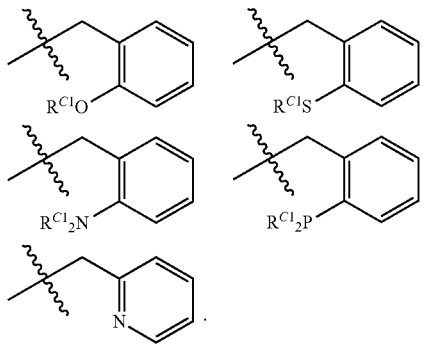

The metal ligand complex of Formula (I) above, and all specific embodiments thereof herein, is intended to include every possible stereoisomer, including coordination isomers, thereof.

In some embodiments $M^A$ is a metal of Group 3. Group 3 metals (symbol), including lanthanoids and actinoids, useful in the present disclosure are scandium (Sc), yttrium (Y), the lanthanides (sometimes called lanthanoids), especially lanthanum (La), cerium (Ce), praseodymium (Pr), neodymium (Nd), promethium (Pm), samarium (Sm), europium (Eu), gadolinium (Gd), terbium (Tb), dysprosium (Dy), holium (Ho), erbium (Er), thulium (Tm), ytterbium (Yb), and lutetium (Lu), and the stable actinides (sometimes called actinoids), especially stable isotopes of actinium (Ac), thorium (Th), and uranium (U). Unstable actinides such as protactinium (Pa), neptunium (Np), plutonium (Pu), americium (Am), curium (Cm), berkelium (Bk), californium (Cf), einsteinium (Es) fermium (Fm), mendelevium (Md), nobelium (No), and lawrencium (Lr) are excluded from the actinides useful in the present disclosure. Preferred Group 3 metals are Sc and Y. In other embodiments $M^A$ is a metal of Group 4. Preferred Group 4 metals are those in a formal oxidation state of +3 or +4, more preferably +4. For purposes of the present disclosure, rutherfordium (Rf) is excluded from the Group 4 metals useful in the present disclosure. In still other embodiments $M^A$ is a metal of Group 5. Group 5 metals useful in the present disclosure are vanadium (V), niobium (Nb), and tantalum (Ta). For purposes of the present disclosure, dubnium (Db) is excluded from the Group 5 metals useful in the present disclosure. In still other embodiments $M^A$ is a metal of Group 6. Group 6 metals useful in the present disclosure are chromium (Cr), molybdenum (Mo), and tungsten (W). For purposes of the present disclosure, seaborgium (Sg) is excluded from the Group 6 metals useful in the present disclosure. In still other embodiments $M^A$ is a metal of Group 7. Group 7 metals useful in the present disclosure are manganese (Mn), technetium (Tc), and rhenium (Re), preferably Mn. For purposes of the present disclosure, bohrium is excluded from Group 7 metals useful in the present disclosure. In still other embodiments $M^A$ is a metal of Group 8. Group 8 metals useful in the present disclosure are iron (Fe) and ruthenium (Ru). For purposes of the present disclosure, osmium (Os) and hassium (Hs) are excluded from Group 8 metals useful in the present disclosure. In still other embodiments $M^A$ is a metal of Group 9. Group 9 metals useful in the present disclosure are cobalt (Co), rhodium (Rh), and iridium (Ir), preferably Co or Rh. For purposes of the present disclosure, meitnerium is excluded from Group 9 metals useful in the present disclosure.

When used to describe a chemical group (e.g., $(C_1-C_{40})$alkyl), the parenthetical expression of the form "$(C_x-C_y)$," means that the unsubstituted version of the chemical group comprises from a number x carbon atoms to a number y carbon atoms, wherein each x and y independently is an integer as described for the chemical group. Thus, for example, an unsubstituted $(C_1-C_{40})$alkyl contains from 1 to 40 carbon atoms. When one or more substituents on the chemical group contain one or more carbon atoms, the substituted $(C_x-C_y)$ chemical group may or may not comprise more than y total carbon atoms; i.e., the maximum total number of carbon atoms of the substituted $(C_x-C_y)$ chemical group would be equal to y plus the sum of the number of carbon atoms of each of the substituent(s). Any atom of a chemical group that is not specified herein is understood to be a hydrogen atom.

In some embodiments, the metal-ligand complex of formula (I) independently contains one or more of the substituents $R^S$. Preferably there are not more than 20 $R^S$, more preferably not more than 10 $R^S$, and still more preferably not more than 5 $R^S$ in the compound. Where the compound of formula (I) contains two or more substituents $R^S$, each $R^S$ independently is bonded to a same or different substituted chemical group.

In some embodiments, at least one $R^S$ is polyfluoro or perfluoro. For present purposes "polyfluoro" and "perfluoro" each count as one $R^S$ substituent. The term "poly" as in "polyfluoro" means that two or more H, but not all H, bonded to carbon atoms of a corresponding unsubstituted chemical group are replaced by a fluoro in the substituted chemical group. The term "per" as in "perfluoro" means each H bonded to carbon atoms of a corresponding unsubstituted chemical group is replaced by a fluoro in the substituted chemical group.

As used herein, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon radical and diradical independently is aromatic or non-aromatic, saturated or unsaturated, straight chain or branched chain, cyclic (including mono- and poly-cyclic, fused and non-fused polycyclic) or acyclic, or a combination of two or more thereof; and each hydrocarbon radical and diradical is the same as or different from another hydrocarbon radical and diradical, respectively, and independently is unsubstituted or substituted by one or more $R^S$.

Preferably, a $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. More preferably, a $(C_1-C_{40})$ hydrocarbyl independently is an unsubstituted or substituted $(C_1-C_{20})$hydrocarbyl, e.g., $(C_1-C_{20})$alkyl, $(C_3-C_{20})$cycloalkyl, $(C_3-C_{10})$cycloalkyl-$(C_1-C_{10})$alkylene, $(C_6-C_{20})$aryl, or $(C_6-C_{18})$aryl-$(C_1-C_{10})$alkylene. Still more preferably, a $(C_1-$ $C_{40}$)hydrocarbyl independently is an unsubstituted or substituted ($C_1$-$C_{18}$)hydrocarbyl, e.g., ($C_1$-$C_{18}$)alkyl, ($C_3$-$C_{18}$)cycloalkyl, ($C_3$-$C_{12}$)cycloalkyl-($C_1$-$C_6$)alkylene, ($C_6$-$C_{18}$)aryl, or ($C_6$-$C_{12}$)aryl-($C_1$-$C_6$)alkylene. Preferably, any ($C_3$-$C_{18}$)cycloalkyl independently is an unsubstituted or substituted ($C_3$-$C_{10}$)cycloalkyl.

The term "($C_1$-$C_{40}$)alkyl" means a saturated straight or branched hydrocarbon radical of from 1 to 40 carbon atoms that is unsubstituted or substituted by one or more $R^S$. Examples of unsubstituted ($C_1$-$C_{40}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and ($C_{45}$)alkyl. Preferably, each ($C_1$-$C_5$)alkyl independently is methyl, trifluoromethyl, ethyl, 1-propyl, or 2-methylethyl.

The term "($C_1$-$C_{20}$)alkylene" means a saturated straight or branched chain diradical of from 1 to 20 carbon atoms that is unsubstituted or substituted by one or more $R^S$. Preferably, ($C_1$-$C_{20}$)alkylene, together with atoms of formula (I) through which the ($C_1$-$C_{20}$)alkylene is bonded, comprise a 5- or 6-membered ring. Examples of unsubstituted ($C_1$-$C_{20}$)alkylene are unsubstituted ($C_1$-$C_{10}$)alkylene, including unsubstituted 1,2-($C_1$-$C_{10}$)alkylene; —$CH_2$—, —$CH_2CH_2$—, —$(CH_2)_3$—,

—$CH_2CHCH_3$,

—$(CH_2)_4$—, —$(CH_2)_5$—, —$(CH_2)_6$—, —$(CH_2)_7$—, —$(CH_2)_8$—, and —$(CH_2)_4C(H)(CH_3)$—. Examples of substituted ($C_1$-$C_{20}$)alkylene are substituted ($C_1$-$C_{10}$)alkylene, —$CF_2$—, —$C(O)$—, and —$(CH_2)_{14}C(CH_3)_2(CH_2)_5$— (i.e., a 6,6-dimethyl substituted normal-1,20-eicosylene).

The term "($C_6$-$C_{40}$)aryl" means an unsubstituted or substituted (by one or more $R^S$) mono-, bi- or tricyclic aromatic hydrocarbon radical of from 6 to 40 total carbon atoms, of which at least from 6 to 14 carbon atoms are ring carbon atoms, and the mono-, bi- or tricyclic radical comprises 1, 2 or 3 rings (first, second, and third rings, respectively), wherein any second or third ring independently is fused or non-fused to a first ring or each other, and the first ring is aromatic and, preferably, at least one of any second or third rings is aromatic. Examples of unsubstituted ($C_6$-$C_{40}$)aryl are unsubstituted ($C_6$-$C_{20}$)aryl; unsubstituted ($C_6$-$C_{18}$)aryl; 2-($C_1$-$C_5$)alkyl-phenyl; 2,4-bis($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{40}$)aryl are substituted ($C_6$-$C_{20}$)aryl; substituted ($C_6$-$C_{18}$)aryl; 2,4-bis [($C_{20}$)alkyl]-phenyl; polyfluorophenyl; pentafluorophenyl; and fluoren-9-one-1-yl.

The term "($C_3$-$C_{40}$)cycloalkyl" means a saturated cyclic hydrocarbon radical of from 3 to 40 carbon atoms that is unsubstituted or substituted by one or more $R^S$. Examples of unsubstituted ($C_3$-$C_{40}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, cyclopentanon-2-yl, and 1-fluorocyclohexyl.

Examples of ($C_1$-$C_{40}$)hydrocarbylene are unsubstituted or substituted diradical analogs of the ($C_6$-$C_{40}$)aryl, ($C_3$-$C_{40}$)cycloalkyl, and ($C_2$-$C_{40}$)alkyl. In some embodiments, the diradicals are on adjacent carbon atoms (i.e., 1,2-diradicals), or spaced apart by one, two, or more intervening carbon atoms (e.g., respective 1,3-diradicals, 1,4-diradicals, etc.). Preferred is a 1,2-, 1,3-, 1,4-, or an alpha,omega-diradical (i.e., having maximum spacing between the radical carbons), more preferably a 1,2-diradical. More preferred are diradical analogs, especially 1,2-diradicals, of ($C_6$-$C_{40}$)aryl, ($C_3$-$C_{40}$)cycloalkyl, and ($C_2$-$C_{40}$)alkyl are ($C_6$-$C_{18}$)arylene, ($C_3$-$C_{20}$)cycloalkylene, and ($C_2$-$C_{20}$)alkylene, respectively.

The term "(C-$C_{40}$)heterohydrocarbyl" means a heterohydrocarbon radical of from 1 to 40 carbon atoms and one or more heteroatoms N (when comprising —N=); O; S; S(O); $S(O)_2$; $Si(R^{C1})_2$; $P(R^P)$; and $N(R^N)$, wherein independently each $R^{C1}$ is unsubstituted ($C_1$-$C_{18}$)hydrocarbyl, each $R^P$ is unsubstituted ($C_1$-$C_{18}$)hydrocarbyl; and each $R^N$ is unsubstituted ($C_1$-$C_{18}$)hydrocarbyl. The term "($C_1$-$C_{40}$)heterohydrocarbylene" means a heterohydrocarbon diradical of from 1 to 40 carbon atoms and one or more heteroatoms $Si(R^{C1})_2$, $P(R^P)$, $N(R^N)$, N, O, S, S(O), and $S(O)_2$ as defined above. The heterohydrocarbon radical and each of the heterohydrocarbon diradicals independently are on a carbon atom or heteroatom thereof. Each heterohydrocarbon radical and diradical independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each heterohydrocarbon is the same as or different from another heterohydrocarbon radical and diradical, respectively.

Preferably, a ($C_1$-$C_{40}$)heterohydrocarbyl independently is unsubstituted or substituted ($C_1$-$C_{40}$)heteroalkyl, ($C_2$-$C_{40}$)heterocycloalkyl, ($C_2$-$C_{40}$)heterocycloalkyl-($C_1$-$C_{20}$)alkylene, ($C_3$-$C_{40}$)cycloalkyl-($C_1$-$C_{20}$)heteroalkylene, ($C_2$-$C_{40}$)heterocycloalkyl-($C_1$-$C_{20}$)heteroalkylene, ($C_1$-$C_{40}$)heteroaryl, ($C_1$-$C_{20}$)heteroaryl-($C_1$-$C_{20}$)alkylene, ($C_6$-$C_{20}$)aryl-($C_1$-$C_{20}$)heteroalkylene, or ($C_1$-$C_{20}$)heteroaryl-($C_1$-$C_{20}$)heteroalkylene. More preferably, a ($C_1$-$C_{40}$)heterohydrocarbyl independently is unsubstituted or substituted ($C_1$-$C_{20}$)heterohydrocarbyl, e.g., ($C_1$-$C_{20}$)heteroalkyl, ($C_2$-$C_{20}$)heterocycloalkyl, ($C_2$-$C_{20}$)heterocycloalkyl-($C_1$-$C_{20}$)alkylene, ($C_3$-$C_{20}$)cycloalkyl-($C_1$-$C_{20}$)heteroalkylene, ($C_2$-$C_{20}$)heterocycloalkyl-($C_1$-$C_{20}$)heteroalkylene, ($C_1$-$C_{20}$)heteroaryl, ($C_1$-$C_{20}$)heteroaryl-($C_1$-$C_{20}$)alkylene, ($C_6$-$C_{20}$)aryl-($C_1$-$C_{20}$)heteroalkylene, or ($C_1$-$C_{20}$)heteroaryl-($C_1$-$C_{20}$)heteroalkylene. Still more preferably, a ($C_1$-$C_{40}$)heterohydrocarbyl independently is unsubstituted or substituted ($C_1$-$C_{18}$)heterohydrocarbyl, e.g., ($C_1$-$C_{18}$)heteroalkyl, ($C_2$-$C_{18}$)heterocycloalkyl, ($C_2$-$C_{12}$)heterocycloalkyl-($C_1$-$C_6$)alkylene, ($C_3$-$C_{12}$)cycloalkyl-($C_1$-$C_6$)heteroalkylene, ($C_2$-$C_{12}$)heterocycloalkyl-($C_1$-$C_6$)heteroalkylene, ($C_1$-$C_{12}$)heteroaryl, ($C_1$-$C_{12}$)heteroaryl-($C_1$-$C_6$)alkylene, ($C_6$-$C_{18}$)aryl-($C_1$-$C_6$)heteroalkylene, or ($C_1$-$C_{12}$)heteroaryl-($C_1$-$C_6$)heteroalkylene. Preferably, any ($C_2$-$C_{18}$)heterocycloalkyl independently is unsubstituted or substituted ($C_2$-$C_9$)heterocycloalkyl.

Examples of ($C_1$-$C_{40}$)heteroalkyl and ($C_1$-$C_{20}$)heteroalkylene are saturated straight or branched chain radical or diradical, respectively, of from 1 to 40 or 1 to 20 carbon atoms, respectively, and one or more of the heteroatoms $Si(R^{C1})_2$, $P(R^P)$, $N(R^N)$, N, O, S, S(O), and $S(O)_2$ as defined above, wherein the ($C_1$-$C_{40}$)heteroalkyl and ($C_1$-$C_{20}$)heteroalkylene independently are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thia-cyclononyl, and 2-azacyclodecyl.

Examples of unsubstituted $(C_1-C_{40})$heteroaryl are unsubstituted $(C_1-C_{20})$heteroaryl, unsubstituted $(C_1-C_{10})$heteroaryl, pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; tetrazol-5-yl; pyridine-2-yl; pyrimidin-2-yl; pyrazin-2-yl; indol-1-yl; benzimidazole-1-yl; quinolin-2-yl; and isoquinolin-1-yl.

The term "halo" means fluoro (F), chloro (Cl), bromo (Br), or iodo (I) radical. Preferably, halo is fluoro or chloro, more preferably fluoro.

Preferably, there are no O—O, S—S, or O—S bonds, other than O-S bonds in an S(O) or S(O)$_2$ diradical functional group, in the metal-ligand complex of formula (I).

Preferably, each substituted $(C_1-C_{40})$hydrocarbyl excludes and is different than unsubstituted or substituted $(C_1-C_{40})$heterohydrocarbyl (i.e., each substituted $(C_1-C_{40})$ hydrocarbyl is as defined in the first embodiment, wherein the substituted $(C_1-C_{40})$hydrocarbyl is not an unsubstituted or substituted $(C_1-C_{40})$heterohydrocarbyl); preferably, each substituted $(C_1-C_{40})$hydrocarbylene excludes and is different than unsubstituted or substituted $(C_1-C_{40})$heterohydrocarbylene; and more preferably a combination thereof.

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero)aromatic rings, if any.

Some embodiments contemplate a trivalent or tetravalent analog of a diradical group. As applied to the diradical group, the term "trivalent or tetravalent analog" respectively means a triradical or tetraradical that is formally derived by abstracting one or two hydrogen atoms, respectively, from the diradical group. Preferably, each abstracted hydrogen atom independently is taken from a C—H functionality. A trivalent analog is preferred over a tetravalent analog.

In some embodiments, at least one, or at least two, or all of $Q^1$ to $Q^5$ independently are unsubstituted (i.e., lack substituents $R^S$). In other embodiments, each substituent $R^S$ independently is a $(C_1-C_{10})$alkyl, and more preferably a $(C_1-C_5)$alkyl.

In other embodiments, the metal-ligand complex of formula (I) is as described in the first embodiment, except wherein one radical group (e.g., $(C_1-C_{40})$hydrocarbylC(O)O—, $(C_1-C_{40})$hydrocarbyl, and $(C_1-C_{40})$hydrocarbylene) is deleted from the definitions of any one of $Q^1$ to $Q^5$.

The metal-ligand complex of formula (I) may exist as an isolated crystal(s), optionally in substantially pure form (i.e., greater than 90%), or as a mixture with one or more other metal-ligand complexes of formula (I); in the form of a solvated adduct, optionally in a solvent, especially an organic liquid, preferably an aprotic solvent; in the form of a dimer, or in the form of a chelated derivative thereof, wherein the chelated derivative comprises the metal-ligand complex of formula (I) and a chelating agent. Preferably, the chelating agent is an organic Lewis base (e.g., an aprotic organic solvent such as tetrahydrofuran (THF) or an aprotic amine base such as triethylamine).

In some embodiments, a reducing agent is employed to produce lower oxidation state (e.g., +2) metal-ligand complexes of formula (I) from higher oxidation state (e.g., +4) metal-ligand complexes of formula (I). By the term "reducing agent" herein is meant a metal reducing agent or reducing agent compound which, under reducing conditions, causes the metal, $M^4$, to be reduced from a higher to a lower oxidation state (e.g., from a +6 formal oxidation state to a +4 formal oxidation state). Examples of suitable metal reducing agents are alkali metals, alkaline earth metals, aluminum and zinc, and alloys of alkali metals or alkaline earth metals such as sodium/mercury amalgam and sodium/potassium alloy. Examples of suitable reducing agent compounds are sodium naphthalenide, potassium graphite, lithium alkyls, lithium or potassium alkadienyls, and Grignard reagents (e.g., alkyl magnesium halides). Most preferred reducing agents are the alkali metals or alkaline earth metals, especially lithium and magnesium metal. Suitable techniques that may be adapted by an ordinarily skilled artisan for preparing the metal-ligand complexes of the present disclosure are known and preferably are derived from techniques taught, for example, in (U.S. Pat. Nos. 5,866,704; 5,959,047; and 6,268,444.

In some embodiments, the metal-ligand complex of formula (I) is in an isolated form, which means being substantially solvent-free, for example, contains 10 percent by weight or less of a total of any solvent(s) used in a preparation thereof and the metal-ligand complex of formula (I) being at least 70% by weight of the isolated form. Still more preferably, the metal-ligand complex of formula (I) is in an isolated and purified form (i.e., the metal-ligand complex of formula (I) being substantially solvent-free and comprising at least 80% by weight, more preferably at least 90% by weight, of the purified form. As used herein, percent by weight is based on the total weight of a form or mixture. Preferably, the weight percent of the metal-ligand complex of formula (I) in such mixtures is determined using 13-carbon or proton nuclear magnetic resonance ($^{13}$C- or $^1$H-NMR, respectively) spectroscopy.

The present disclosure further provides the second olefin polymerization procatalyst (B) described herein, except that the one or more catalysts comprise one or more of the following:

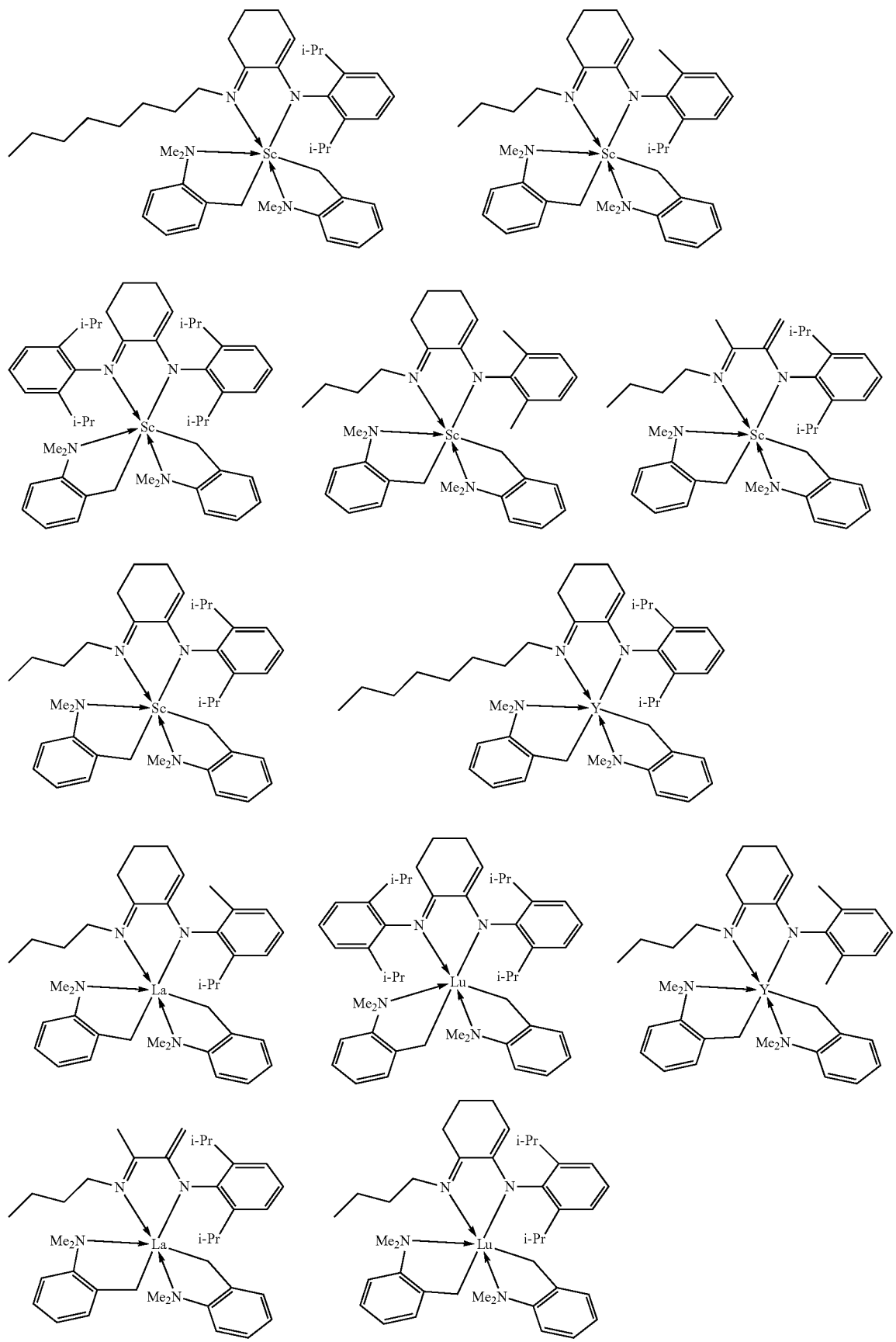

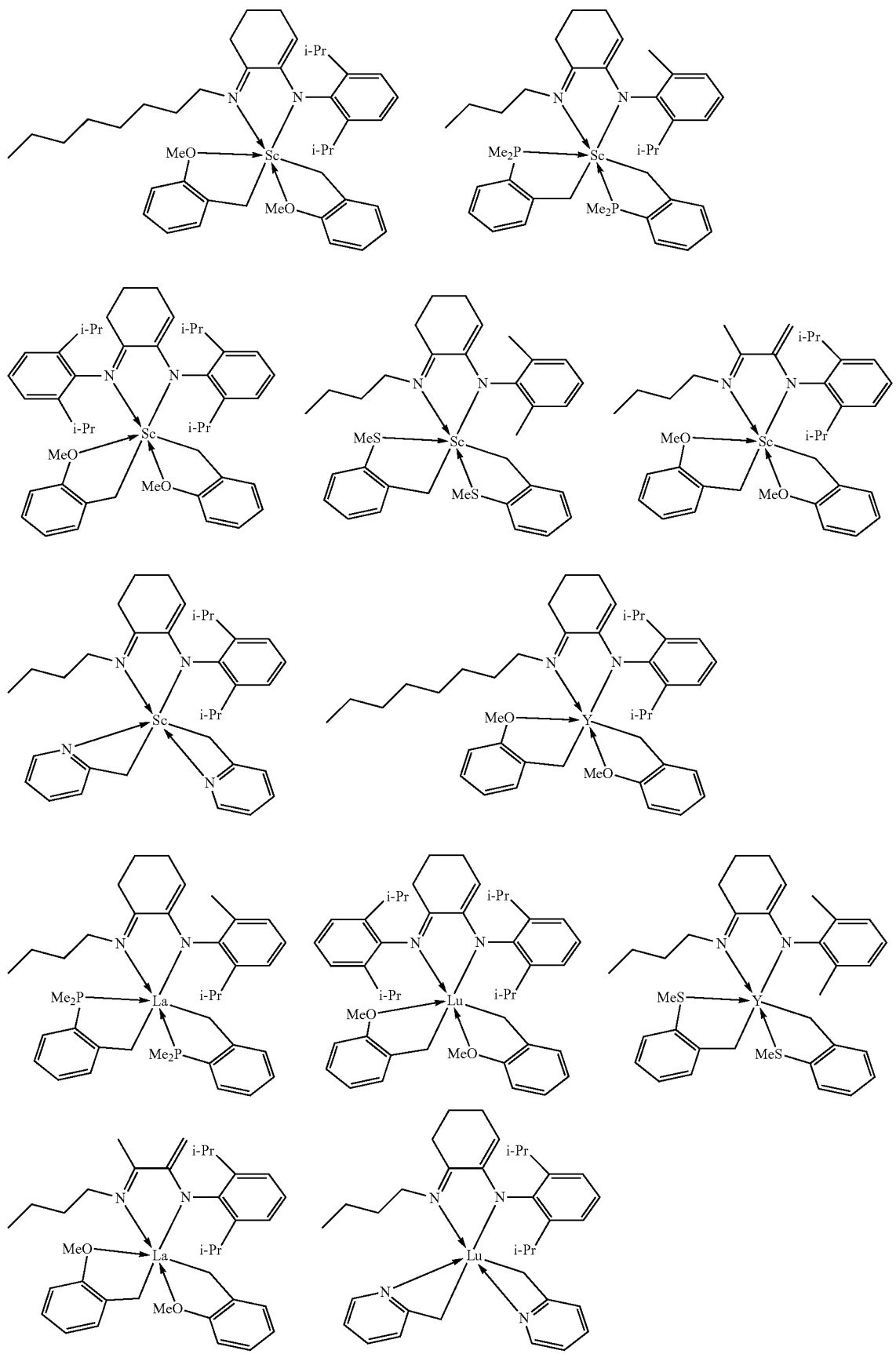

-continued
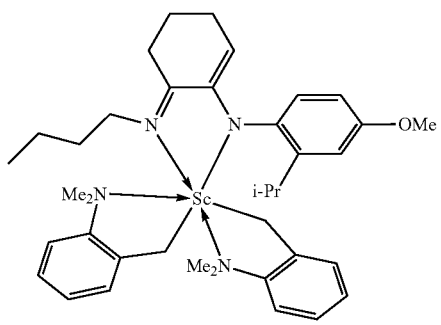
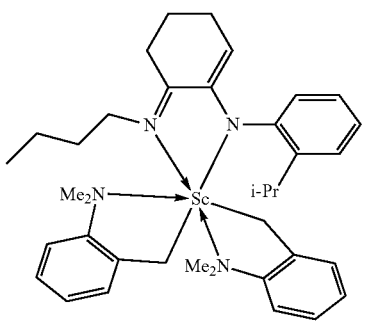
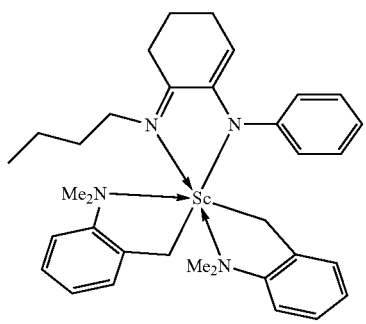
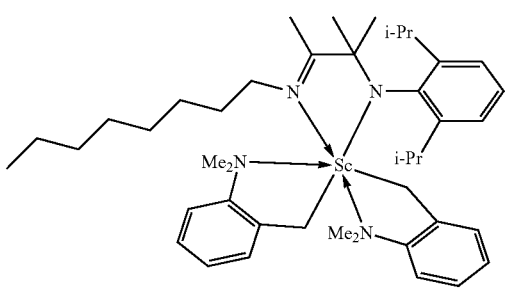
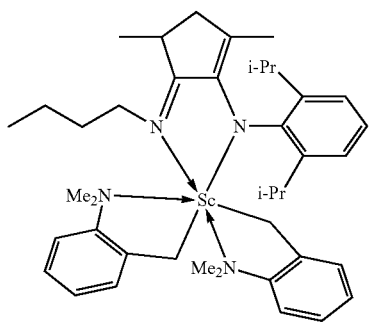
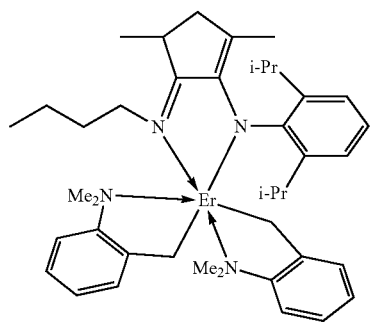
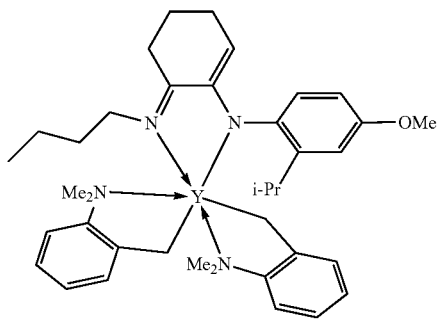
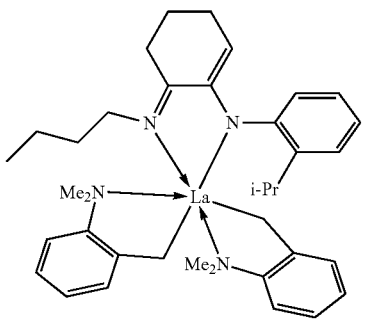
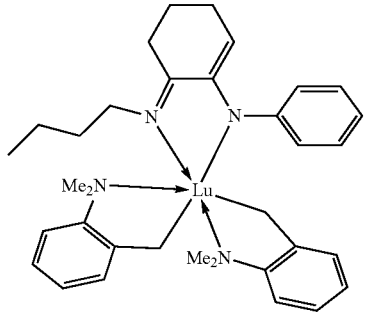
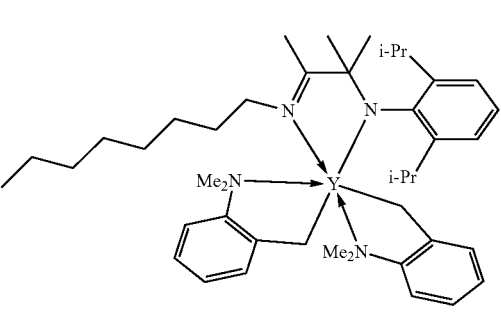

-continued
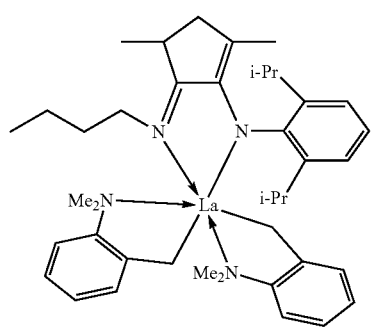
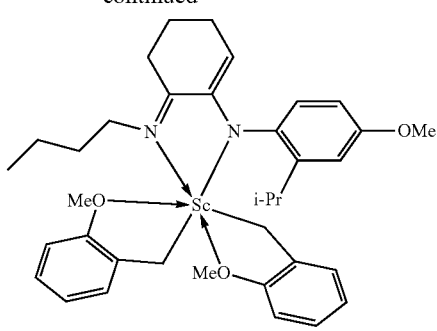
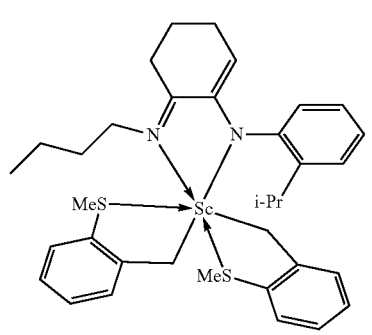
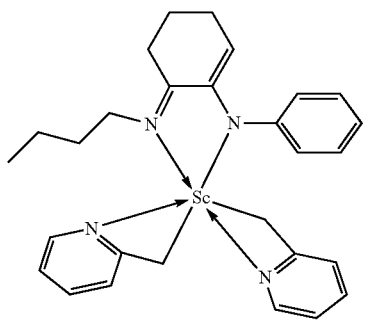
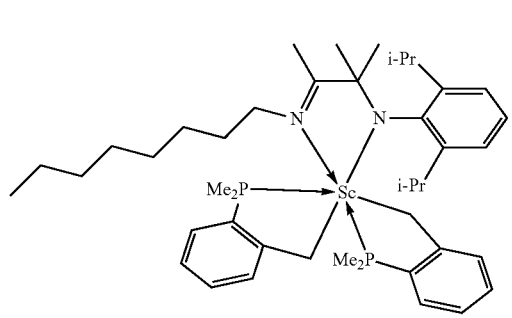
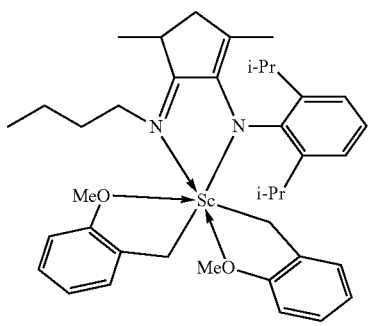
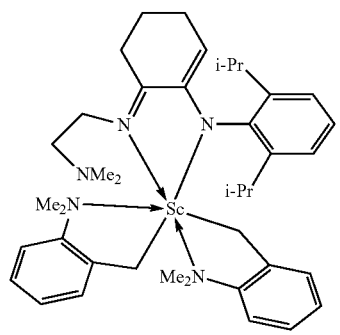
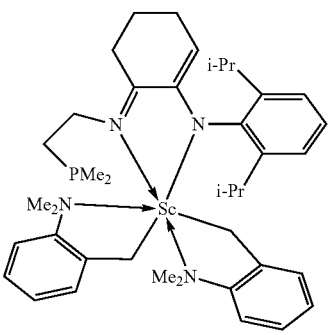
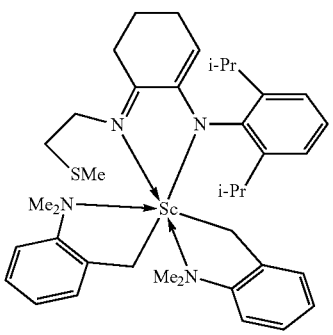
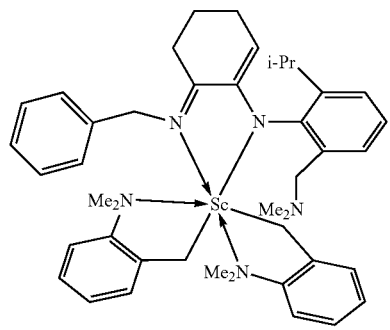
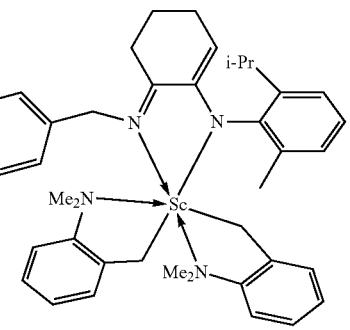

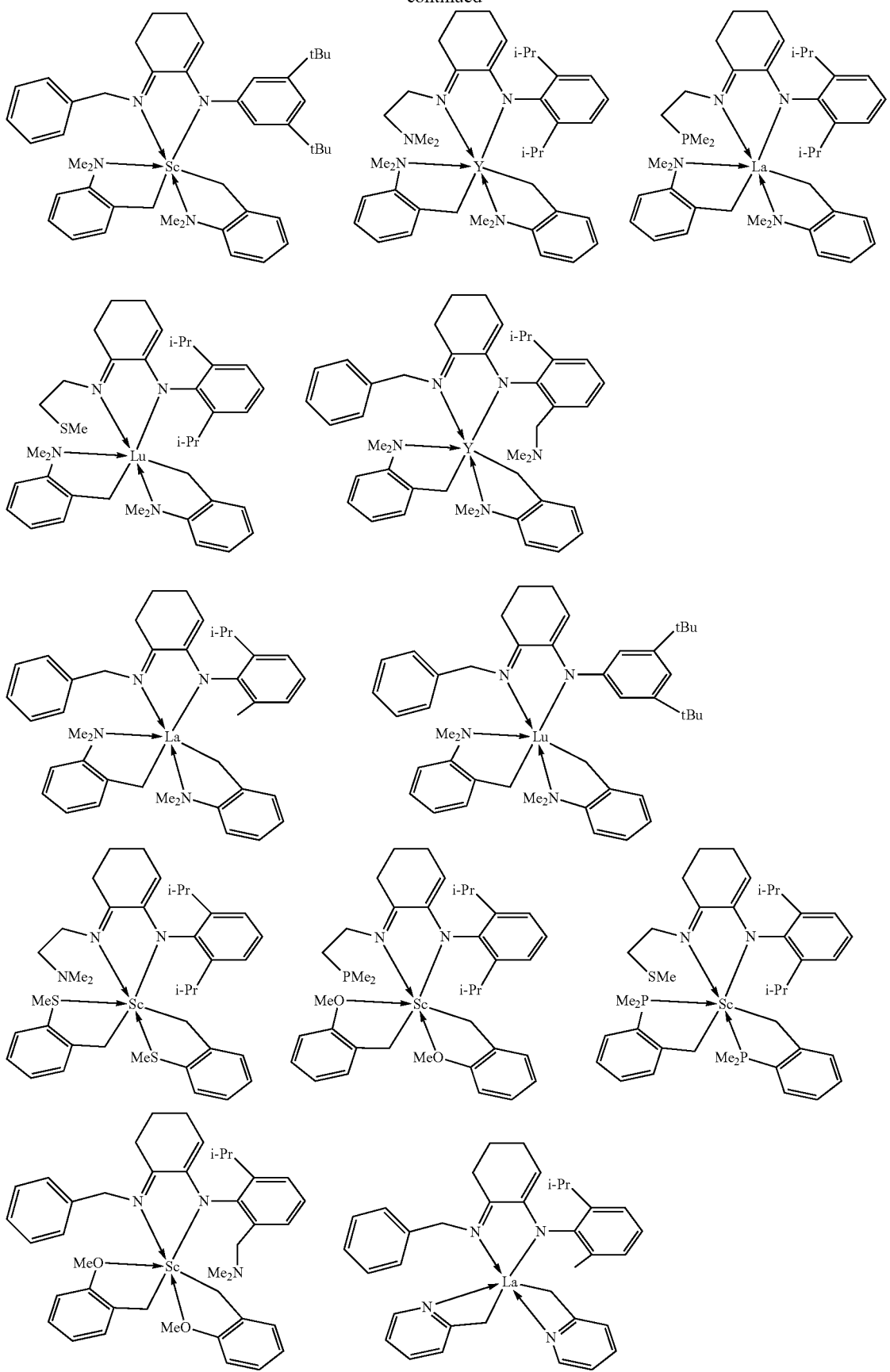

-continued
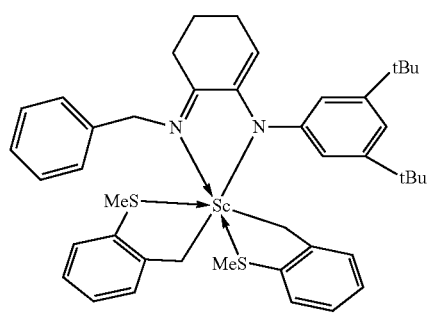
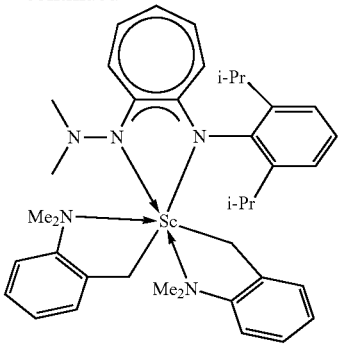
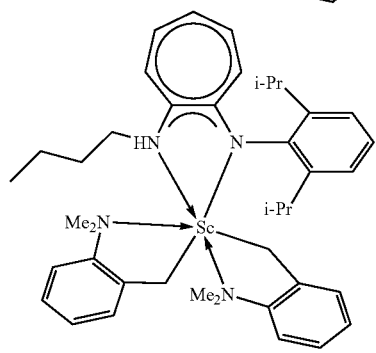
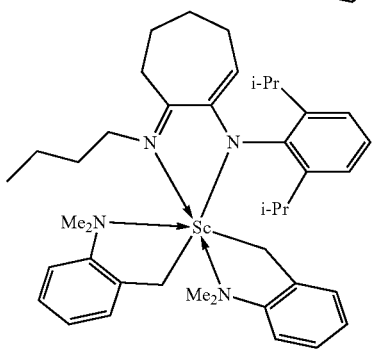
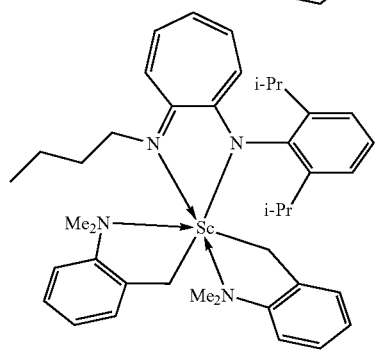
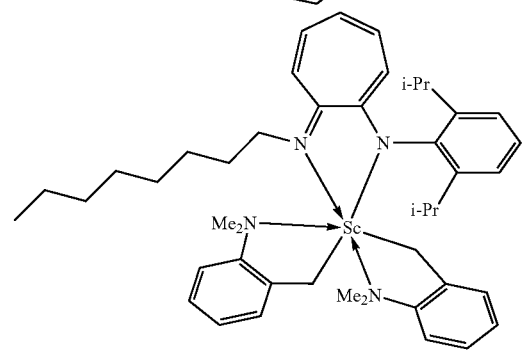
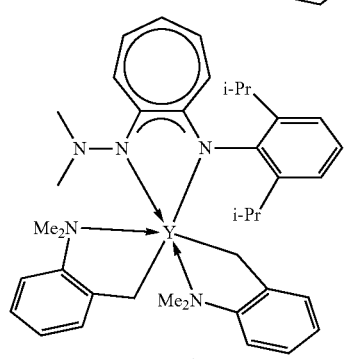
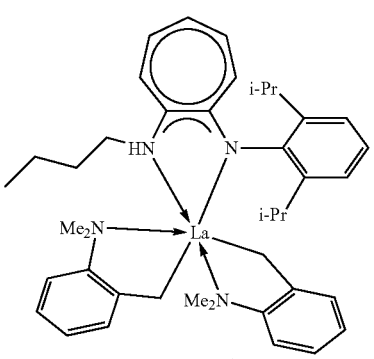
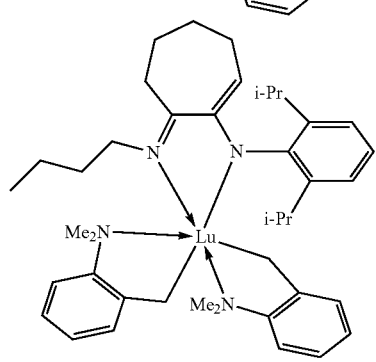
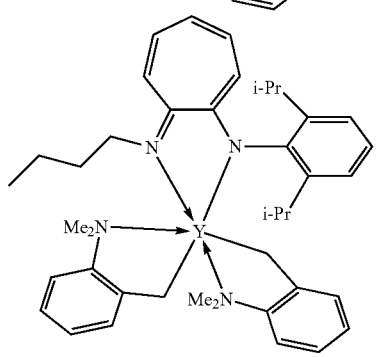

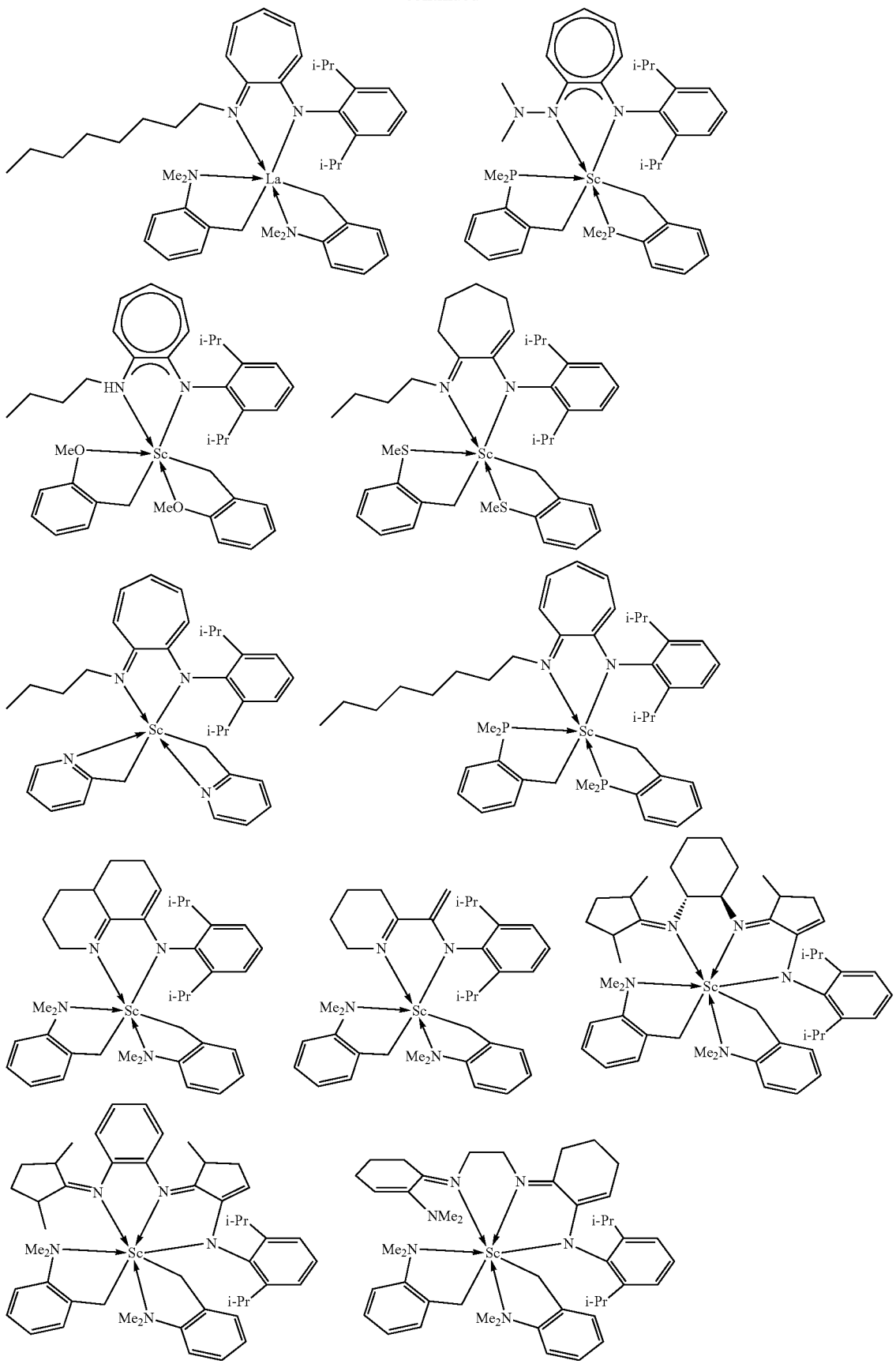

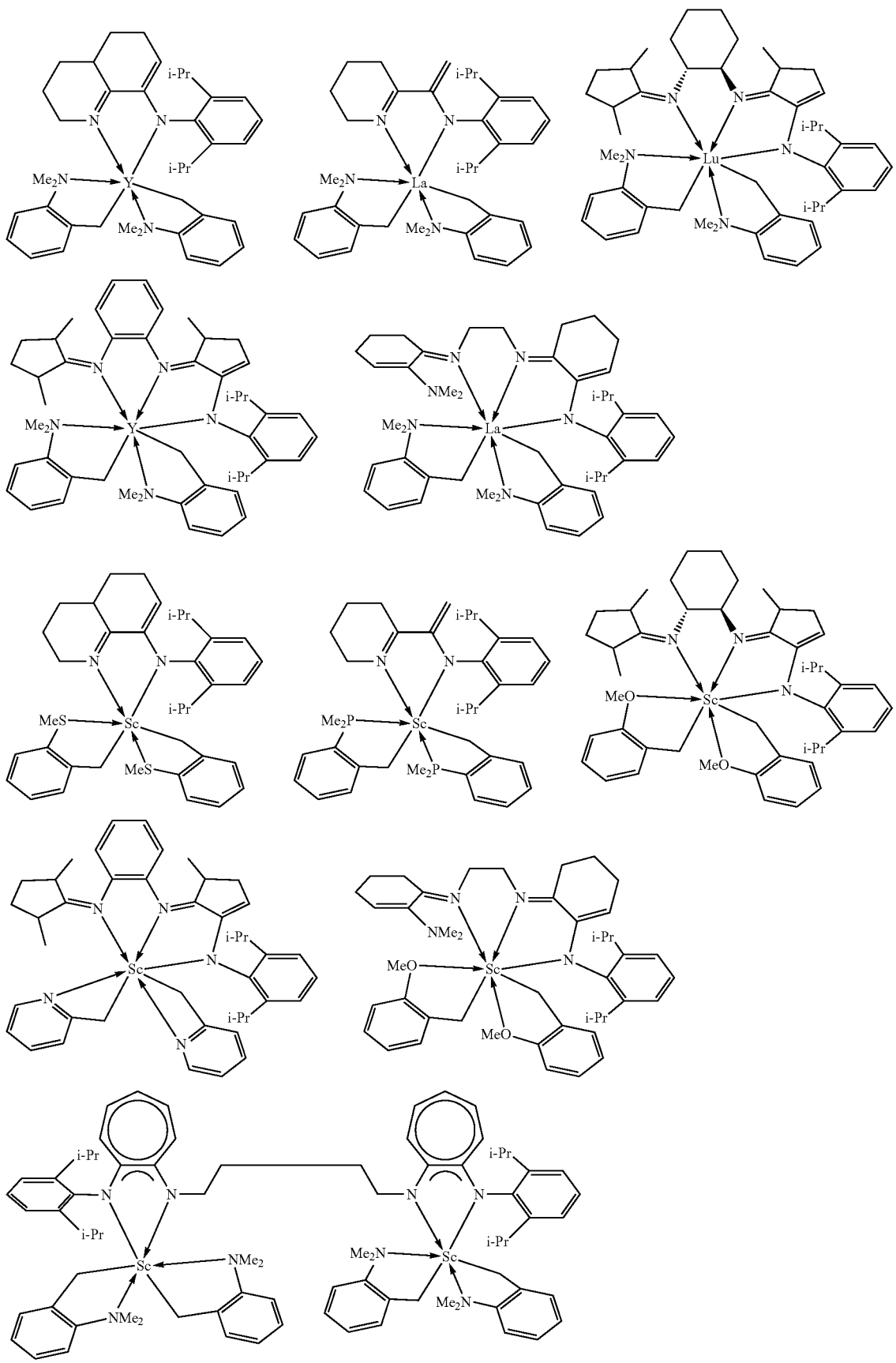

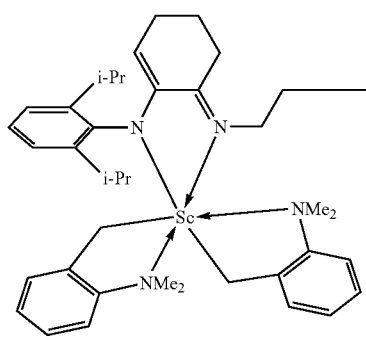
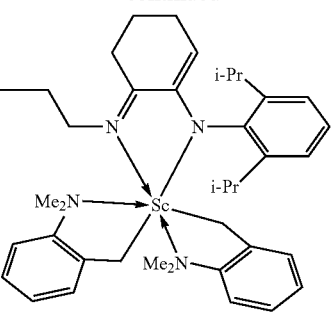
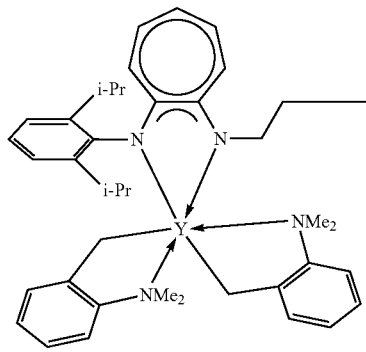
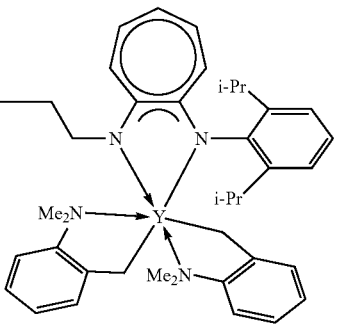
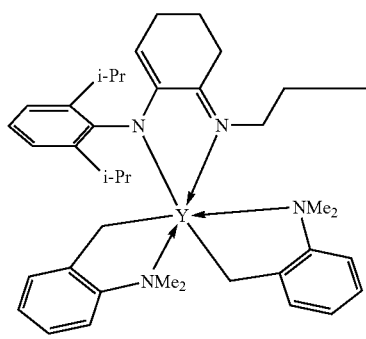
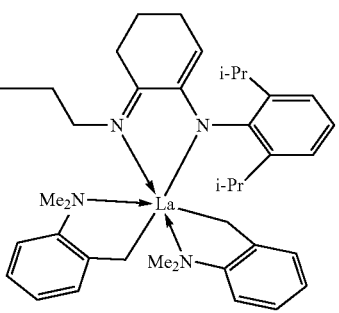
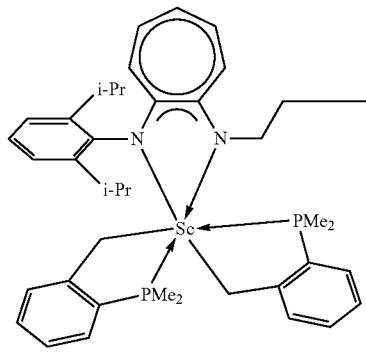
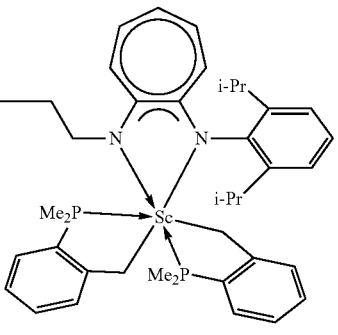
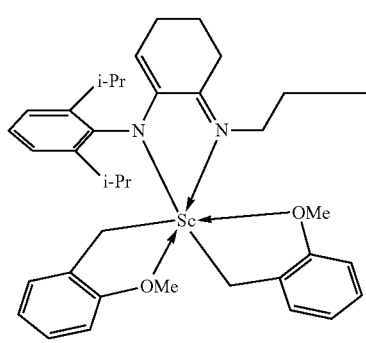
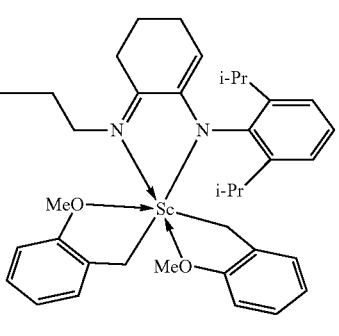

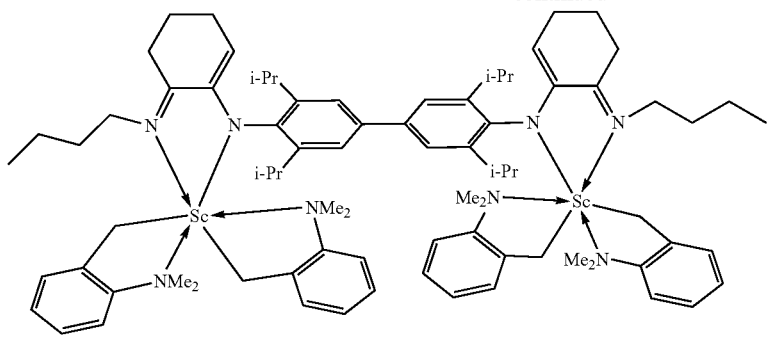
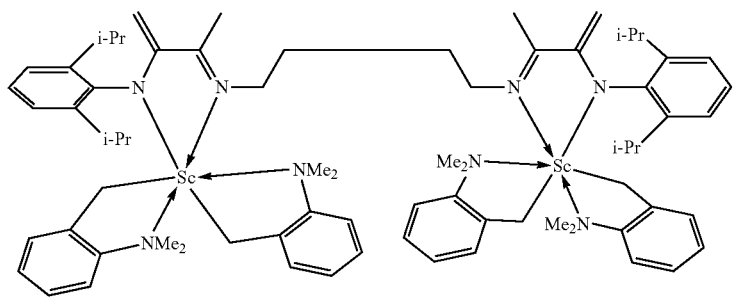
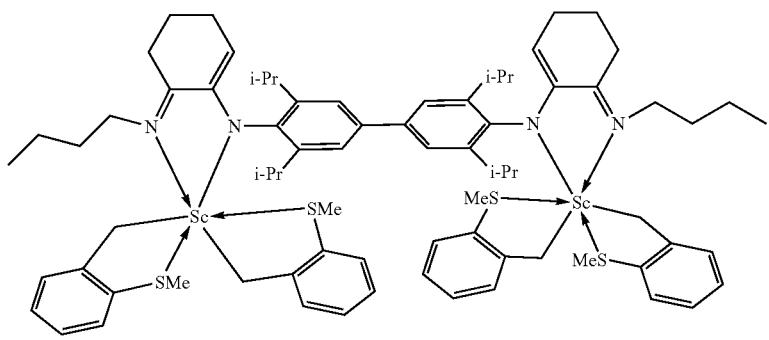
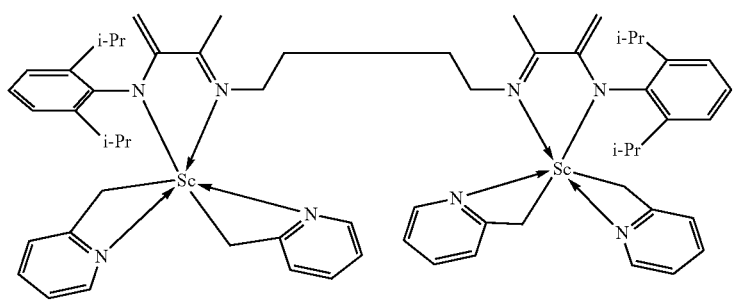
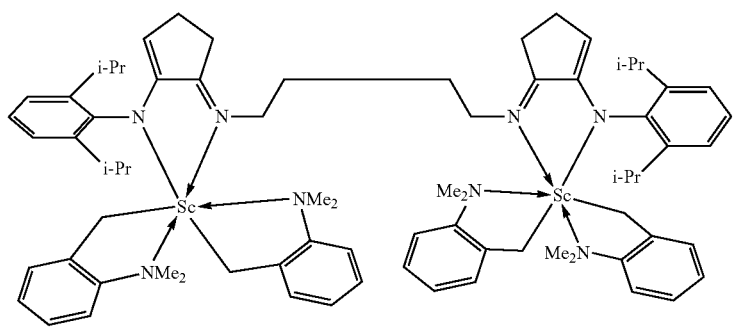

-continued

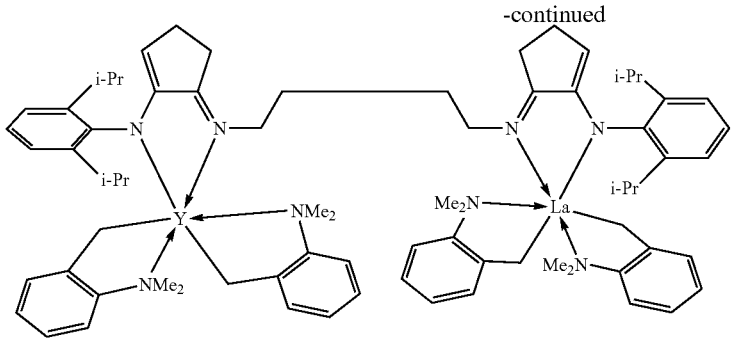

Activator/Co-Catalyst

An activator is an additive which renders a procatalyst active with respect to olefin polymerization by contacting it to, or combining it with, the procatalyst. Commonly used activators abstract a monoanionic ligand, typically an alkyl group, in some cases a benzyl or methyl group, to form a cationic metal-ligand complex of the procatalyst, which has a weakly coordinating or noncoordinating anion derived or present as a portion of the activating agent. For example, activators of this type include: Brønsted acids, such as $[R_3NH]^+$ (ammonium) based activators, e.g. N,N-dimethylanilinium tetrakis(pentafluorophenyl)borate); and Lewis acids, such as alkyl aluminums, polymeric or oligomeric alumoxanes (also known as aluminoxanes), boranes (such as tris(pentafluorophenyl)borane), or carbocationic species (such as trityl teatrakis(pentafluorophenyl)borate). When an alumoxane alone is used as the activator, preferably the number of moles of the alumoxane that are employed is at least 100 times the number of moles of the metal-ligand complex. Lower loading of alumoxanes do not act as activators, rather they serve as scavenging agent. A scavenging agent sequesters impurities in the reactor prior to addition of the catalyst, and as such, does not constitute an activator.

Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri($(C_1-C_{10})$alkyl)aluminum or tri($(C_6-C_{18})$aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris($(C_1-C_{20})$hydrocarbyl)methane borate (e.g., trityl tetrakis(pentafluorophenyl)borate) or a tri($(C_1-C_{20})$hydrocarbyl)ammonium tetra($(C_1-C_{20})$hydrocarbyl)borate (e.g., bis(octadecyl)methylammonium tetrakis (pentafluorophenyl)borate). As used herein, the term "ammonium" means a nitrogen cation that is a $((C_1-C_{20})$hydrocarbyl$)_4N^+$, a $((C_1-C_{20})$hydrocarbyl$)_3N(H)^+$, a $((C_1-C_{20})$hydrocarbyl$)_2N(H)_2^+$, $(C_1-C_{20})$hydrocarbylN(H)$_3^+$, or $N(H)_4^+$, wherein each $(C_1-C_{20})$hydrocarbyl may be the same or different.

Exemplary combinations of neutral Lewis acid activating co-catalysts include mixtures comprising a combination of a tri($(C_1-C_4)$alkyl)aluminum and a halogenated tri($(C_6-C_{18})$aryl)boron compound, especially a tris(pentafluorophenyl)borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex):(tris(pentafluoro-phenylborane):(alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalysts of the present disclosure may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO); bis(hydrogenated tallow alkyl)methylammonium tetrakis(pentafluorophenyl)borate; triethyl aluminum (TEA); and any combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound. In exemplary embodiments of the present disclosure, the co-catalyst is [($C_{16-18}$ $H_{33-37}$)—$_2CH_3NH$] tetrakis(pentafluorophenyl)borate salt.

The ratio of total number of moles of one or more catalysts to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the catalysts. When tris (pentafluorophenyl)borane alone is used as the activating co-catalyst, in some other embodiments, the number of moles of the tris(pentafluorophenyl)borane that are employed to the total number of moles of one or more catalysts form 1:0.5 to 1:10, in some other embodiments, from 1:1 to 1:6, in some other embodiments, from 1:1 to 1:5. The remaining activating co-catalysts are generally employed in approximately mole quantities equal to the total mole quantities of one or more catalysts.

Polymerization Processes

Any conventional polymerization processes may be employed to produce the block copolymers of the present disclosure. Such conventional polymerization processes include, but are not limited to, solution polymerization processes, gas phase polymerization processes, slurry, or particle forming polymerization processes, and combinations thereof using one or more conventional reactors, e.g., loop reactors, isothermal reactors, fluidized bed reactors, stirred tank reactors, batch reactors in parallel, series, and/or any combinations thereof.

In certain embodiments of the present disclosure, multi-block copolymers are prepared via a solution polymerization process employing a first olefin polymerization procatalyst (A), a second olefin polymerization procatalyst (B), one or more cocatalysts, and a chain shuttling agent (C).

The polymerization processes of the disclosure employing a first olefin polymerization procatalyst A, a second olefin polymerization procatalyst B, one or more cocatalysts, and chain shuttling agent C may be further elucidated by reference to FIG. 1, where there are illustrated activated catalyst site A, 10, which under polymerization conditions forms a polymer chain, 13, attached to the active catalyst site, 12. Similarly, active catalyst site B, 20, produces a differentiated polymer chain, 23, attached to the active catalyst site, 22. A chain shuttling agent C1, attached to a polymer chain produced by active catalyst B, 14, exchanges its polymer chain, 23, for the polymer chain 13, attached to catalyst site A. Additional chain growth under polymerization conditions causes formation of a multi-block copolymer, 18, attached to active catalyst site A. Similarly, chain shuttling agent C2, attached to a polymer chain produced by active catalyst site A, 24, exchanges its polymer chain, 13, for the polymer chain, 23, attached to catalyst site B. Additional chain growth under polymerization conditions causes formation of a multi-block copolymer, 28, attached to active catalyst site B. The growing multi-block copolymers are repeatedly exchanged between active catalyst A and active catalyst B by means of shuttling agent C resulting in formation of a block or segment of differing properties whenever exchange to the opposite active catalyst site occurs. The growing polymer chains may be recovered while attached to a chain shuttling agent and functionalized if desired. Alternatively, the resulting polymer may be recovered by scission from the active catalyst site or the shuttling agent, through use of a proton source or other killing agent.

It is believed (without wishing to be bound by such belief), that the composition of the respective segments or blocks, and especially of the end segments of the polymer chains, may be influenced through selection of process conditions or other process variables. In the polymers of the invention, the nature of the end segments is determined by the relative rates of chain transfer or termination for the respective catalysts as well as by the relative rates of chain shuttling. Possible chain termination mechanisms include, but are not limited to, β-hydrogen elimination, β-hydrogen transfer to monomer, β-methyl elimination, and chain transfer to hydrogen or other chain-terminating reagent such as an organosilane or chain functionalizing agent. Accordingly, when a low concentration of chain shuttling agent is used, the majority of polymer chain ends will be generated in the polymerization reactor by one of the foregoing chain termination mechanisms and the relative rates of chain termination for catalyst (A) and (B) will determine the predominant chain terminating moiety. That is, the catalyst having the fastest rate of chain termination will produce relatively more chain end segments in the finished polymer.

In contrast, when a high concentration of chain shuttling agent is employed, the majority of the polymer chains within the reactor and upon exiting the polymerization zone are attached or bound to the chain shuttling agent. Under these reaction conditions, the relative rates of chain transfer of the polymerization catalysts and the relative rate of chain shuttling of the two catalysts primarily determines the identity of the chain terminating moiety. If catalyst (A) has a faster chain transfer and/or chain shuttling rate than catalyst (B), then the majority of the chain end segments will be those produced by catalyst (A).

At intermediate concentrations of chain shuttling agent, all three of the aforementioned factors are instrumental in determining the identity of the final polymer block. The foregoing methodology may be expanded to the analysis of multi-block polymers having more than two block types and for controlling the average block lengths and block sequences for these polymers. For example, using a mixture of catalysts 1, 2, and 3 with a chain shuttling agent, for which each catalyst type makes a different type of polymer block, produces a linear block copolymer with three different block types. Furthermore, if the ratio of the shuttling rate to the propagation rate for the three catalysts follows the order 1>2>3, then the average block length for the three block types will follow the order 3>2>1, and there will be fewer instances of 2-type blocks adjacent to 3-type blocks than 1-type blocks adjacent to 2-type blocks.

It follows that a method exists for controlling the block length distribution of the various block types. For example, by selecting catalysts 1, 2, and 3 (wherein 2 and 3 produce substantially the same polymer block type), and a chain shuttling agent, and the shuttling rate follows the order 1>2>3, the resulting polymer will have a bimodal distribution of block lengths made from the 2 and 3 catalysts.

During the polymerization, the reaction mixture comprising one or more monomers is contacted with the activated catalyst composition according to any suitable polymerization conditions. The process is characterized by use of elevated temperatures and pressures. Hydrogen may be employed as a chain transfer agent for molecular weight control according to known techniques if desired. As in other similar polymerizations, it is highly desirable that the monomers and solvents employed be of sufficiently high purity that catalyst deactivation does not occur. Any suitable technique for monomer purification such as devolatilization at reduced pressure, contacting with molecular sieves or high surface area alumina, or a combination of the foregoing processes may be employed. The skilled artisan will appreciate that the ratio of chain shuttling agent to one or more catalysts and or monomers in the process of the present invention may be varied in order to produce polymers differing in one or more chemical or physical properties. Supports may be employed in the present invention, especially in slurry or gas-phase polymerizations. Suitable supports include solid, particulated, high surface area, metal oxides, metalloid oxides, or mixtures thereof (interchangeably referred to herein as an inorganic oxide). Examples include: talc, silica, alumina, magnesia, titania, zirconia, $Sn_2O_3$, aluminosilicates, borosilicates, clays, and mixtures thereof. Suitable supports preferably have a surface area as determined by nitrogen porosimetry using the B.E.T. method from 10 to 1000 m/g, and preferably from 100 to 600 $m^2$/g. The average particle size typically is from 0.1 to 500 pm, preferably from 1 to 200 pm, more preferably 10 to 100 pm.

In one embodiment of the invention the present catalyst composition and optional support may be spray dried or otherwise recovered in solid, particulated form to provide a composition that is readily transported and handled. Suitable methods for spray drying a liquid containing slurry are well known in the art and usefully employed herein. Preferred techniques for spray drying catalyst compositions for use herein are described in U.S. Pat. Nos. 5,648,310 and 5,672,669.

The polymerization may be carried out as a continuous polymerization, preferably a continuous, solution polymerization, in which catalyst components, shuttling agent(s), monomers, and optionally solvent, adjuvants, scavengers, and polymerization aids are continuously supplied to the reaction zone and polymer product continuously removed there from. Within the scope of the terms "continuous" and "continuously" as used in this context are those processes in which there are intermittent additions of reactants and removal of products at small regular or irregular intervals, so that, over time, the overall process is substantially continuous. The catalyst compositions can be advantageously employed in a high pressure, solution, slurry, or gas phase polymerization process. For a solution polymerization process it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion where either the metal complex or the cocatalyst is only poorly soluble is disclosed in U.S. Pat. No. 5,783,512. A solution process to prepare the novel polymers of the present invention, especially a continuous solution process is preferably carried out at a temperature between 80° C. and 250° C., more preferably between 100° C. and 210° C., and most preferably between 110° C. and 210° C. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa). In all of the foregoing processes, continuous or substantially continuous polymerization conditions are preferably employed. The use of such polymerization conditions, especially continuous, solution polymerization processes employing two or more active polymerization catalyst species, allows the use of elevated reactor temperatures which results in the economical production of multi-block or segmented copolymers in high yields and efficiencies. Both homogeneous and plug-flow type reaction conditions may be employed. The latter conditions are preferred where tapering of the block composition is desired.

Both catalyst compositions (A) and (B) may be prepared as a homogeneous composition by addition of the requisite metal complexes to a solvent in which the polymerization will be conducted or in a diluent compatible with the ultimate reaction mixture. The desired cocatalyst or activator and the shuttling agent may be combined with the catalyst composition either prior to, simultaneously with, or after combination with the monomers to be polymerized and any additional reaction diluent.

At all times, the individual ingredients as well as any active catalyst composition must be protected from oxygen and moisture. Therefore, the catalyst components, shuttling agent and activated catalysts must be prepared and stored in an oxygen and moisture free atmosphere, preferably a dry, inert gas such as nitrogen.

Without limiting in any way the scope of the invention, one means for carrying out such a polymerization process is as follows. In a stirred-tank reactor, the monomers to be polymerized are introduced continuously together with any solvent or diluent. The reactor contains a liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization. Procatalysts along with cocatalyst and chain shuttling agent are continuously or intermittently introduced in the reactor liquid phase or any recycled portion thereof. The reactor temperature and pressure may be controlled by adjusting the solvent/monomer ratio, the catalyst addition rate, as well as by cooling or heating coils, jackets or both. The polymerization rate is controlled by the rate of catalyst addition. The ethylene content of the polymer product is determined by the ratio of ethylene to comonomer in the reactor, which is controlled by manipulating the respective feed rates of these components to the reactor. The polymer product molecular weight is controlled, optionally, by controlling other polymerization variables such as the temperature, monomer concentration, or by the previously mentioned chain transfer agent, as is well known in the art. Upon exiting the reactor, the effluent is contacted with a catalyst kill agent such as water, steam or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a continuous loop reactor with or without a monomer, catalyst or shuttling agent gradient established between differing regions thereof, optionally accompanied by separated addition of catalysts and/or chain transfer agent, and operating under adiabatic or non-adiabatic solution polymerization conditions or combinations of the foregoing reactor conditions. Examples of suitable loop reactors and a variety of suitable operating conditions for use therewith are found in U.S. Pat. Nos. 5,977,251, 6,319,989 and 6,683,149.

Although not as desired, the catalyst composition may also be prepared and employed as a heterogeneous catalyst by adsorbing the requisite components on an inert inorganic or organic particulated solid, as previously disclosed. In an preferred embodiment, a heterogeneous catalyst is prepared by co-precipitating the metal complex and the reaction product of an inert inorganic compound and an active hydrogen containing activator, especially the reaction product of a tri (C1.4 alkyl) aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. As with a solution polymerization, the α-olefin comonomer or a mixture of different α-olefin monomers may be used in whole or part as the diluent. Most preferably at least a major part of the diluent comprises the α-olefin monomer or monomers to be polymerized.

Preferably for use in gas phase polymerization processes, the support material and resulting catalyst has a median particle diameter from 20 to 200 µm, more preferably from 30 µm to 150 µm, and most preferably from 50 µm to 100 µm. Preferably for use in slurry polymerization processes, the support has a median particle diameter from 1 µm to 200 µm, more preferably from 5 µm to 100 µm, and most preferably from 10 µm to 80 µm.

Suitable gas phase polymerization process for use herein are substantially similar to known processes used commercially on a large scale for the manufacture of polypropylene, ethylene/α-olefin copolymers, and other olefin polymers. The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported or suspended above a perforated plate or fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, in addition to the cooling provided by the cooled recycle gas, is to feed a volatile liquid to the bed to provide an evaporative cooling effect, often referred to as operation in the condensing mode. The volatile liquid employed in this case can be, for example, a volatile inert liquid, for example, a saturated hydrocarbon having 3 to 8, preferably 4 to 6, carbon atoms. In the case that the monomer or comonomer itself is a volatile liquid, or can be condensed to provide such a liquid, this can suitably be fed to the bed to provide an evaporative cooling effect. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example in EP-89691; U.S. Pat. No. 4,543,399; WO-94/25495 and U.S. Pat. No. 5,352,749. A particularly preferred method of recycling the liquid to the bed is to separate the liquid from the recycle gas stream and to reinject this liquid directly into the bed, preferably using a method which generates fine droplets of the liquid within the bed. This type of process is described in WO-94/28032. The polymerization reaction occurring in the gas fluidized bed is catalyzed by the continuous or semi-continuous addition of catalyst composition according to the invention. The catalyst composition may be subjected to a prepolymerization step, for example, by polymerizing a small quantity of olefin monomer in a liquid inert diluent, to provide a catalyst composite comprising supported catalyst particles embedded in olefin polymer particles as well. The polymer is produced directly in the fluidized bed by polymerization of the monomer or mixture of monomers on the fluidized particles of catalyst composition, supported catalyst composition or prepolymerized catalyst composition within the bed. Start-up of the polymerization reaction is achieved using a bed of preformed polymer particles, which are preferably similar to the desired polymer, and conditioning the bed by drying with inert gas or nitrogen prior to introducing the catalyst composition, the monomers and any other gases which it is desired to have in the recycle gas stream, such as a diluent gas, hydrogen chain transfer agent, or an inert condensable gas when operating in gas phase condensing mode. The produced polymer is discharged continuously or semi-continuously from the fluidized bed as desired.

The gas phase processes most suitable for the practice of this invention are continuous processes which provide for the continuous supply of reactants to the reaction zone of the reactor and the removal of products from the reaction zone of the reactor, thereby providing a steady-state environment on the macro scale in the reaction zone of the reactor.

Products are readily recovered by exposure to reduced pressure and optionally elevated temperatures (devolatilization) according to known techniques. Typically, the fluidized bed of the gas phase process is operated at temperatures greater than 50° C., preferably from 60° C. to 110° C., more preferably from 70° C. to 110° C.

Examples of gas phase processes which are adaptable for use in the process of this invention are disclosed in U.S. Pat. Nos. 4,588,790; 4,543,399; 5,352,749; 5,436,304; 5,405,922; 5,462,999; 5,461,123; 5,453,471; 5,032,562; 5,028,670; 5,473,028; 5,106,804; 5,556,238; 5,541,270; 5,608,019; and 5,616,661.

As previously mentioned, functionalized derivatives of multi-block copolymers are also included within the present invention. Examples include metallated polymers wherein the metal is the remnant of the catalyst or chain shuttling agent employed, as well as further derivatives thereof, for example, the reaction product of a metallated polymer with an oxygen source and then with water to form a hydroxyl terminated polymer. In another embodiment, sufficient air or other quench agent is added to cleave some or all of the shuttling agent-polymer bonds thereby converting at least a portion of the polymer to a hydroxyl terminated polymer. Additional examples include olefin terminated polymers formed by β-hydride elimination and ethylenic unsaturation in the resulting polymer.

In one embodiment of the invention the multi-block copolymer may be functionalized by maleation (reaction with maleic anhydride or its equivalent), metallation (such as with an alkyl lithium reagent, optionally in the presence of a Lewis base, especially an amine, such as tetramethylethylenediamine), or by incorporation of a diene or masked olefin in a copolymerization process. After polymerization involving a masked olefin, the masking group, for example a trihydrocarbylsilane, may be removed thereby exposing a more readily functionalized remnant. Techniques for functionalization of polymers are well known, and disclosed for example in U.S. Pat. No. 5,543,458, and elsewhere.

Because a substantial fraction of the polymeric product exiting the reactor is terminated with the chain shuttling agent, further functionalization is relatively easy. The metallated polymer species can be utilized in well known chemical reactions such as those suitable for other alkyl-aluminum, alkyl-gallium, alkyl-zinc, or alkyl-Group 1 compounds to form amine-, hydroxy-, epoxy-, ketone, ester, nitrile, and other functionalized terminated polymer products. Examples of suitable reaction techniques that are adaptable for use here in are described in Negishi, "Organometallics in Organic Synthesis", Vol. 1 and 2, (1980), and other standard texts in organometallic and organic synthesis.

Polymer Products

In certain embodiments, multi-block copolymers (i.e., olefin block copolymers or OBCs) prepared by the compositions/catalyst systems/processes of the present disclosure are defined as having:

(A) Mw/Mn from 1.0 to 10.0 (e.g., from 1.0 to 9.0, from 1.0 to 8.0, from 1.0 to 7.0, from 1.0 to 6.0, from 1.0 to 5.0, from 1.5 to 5.0, from 1.5 to 4.0, from 1.7 to 3.5, etc.), at least one melting point, Tm, in degrees Celsius, and a density, d, in grams/cubic centimeter, where in the numerical values of Tm and d correspond to the relationship:

$$T_m \geq -2002.9 + 4538.5(d) - 2422.2(d)^2;\text{ and/or}$$

(B) $M_w/M_n$ from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d);\text{ and/or}$$

(D) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; and/or (E) a storage modulus at 25° C., G'(25° C.), and a storage modulus at 100° C., G'(100° C.), wherein the ratio of G'(25° C.) to G'(100° C.) is in the range of about 1:1 to about 9:1; and/or (F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) an average block index greater than zero and up to 1.0 and a molecular weight distribution. Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

In certain embodiments, the olefin block copolymers prepared by the compositions/catalyst systems/processes of the present disclosure have a density of from 0.820 g/cc to 0.925 g/cc (e.g., from 0.860 g/cc to 0.890 g/cc). In some embodiments, the olefin block copolymers prepared by the compositions/catalyst systems/processes of the present disclosure have a melt index (MI) from 0.1 g/10 min to 1000 g/10 min (e.g., from 0.1 g/10 min to 500 g/10 min, from 0.1 g/10 min to 100 g/10 min, from 0.1 g/10 min to 50 g/10 min, from 0.1 g/10 min to 35 g/10 min, from 0.1 g/10 min to 30 g/10, from 0.1 g/10 min to 20 g/10 min, and/or from 0.1 g/10 min to 15 g/10 min), as measured by ASTM D 1238 (190° C./2.16 kg). In certain embodiments, the olefin block copolymers prepared by the compositions/catalyst systems/processes of the present disclosure have a molecular weight of 10,000 to 250,000 g/mole (e.g., from 10,000 to 200,000 g/mole and/or from 20,000 to 175,000 g/mole). In certain embodiments, the olefin block copolymers prepared by the compositions/catalyst systems/processes of the present disclosure have a residual zinc content from 50 ppm to 1000 ppm (e.g., from 50 ppm to 750 ppm, from 50 ppm to 500 ppm, and/or from 75 ppm to 400 ppm). In certain embodiments, the olefin block copolymers of the present disclosure have a molecular weight distribution (MWD or PDI) of less than 5.0 (e.g., less than 4.0, less than 3.5, less than 3.0, less than 2.9, less than 2.8, etc.). In certain embodiments, the olefin block copolymers of the present disclosure have a thermo-mechanical resistance (TMA) of greater than 100° C.

EXAMPLES

Methodologies

Combined Catalyst Efficiency: The combined catalyst efficiency is calculated by dividing the mass (e.g., the number of grams ($g_{polymer}$)) of the olefin block copolymer prepared by the mass (e.g., the total number of milligrams or grams ($g_{metal}$)) of metal from both procatalysts.

SymRAD HT-GPC Analysis: The molecular weight data was determined by analysis on a hybrid Symyx/Dow built Robot-Assisted Dilution High-Temperature Gel Permeation Chromatographer (Sym-RAD-GPC). The polymer samples were dissolved by heating for 120 minutes at 160° C. in 1,2,4-trichlorobenzene (TCB) at a concentration of 10 mg/mL stabilized by 300 ppm of butylated hydroxyl toluene (BHT). Each sample was then diluted to 1 mg/mL immediately before the injection of a 250 μL aliquot of the sample. The GPC was equipped with two Polymer Labs PLgel 10 μm MIXED-B columns (300×10 mm) at a flow rate of 2.0 mL/minute at 160° C. Sample detection was performed using a PolyChar IR4 detector in concentration mode. A conventional calibration of narrow polystyrene (PS) standards was utilized with apparent units adjusted to homo-polyethylene (PE) using known Mark-Houwink coefficients for PS and PE in TCB at this temperature.

Differential Scanning Calorimetry (DSC) analysis: Melt temperature (Tm), glass transition temperature (Tg), crystallization temperature (Tc) and Heat of Melt may be measured by differential scanning calorimetry (DSC Q2000, TA Instruments, Inc.) using a Heat-Cool-Heat temperature profile. Open-pan DSC samples of 3-6 mg of polymer are first heated from room temperature to setpoint at 10° C. per min. Traces are analyzed individually using TA Universal Analysis software or TA Instruments TRIOS software.

Density: Density measurements are conducted according to ASTM D792.

Melt index: $I_2$ and $I_{10}$ are measured in accordance with ASTM D-1238 (190° C.; 2.16 kg and 10 kg).

$^{13}C$ NMR spectroscopy: $^{13}C$ NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)), which is incorporated by reference herein in its entirety. The basic procedure for determining the comonomer content of an ethylene/olefin interpolymer involves obtaining a $^{13}C$ NMR spectrum under conditions where the intensity of the peaks corresponding to the different carbons in a sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomers. The mole % comonomer can be determined by the ratio of the integrals corresponding to the number of moles of comonomer to the integrals corresponding to the number of moles of all of the monomers in the interpolymer, as described in the aforementioned Randall reference.

The soft segment weight percentage and hard segment weight percentage of an ethylene/olefin interpolymer of the present disclosure is determined by DSC, and mole % comonomer in the soft segment of an ethylene/olefin interpolymer of the present disclosure is determined by $^{13}C$ NMR spectroscopy and the methods described in WO 2006/101966 A1, which is incorporated herein by reference in its entirety.

$^{13}C$ NMR Analysis: The samples are prepared by adding approximately 2.7 g of a 50/50 mixture of tetrachloroethane-$d^2$/orthodichlorobenzene to 0.2 g sample in a 10 mm NMR tube. The samples are dissolved and homogenized by heating the tube and its contents to 150° C. The data are collected using a JEOL Eclipse™ 400 MHz spectrometer, Bruker 400 MHz spectrometer, or a Varian Unity Plus™ 400 MHz spectrometer, corresponding to a $^{13}C$ resonance frequency of 100.5 MHz. The data is acquired using 256 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 120° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Residual zinc content (ppm) may be measured by standard industry procedure, such as mass balance or an x-ray fluorescence (XRF) method.

Reactivity Ratios: Reactivity ratios of the olefin polymerization procatalysts may be determined by the discussion and mathematical formulas above.

Working Examples

The following examples illustrate embodiments of the present disclosure but are not intended to be limiting in any way. More specifically, the following, non-limiting examples demonstrate inventive CSA and dual catalyst combinations capable of producing olefin block copolymers having desirable properties with commercially acceptable catalyst efficiency and process control at elevated reactor temperatures (e.g., equal to or greater than 120° C.).

Exemplary, non-limiting procatalysts falling within the scope of the first olefin polymerization procatalyst (A) of the present disclosure (Procatalysts (A1) and (A4)) have the structures shown below:

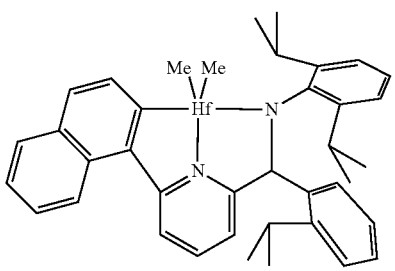

(A1)

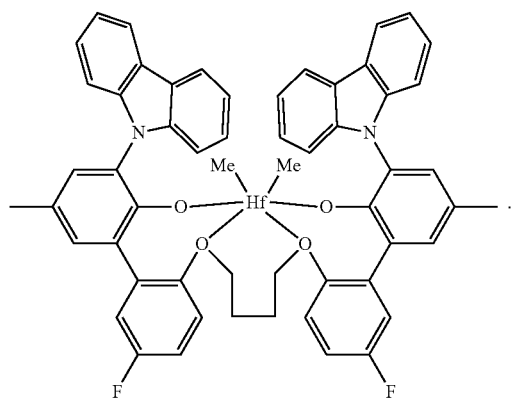

(A4)

An exemplary, non-limiting procatalyst falling within the scope of the second olefin polymerization procatalyst (B) of the present disclosure (Procatalyst B1) has the following structure:

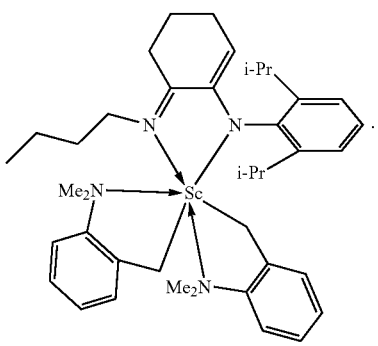

(B1)

Synthesis of Procatalyst (A4)

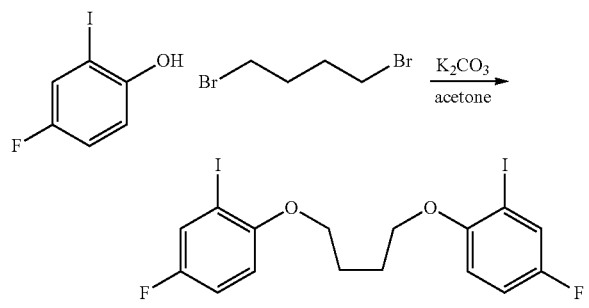

2-iodo-4-fluorophenol (14.2 g, 59.6 mmol) and 1,4-dibromobutane (3.6 mL 30 mmol) are combined in acetone (200 mL) and stirred at reflux over 3 days. The mixture is cooled, filtered and concentrated under vacuum. The residue is dissolved in dichloromethane (150 mL) and washed with KOH (50 mL, 3 N) and saturated $K_2CO_3$ (2×50 mL). The organic fraction is then dried over $MgSO_4$ and concentrated to yield a white powder. The white powder is rinsed and sonicated in hexanes, cooled, filtered, and dried under vacuum to yield the desired product (12.22 g, 77.3%). $^1$H NMR (400 MHz, CDCl$_3$) δ 7.49 (dd, J=7.7, 3.1 Hz, 2H), 7.01 (td, J=8.4, 3.1 Hz, 2H), 6.74 (dd, J=9.0, 4.6 Hz, 2H), 4.08 (d, J=5.3 Hz, 4H), 2.16-2.01 (m, 4H).

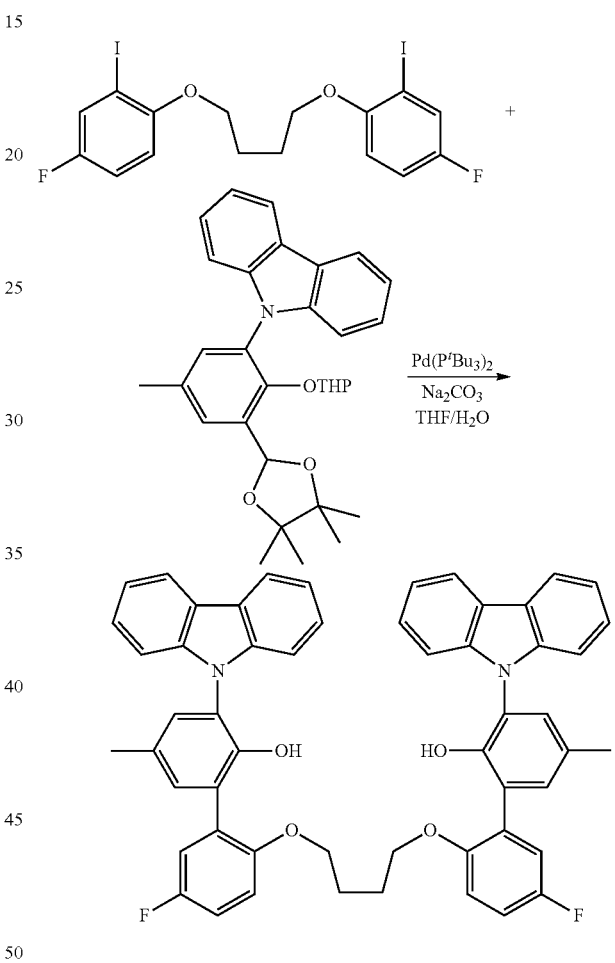

The bis(aryl iodide) (10.0 g, 18.9 mmol), boronate ester (18.2 g, 37.7 mmol), THF (200 mL), and a solution of $Na_2CO_3$ (12.0 g, 113 mmol) in water (50 mL) are placed in a 500 mL 2-neck flask and are purged with nitrogen for 15 minutes. The palladium catalyst is added to a solution in THF. The reaction is heated to 65° C. and stirred overnight. The desired protected product precipitates as a white solid formation over the course of the reaction. The mixture is then cooled, filtered and the white solid is washed with water. The solid is then transferred into a clean flask and suspended in a MeOH/THF mixture. Hydrochloric acid (5 drops) is added to the solution, and the solution is heated to reflux overnight over which time the suspension fully dissolves. The solution is cooled, filtered, and concentrated to yield a brownish oil. The remaining free-flowing liquid is decanted and discarded. The viscous brown oil remaining slowly crystallizes as a brownish solid upon standing in methanol for several days. This solid is collected by filtration, dissolved in dichloromethane and passed through a silica plug (Rf~1 in dichloromethane). The light red solution resulting from elution with dichloromethane is collected and concentrated to yield a red solid which is sonicated with diethyl ether, filtered, and dried to yield the target compound as an off white pinkish solid (14.98 g, 96%). $^1$H NMR (400 MHz, CDCl$_3$) δ 8.25-7.99 (m, 4H), 7.29 (ddd, J=8.2, 7.1, 1.3 Hz, 4H), 7.25-7.19 (m, 6H), 7.19-7.12 (m, 8H), 7.00 (ddd, J=9.0, 7.7, 3.1 Hz, 2H), 6.72 (dd, J=9.0, 4.5 Hz, 2H), 6.10 (s, 2H), 3.88-3.64 (m, 4H), 2.33 (s, 6H), 1.63 (t, J=3.2 Hz, 4H).

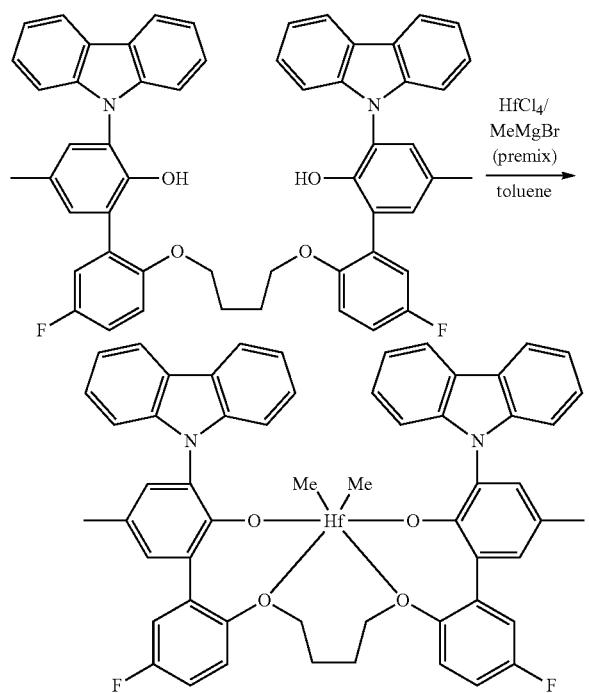

Addition of methyl magnesium bromide (0.812 mL, 3 M, 2.4 mmol) to hafnium tetrachloride (0.195 g, 0.609 mmol) is performed in a toluene (20 mL) suspension at −35° C. The reaction is stirred warming slightly over 20 minutes. This solution is then transferred to a solution of the ligand in toluene (10 mL). The solution is stirred overnight after which time the solvent is removed under high vacuum. The residue is extracted with dichloromethane (15 mL) and filtered. The dichloromethane is then removed under high vacuum to yield the product as an off white solid (0.325 g, 52%). $^1$H NMR (400 MHz, Benzene-d$_6$) δ 8.19-8.11 (m, 2H), 8.05 (dt, J=7.6, 1.0 Hz, 2H), 7.44 (tt, J=8.9, 0.9 Hz, 4H), 7.32 (ddd, J=8.2, 7.1, 1.3 Hz, 2H), 7.28-7.20 (m, 4H), 7.21-7.09 (m, 5H), 7.09 (dd, J=2.3, 0.8 Hz, 2H), 7.02 (ddt, J=7.9, 1.4, 0.7 Hz, 1H), 6.92 (dd, J=2.3, 0.8 Hz, 2H), 6.82 (dd, J=9.2, 3.2 Hz, 2H), 6.57 (ddd, J=9.1, 7.2, 3.2 Hz, 2H), 4.60 (dd, J=9.1, 4.9 Hz, 2H), 3.89-3.68 (m, 2H), 3.21 (dd, J=11.6, 4.4 Hz, 2H), 2.11 (d, J=1.4 Hz, 8H), 0.68-0.48 (m, 2H), 0.40 (d, J=13.3 Hz, 2H), −1.17 (s, 6H).

Synthesis of Procatalyst (B1)

Synthesis of [(E)-N-(6-(butylimino)cyclohex-1-en-1-yl)-2,6-diisopropylanilido]Sc[bis(2-dimethylaminobenzyl)]: In a nitrogen-filled glovebox, a solution of (E)-N-(6-(butylimino)cyclohex-1-en-1-yl)-2,6-diisopropylaniline (0.250 g, 0.766 mmol, 1 equiv.) in toluene (2.5 mL) was added to a solution of Sc(CH$_2$-o-NMe$_2$C$_6$H$_4$)$_3$ (0.343 g, 0.766 mmol, 1 equiv.) in toluene (2.5 mL). The material was stirred at 60° C. for 17 hours, yielding a dark brown/yellow solution. All volatiles were removed in vacuo to yield a dark brown/yellow oil. Hexane (10 mL) was layered onto the oil, and the mixture was stored in a −30° C. freezer for 3 months, however no appreciable amount of precipitate formed. The solution was filtered through a syringe filter, and all volatiles were removed in vacuo, yielding a thick black oil. The oil was dissolved hexamethyldisiloxane (3 mL), and stored in a −30° C. freezer for 3 days. A large amount of yellow solid precipitated from solution. The material was filtered through a prechilled glass frit, washed with minimal cold hexamethyldisiloxane, and dried in vacuo to yield a yellow powder (0.2506 g, 51% yield). Residual hexamethyldisiloxane was removed by dissolving the solid in hexane and drying in vacuo. $^1$H NMR (400 MHz, Benzene-d$_6$) δ 7.21-7.12 (m, 3H), 6.99 (ddd, J=8.2, 6.6, 1.8 Hz, 2H), 6.95-6.89 (m, 2H), 6.82-6.71 (m, 4H), 4.43 (t, J=4.9 Hz, 1H), 3.55 (hept, J=6.7 Hz, 2H), 2.73-2.64 (m, 2H), 2.27 (s, 12H), 1.98 (t, J=6.4 Hz, 2H), 1.87 (q, J=5.7 Hz, 2H), 1.61-1.48 (m, 4H), 1.44-1.37 (m, 2H), 1.37-1.29 (m, 2H), 1.21 (d, J=6.8 Hz, 6H), 1.16 (d, J=6.7 Hz, 6H), 1.21-1.11 (m, 2H), 0.84 (t, J=7.3 Hz, 3H). $^{13}$C NMR (400 MHz, Benzene-d$_6$) δ 174.33, 148.84, 145.56, 145.17, 144.31, 143.09, 128.72, 125.43, 124.71, 123.80, 120.05, 118.45, 109.60, 48.33, 47.67, 44.26, 30.96, 27.93, 27.50, 26.78, 24.62, 23.27, 22.95, 20.86, 13.60.

Synthesis of Procatalyst (A1)

Procatalyst (A1) is synthesized in accordance with the procedures described in U.S. Pat. No. 6,953,764 B2, which is incorporated herein by reference in its entirety.

Polymerization Examples

Batch Reactor Polymerization Procedure

Batch reactor polymerization runs were performed for Procatalysts (A1), (A4), (B1), an inventive CSA and dual catalyst combination (i.e., Procatalysts (A1) and (B1) and a chain shuttling agent), and a further inventive CSA and dual catalyst combination (i.e., Procatalysts (A4) and (B1). The batch reactor polymerization runs were performed in accordance with the procedure described below and the process conditions outlined in Tables 1-3. The co-catalyst ("Cocat.") is [HNMe(C18H37)2][B(C6F5)4].

A 2 L Parr reactor is used for all batch reactor polymerization runs. The reactor is heated via an electrical heating mantle and is cooled via an internal serpentine cooling coil containing water. Both the reactor and the heating/cooling system are controlled and monitored by a Camile TG process computer. All chemicals used for polymerization or catalyst makeup are run through purification columns. 1-octene, toluene, and Isopar-E (a mixed alkanes solvent available from ExxonMobil, Inc.) are passed through 2 columns, the first containing A2 alumina, and the second containing Q5 reactant (available from Engelhard Chemicals Inc.). Ethylene gas is passed through 2 columns, the first containing A204 alumina and activated 4A° molecular sieves, the second containing Q5 reactant. Hydrogen gas is passed through Q5 reactant and A2 alumina. Nitrogen gas is passed through a single column containing A204 alumna, activated 4A° molecular sieves and Q5 reactant. Catalyst and cocatalyst (also called the activator) solutions are handled in a nitrogen-filled glovebox.

The load column is filled with Isopar-E and 1-octene to the load setpoints by use of an Ashcroft differential pressure cell, and the material is transferred into the reactor following (at least) a wash. Hydrogen (as specified) is loaded into the reactor, via a shot tank with an internal volume of approximately 75 mL, immediately following the solvent/comonomer addition. The reactor is then heated up to the polymerization temperature setpoint. Subsequently, MMAO-3A (10 µmol) and diethyl zinc (DEZ, as specified) solutions are added to the reactor via the shot tank once the reactor is within 25 degrees of the reaction temperature setpoint. Next, ethylene is added to the specified pressure as monitored via a micro-motion flow meter. Finally, dilute toluene solutions of catalyst and cocatalyst (as specified) are mixed, transferred to the shot tank, and added to the reactor to begin the polymerization reaction. The combined catalyst solution is then added to the reactor. The polymerization conditions are typically maintained for 10 min with supplemental ethylene added on demand to maintain the specified pressure. Exothermic heat is continuously removed from the reaction vessel via the internal cooling coil. The resulting solution is removed from the reactor and stabilized by addition of 5 mL of a toluene solution containing approximately 6.7 g of a hindered phenol antioxidant (Irganox 1010 from Ciba Geigy Corp.) and 13.3 g of a phosphorus stabilizer (Irgafos 1680 from Ciba Geigy Corp.). Polymers are recovered by drying in a hood overnight and then are run for 12 h in a temperature-ramped vacuum oven with a final set point of 140° C. Between polymerization runs, a wash cycle is conducted in which Isopar-E (850 g) is added and the reactor is heated to at least 160° C. The reactor is then emptied of the heated solvent immediately before beginning a new polymerization run.

TABLE 1

| Run | Reactor Temp. (° C.) | Solvent (g) | Octene (g) | DH2 (psi) | Pressure (psi) | Run time (min) |
|---|---|---|---|---|---|---|
| 1 | 120 | 555 | 56 | 0 | 100 | 10 |
| 2 | 150 | 150 | 300 | 0 | 315 | 11 |
| 3 | 120 | 555 | 56 | 0 | 98 | 10 |
| 4 | 120 | 555 | 56 | 0 | 104 | 10 |
| 5 | 120 | 555 | 56 | 0 | 101 | 10 |
| 6 | 120 | 555 | 56 | 0 | 98 | 10 |

TABLE 1-continued

| Run | Reactor Temp. (° C.) | Solvent (g) | Octene (g) | DH2 (psi) | Pressure (psi) | Run time (min) |
|---|---|---|---|---|---|---|
| 7 | 120 | 555 | 56 | 0 | 99 | 10 |
| 8 | 120 | 555 | 56 | 0 | 112 | 10 |
| 9 | 120 | 555 | 56 | 0 | 116 | 10 |
| 10 | 120 | 555 | 56 | 0 | 113 | 10 |
| 11 | 120 | 555 | 56 | 0 | 112 | 10 |
| 12 | 120 | 555 | 56 | 0 | 112 | 10 |

TABLE 2

| Run | Procatalyst Type | Procatalyst µmol | Cocat. (µmol) | MMAO-3A (µmol) | CSA (µmol) | Exotherm (° C.) |
|---|---|---|---|---|---|---|
| 1 | (B1) | 10 | 12 | 10 | 0 | 3.7 |
| 2 | (B1) | 3 | 3.6 | 10 | 0 | 1.5 |
| 3 | (A4) | 0.1 | 0.12 | 10 | 0 | 0.9 |
| 4 | (A1) | 2 | 2.4 | 10 | 0 | 3.4 |
| 5 | (A4) + (B1) | 0.1/1 | 1.32 | 10 | 0 | 1.4 |
| 6 | (A4) + (B1) | 0.1/2 | 2.52 | 10 | 0 | 1.8 |
| 7 | (A1) + (B1) | 1/10 | 13.2 | 10 | 0 | 4.8 |
| 8 | (B1) | 10 | 12 | 10 | 0 | 3.7 |
| 9 | (A1) | 2 | 2.4 | 10 | 0 | 4.1 |
| 10 | (A1) + (B1) | 0.8/8 | 10.56 | 10 | 0 | 3.8 |
| 11 | (A1) + (B1) | 0.8/8 | 10.56 | 10 | 250 | 1.3 |
| 12 | (A1) + (B1) | 0.8/8 | 10.56 | 10 | 500 | 1.2 |

TABLE 3

| Run | Ethylene (g) initial | Ethylene (g) added | Yield (g) | Efficiency (gpoly/gMetal) | Tg (° C.) | Tm (° C.) | Mw | Mw/Mn | Octene (mol %) | Reactiv. Ratio |
|---|---|---|---|---|---|---|---|---|---|---|
| 1 | 11.1 | 5.5 | 11.8 | 26,248 | — | 109.7 | 82,006 | 3.2 | 4.0 | 57 |
| 2 | 42.6 | 2.2 | 8.3 | 61,542 | −47.3 | 113.7 | 162,976 | 2.5 | 4.8 | 105 |
| 3 | 11.1 | 1.9 | 18.4 | 1,030,870 | — | — | 1,179,232 | 3.38 | 28.3 | 5 |
| 4 | 11.1 | 4.9 | 31.9 | 89,361 | −67.5 | −24.4 | 592,552 | 6.71 | 30.1 | 5.5 |
| 5 | 11.2 | 2.8 | 15.5 | 313,438 | −63.8 | −15.8, 113.5 | 848,313 | 6.25 | 23.6 | — |
| 6 | 11.1 | 2.1 | 12.1 | 128,168 | −63.6 | −49.0, 13.0, 113.0 | 760,229 | 7.61 | 17.9 | — |
| 7 | 11.1 | 8.9 | 25.1 | 50,757 | −65.4 | −44.5, 112.9 | 522,933 | 13.03 | 18.2 | — |
| 8 | 12.6 | 9.2 | 12.2 | 27,355 | — | — | 130,076 | 3.02 | 3 | — |
| 9 | 12.8 | 11.9 | 22.2 | 90,201 | — | — | 813,467 | 8.52 | 24.1 | — |
| 10 | 12.1 | 10.3 | 16.7 | 33,236 | — | — | 499,062 | 8.95 | 10.7 | — |
| 11 | 9.0 | 6.4 | 12.1 | 24,081 | — | — | 54,384 | 4.03 | 11.9 | — |
| 12 | 9.4 | 6.9 | 12.0 | 23,882 | — | — | 23,718 | 3.03 | 10.1 | — |

Controls for each individual procatalyst are shown in Runs 1-4. In the absence of a chain shuttling agent, the procatalysts are compatible and produce polymer blends, as indicated by the data of Table 3, Runs 5-7. These batch reactor results suggest that the procatalyst pair of (A4) and (B1) or (A1) and (B1) may be able to produce OBCs under the right conditions.

Figure 2:
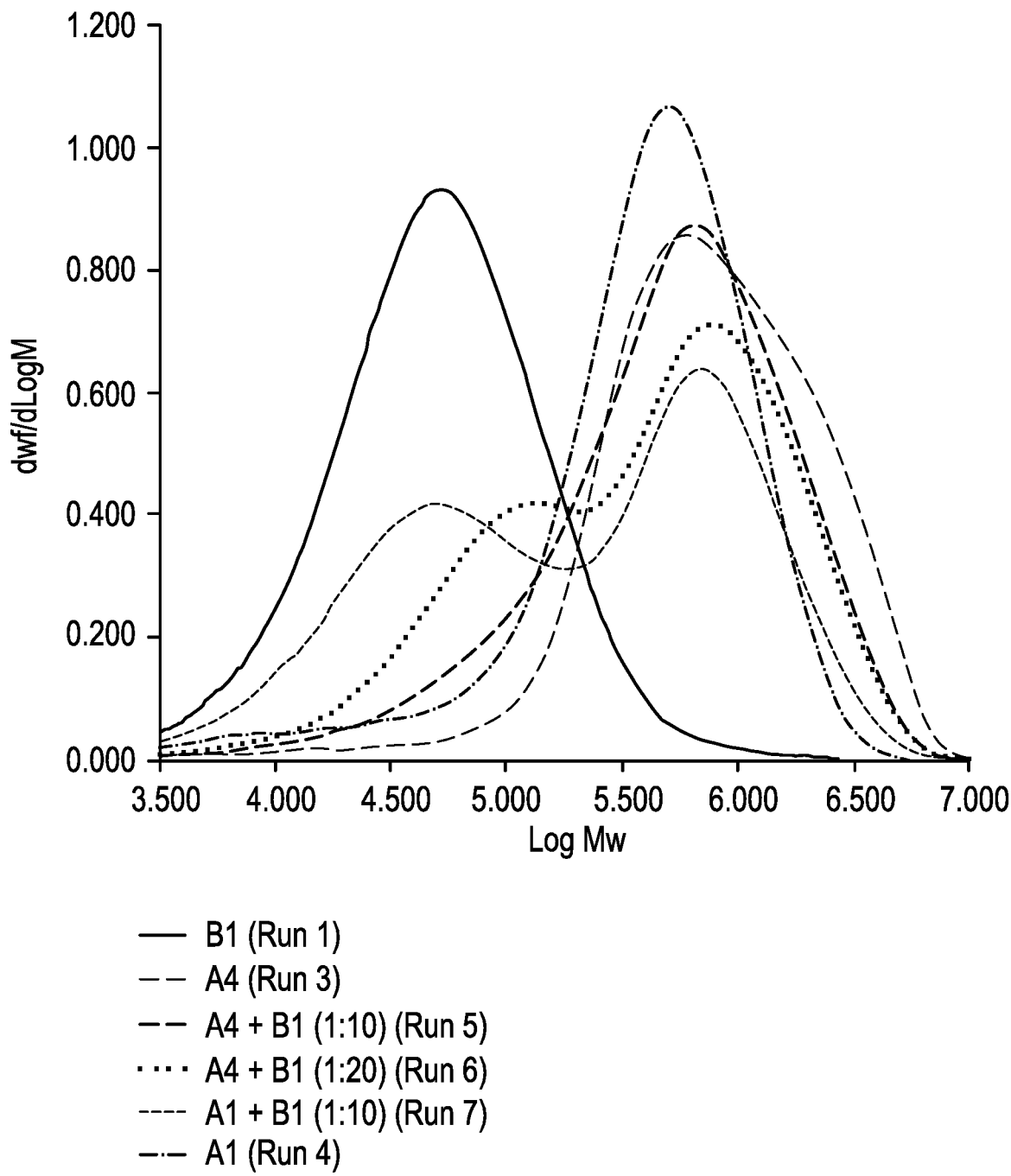

In addition, as seen in FIG. 2, the GPC trace of Run 1 shows the molecular weight distribution of the polymer produced by B1 as a single catalyst, the GPC trace of Run 3 shows the molecular weight distribution of the polymer produced by A4 as a single catalyst, and the GPC trace of Run 4 shows the molecular weight distribution of the polymer produced by A1 as a single catalyst. The GPC trace of Run 6, in which both B1 and A4 were introduced into reactor without diethyl zinc, is bimodal, showing molecular weight contributions from both B1 and A4. The GPC trace of Run 7, in which both B1 and A1 were introduced into reactor without diethyl zinc, is bimodal, showing molecular weight contributions from both B1 and A1. Accordingly, FIG. 2 provides evidence that the procatalyst pair of (A1) and (B1) or (A4) and (B1) may be able to produce OBC's at elevated reactor temperatures.

As shown in Table 3 Runs 1-2, (B1) is a low comonomer incorporator with a reactivity ratio of 57 (at 120° C.) or 105 (at 150° C.). Table 3, Run 4 shows that at 120° C., (A1) is a high comonomer incorporator with a reactivity ratio of 5.5. Table 3, Run 3 shows that at 120° C., (A4) is a high comonomer incorporator with a reactivity ratio of 5. Thus, the ratio of the reactivity ratios ($r_{1A}/r_{1B}$) at 120° C. for B1 and A1 (and for B1 and A4) is less than 0.5.

Furthermore, as seen in FIG. 3, the GPC trace from Runs 11 & 12, in which both B1 and A1 were introduced into a reactor with diethyl zinc, is monomodal with a narrower polydispersity index, indicative of a single molecular weight distribution comprised of polymer chains that transferred between both catalyst sites as is required for chain shuttling.

Specific Embodiments

The following are exemplary, non-limiting embodiments of the present disclosure and combinations thereof.

1. A composition comprising an admixture or reaction product resulting from combining:
(A) a first olefin polymerization procatalyst,
(B) a second olefin polymerization procatalyst, and
(C) a chain shuttling agent,
wherein the second olefin polymerization procatalyst comprises a metal-ligand complex of Formula (I):

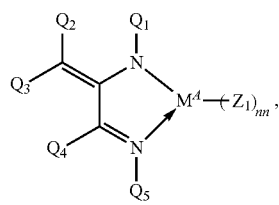

(I)

wherein:
each Z1 independently is $(C_1-C_{40})$hydrocarbon, $(C_1-C_{40})$heterohydrocarbon, $(C_1-C_{40})$hydrocarbyl, $(C_1-C_{40})$heterohydrocarbyl, $Si(R^{C1})_3$, $Ge(R^{C1})_3$, $P(R^{C1})_2$, $N(R^{C1})_2$, $OR^{C1}$, $SR^{C1}$, CN, $CF_3$, $R^{C1}S(O)-$, $R^{C1}S(O)_2-$, $(R^{C1})_2C=N-$, $R^{C1}C(O)O-$, $R^{C1}OC(O)-$, $R^{C1}C(O)N(R)-$, $(R^{C1})_2NC(O)-$, halogen atom, or hydrogen atom;

each $R^{C1}$ independently is $(C_1-C_{30})$hydrocarbyl or $(C_1-C_{30})$heterohydrocarbyl;

each $M^A$ independently is a metal of any one of Groups 3 to 6 or Groups 7 to 9 of a Periodic Table of the Elements, the metal being in a formal oxidation state of +2, +3, +4, +5, or +6;

nn is an integer of 1 or 2;

each $Q^1$ independently is hydrogen, $(C_1-C_{40})$hydrocarbyl, or $(C_1-C_{40})$heterohydrocarbyl;

each of $Q^2$, $Q^3$, and $Q^4$ independently is hydrogen, $(C_1-C_{40})$hydrocarbyl, $(C_1-C_{40})$hydrocarbylO—, $(C_1-C_{40})$hydrocarbylS—, $(C_1-C_{40})$hydrocarbylS(O)—, $(C_1-C_{40})$hydrocarbylS(O)$_2$—, $((C_1-C_{40})$hydrocarbyl$)_2$N—, $((C_1-C_{40})$hydrocarbyl$)_2$P—, or $(C_1-C_{40})$heterohydrocarbyl;

each $Q^5$ independently is $(C_1-C_{40})$hydrocarbyl or $(C_1-C_{40})$heterohydrocarbyl;

wherein $Q^1$ and $Q^2$, $Q^2$ and $Q^3$, $Q^3$ and $Q^4$, and $Q^4$ and $Q^5$ optionally are taken together to form a $(C_1-C_{40})$hydrocarbylene or $(C_1-C_{40})$heterohydrocarbylene, or any three or four of $Q^1$ to $Q^5$ optionally are taken together to form a respective trivalent or tetravalent analog of $(C_1-C_{40})$hydrocarbylene or $(C_1-C_{40})$heterohydrocarbylene, and the remainder of $Q^1$ to $Q^5$, are as defined above;

each of the hydrocarbyl, heterohydrocarbyl, $Si(R^{C1})_3$, $Ge(R^{C1})_3$, $P(R^{C1})_2$, $N(R^{C1})_2$, $OR^{C1}$, $SR^{C1}$, $R^{C1}S(O)-$, $R^{C1}S(O)_2-$, $(R^{C1})_2C=N-$, $R^{C1}C(O)O-$, $R^{C1}OC(O)-$, $R^{C1}C(O)N(R)-$, $(R^{C1})_2NC(O)-$, hydrocarbylene, and heterohydrocarbylene groups independently is unsubstituted or substituted with one or more $R^S$ substituents; and each $R^S$ independently is a halogen atom, polyfluoro substitution, perfluoro substitution, unsubstituted $(C_1-C_{18})$ alkyl, $F_3C-$, $FCH_2O-$, $F_2HCO-$, $F_3CO-$, oxo (i.e., =O), $R_3Si-$, $R_3Ge-$, $RO-$, $RS-$, $RS(O)-$, $RS(O)_2-$, $R_2P-$, $R_2N-$, $R_2C=N-$, $NC-$, $RC(O)O-$, $ROC(O)-$, $RC(O)N(R)-$, or $R_2NC(O)-$, or two of the $R^S$ are taken together to form an unsubstituted $(C_1-C_{18})$alkylene, wherein each R independently is an unsubstituted $(C_1-C_{18})$alkyl; and optionally, $R^{C1}$ or $R^S$ may have an additional interaction with $M^A$.

2. The composition of embodiment 1, further comprising (D) an activator.

3. The composition of any of the preceding embodiments, wherein $M^A$ is a metal of any of Groups 3 to 6.

4. The composition of any of the preceding embodiments, wherein $M^A$ is a metal of Group 3 or Lanthanide.

5. The composition of any of the preceding embodiments, wherein $M^A$ is scandium.

6. The composition of any of the preceding embodiments, wherein Z1 is $(C_1-C_{40})$hydrocarbyl, $(C_1-C_{40})$heterohydrocarbyl, $Si(R^{C1})_3$, or a hydrido group.

7. The composition of any of the preceding embodiments, wherein Z1 is a substituted benzyl or substituted heteroarylbenzyl.

8. The composition of any of the preceding embodiments, wherein Z1 is selected from the group consisting of:

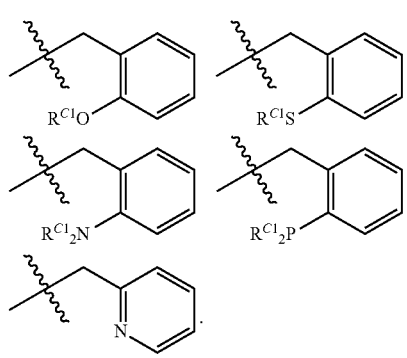

9. The composition of any of the preceding embodiments, wherein the metal-ligand complex of Formula (I) is selected from the group consisting of:

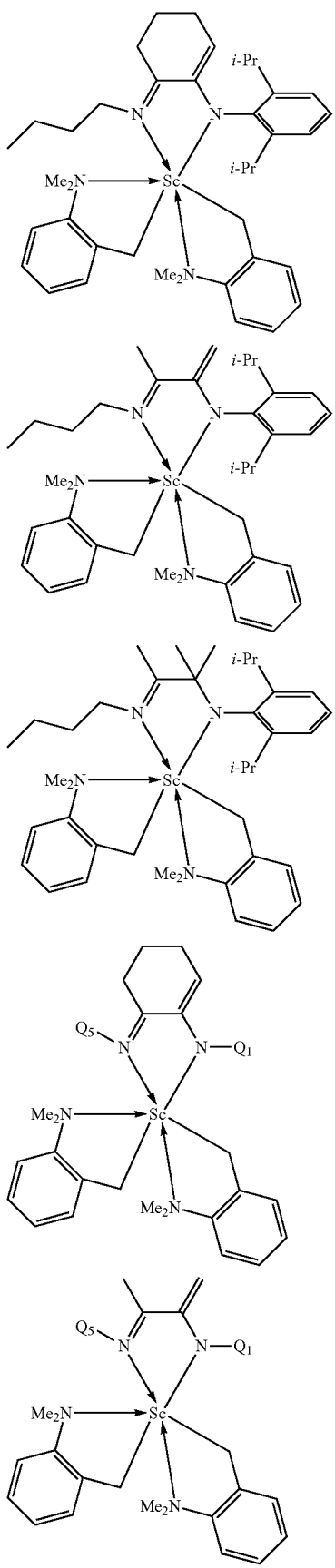

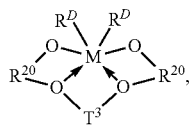

10. The composition of any of the preceding embodiments, wherein the first olefin polymerization procatalyst (A) and the second olefin polymerization procatalyst (B) have respective reactivity ratios $r_{1A}$ and $r_{1B}$, such that the ratio $(r_{1A}/r_{1B})$ under polymerization conditions is 0.5 or less.

11. The composition of any of the preceding embodiments, wherein the first olefin polymerization procatalyst (A) comprises a metal-ligand complex of Formula (II):

(II)

$$\underset{R^{20}-O\diagup\underset{T^3}{\overset{R^D\;R^D}{\overset{|}{M}}}\diagdown O-R^{20}}{}$$

wherein:

M is zirconium or hafnium;

$R^{20}$ independently at each occurrence is a divalent aromatic or inertly substituted aromatic group containing from 5 to 20 atoms not counting hydrogen;

$T^3$ is a divalent hydrocarbon or silane group having from 3 to 20 atoms not counting hydrogen, or an inertly substituted derivative thereof; and $R^D$ independently at each occurrence is a monovalent ligand group of from 1 to 20 atoms, not counting hydrogen, or two $R^D$ groups together are a divalent ligand group of from 1 to 20 atoms, not counting hydrogen.

12. The composition of any of the preceding embodiments, wherein said metal-ligand complex of Formula (III) has the following structure:

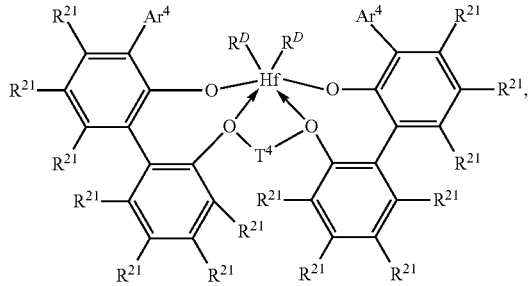

wherein:

$Ar^4$ independently at each occurrence is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;

T⁴ independently at each occurrence is a propylene-1,3-diyl group, a bis(alkylene)cyclohexan-1,2-diyl group, or an inertly substituted derivative thereof substituted with from 1 to 5 alkyl, aryl or aralkyl substituents having up to 20 carbons each;

$R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen; and $R^D$, independently at each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

13. The composition of any of the preceding embodiments, wherein said metal-ligand complex of Formula (III) has the following structure:

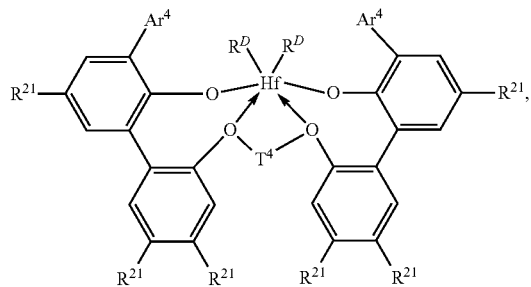

wherein, $Ar^4$ independently at each occurrence, is 3,5-di(isopropyl)phenyl, 3,5-di(isobutyl)phenyl, dibenzo-1H-pyrrole-1-yl, or anthracen-5-yl, $R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen;

$T^4$ is propan-1,3-diyl or bis(methylene)cyclohexan-1,2-diyl; and $R^D$, independently at each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

14. The composition of any of the preceding embodiments, wherein said metal-ligand complex of Formula (III) is selected from the group consisting of:

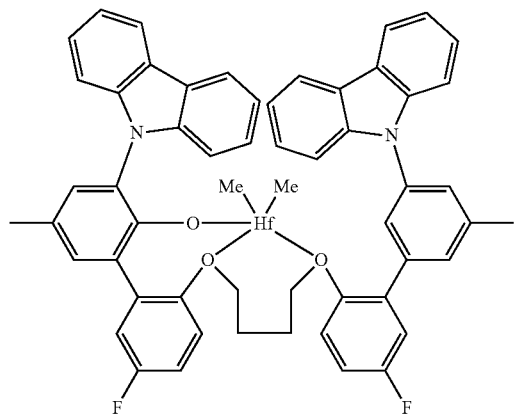

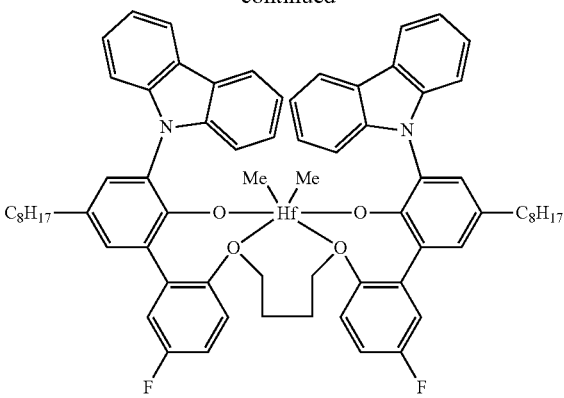

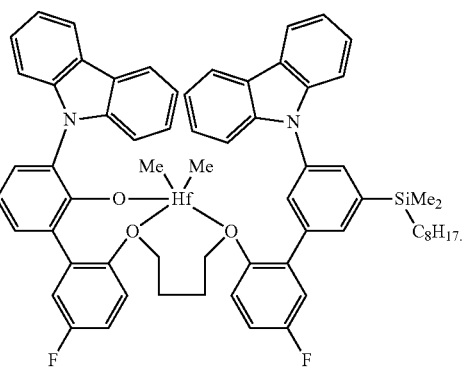

15. The composition of any of embodiments 1-10, wherein the first olefin polymerization procatalyst (A) has the following structure:

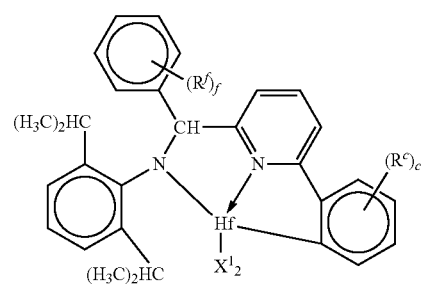

wherein $X^1$ at each occurrence is halide, N,N-dimethylamido, or $C_{1-4}$ alkyl, and preferably at each occurrence $X^1$ is methyl;

$R^f$ independently at each occurrence is hydrogen, halogen, C1-20 alkyl, or C6-20 aryl, or two adjacent $R^f$ groups are joined together thereby forming a ring, and f is 1-5; and $R^c$ independently at each occurrence is hydrogen, halogen, $C_{1-20}$ alkyl, or $C_{6-20}$ aryl, or two adjacent $R^c$ groups are joined together thereby forming a ring, and c is 1-5.

16. The composition of embodiment 15, wherein the first olefin polymerization procatalyst (A) has the following structure:

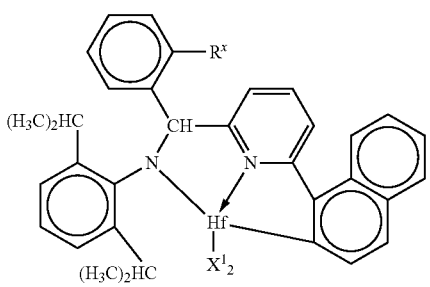

wherein $R^x$ is C1-4 alkyl or cycloalkyl, preferably methyl, isopropyl, t-butyl or cyclohexyl; and $X^1$ at each occurrence is halide, N,N-dimethylamido, or C1-4 alkyl, preferably methyl.

17. The composition of embodiment 16, wherein the first olefin polymerization procatalyst (A) has the following structure:

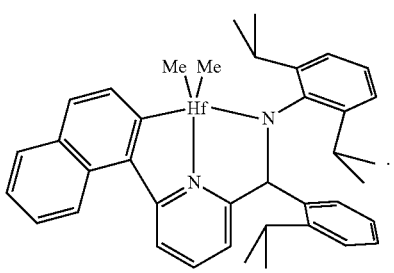

18. The composition of any of the preceding embodiments, wherein the chain shuttling agent is an aluminum, zinc, or gallium compound containing at least one hydrocarbyl substituent having from 1 to 12 carbons.

19. An olefin polymerization catalyst system comprising:
(A) a first olefin polymerization procatalyst,
(B) a second olefin polymerization procatalyst, and
(C) a chain shuttling agent,
wherein the second olefin polymerization procatalyst comprises a metal-ligand complex of Formula (I):

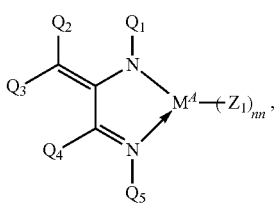

wherein:
each $Z1$ independently is $(C_1-C_{40})$hydrocarbon, $(C_1-C_{40})$heterohydrocarbon, $(C_1-C_{40})$hydrocarbyl, $(C_1-C_{40})$heterohydrocarbyl, $Si(R^{C1})_3$, $Ge(R^{C1})_3$, $P(R^{C1})_2$, $N(R^{C1})_2$, $OR^{C1}$, $SR^{C1}$, CN, $CF_3$, $R^{C1}S(O)$—, $R^{C1}S(O)_2$—, $(R^{C1})_2C$=N—, $R^{C1}C(O)O$—, $R^{C1}OC(O)$—, $R^{C1}C(O)N(R)$—, $(R^{C1})_2NC(O)$—, halogen atom, or hydrogen atom;

each $R^{C1}$ independently is $(C_1-C_{30})$hydrocarbyl or $(C_1-C_{30})$heterohydrocarbyl;

each $M^A$ independently is a metal of any one of Groups 3 to 6 or Groups 7 to 9 of a Periodic Table of the Elements, the metal being in a formal oxidation state of +2, +3, +4, +5, or +6;

nn is an integer of 1 or 2;

each $Q^1$ independently is hydrogen, $(C_1-C_{40})$hydrocarbyl, or $(C_1-C_{40})$heterohydrocarbyl;

each of $Q^2$, $Q^3$, and $Q^4$ independently is hydrogen, $(C_1-C_{40})$hydrocarbyl, $(C_1-C_{40})$hydrocarbylO—, $(C_1-C_{40})$hydrocarbylS—, $(C_1-C_{40})$hydrocarbylS(O)—, $(C_1-C_{40})$hydrocarbylS(O)_2$—, $((C_1-C_{40})$hydrocarbyl$)_2$N—, $((C_1-C_{40})$hydrocarbyl$)_2$P—, or $(C_1-C_{40})$heterohydrocarbyl;

each $Q^5$ independently is $(C_1-C_{40})$hydrocarbyl or $(C_1-C_{40})$heterohydrocarbyl;

wherein $Q^1$ and $Q^2$, $Q^2$ and $Q^3$, $Q^3$ and $Q^4$, and $Q^4$ and $Q^5$ optionally are taken together to form a $(C_1-C_{40})$hydrocarbylene or $(C_1-C_{40})$heterohydrocarbylene, or any three or four of $Q^1$ to $Q^5$ optionally are taken together to form a respective trivalent or tetravalent analog of $(C_1-C_{40})$hydrocarbylene or $(C_1-C_{40})$heterohydrocarbylene, and the remainder of $Q^1$ to $Q^5$, are as defined above;

each of the hydrocarbyl, heterohydrocarbyl, $Si(R^{C1})_3$, $Ge(R^{C1})_3$, $P(R^{C1})_2$, $N(R^{C1})_2$, $OR^{C1}$, $SR^{C1}$, $R^{C1}S(O)$—, $R^{C1}S(O)_2$—, $(R^{C1})_2C$=N—, $R^{C1}C(O)O$—, $R^{C1}OC(O)$—, $R^{C1}C(O)N(R)$—, $(R^{C1})_2NC(O)$—, hydrocarbylene, and heterohydrocarbylene groups independently is unsubstituted or substituted with one or more $R^S$ substituents; and each $R^S$ independently is a halogen atom, polyfluoro substitution, perfluoro substitution, unsubstituted $(C_1-C_{18})$alkyl, $F_3C$—, $FCH_2O$—, $F_2HCO$—, $F_3CO$—, oxo (i.e., =O), $R_3Si$—, $R_3Ge$—, RO—, RS—, RS(O)—, $RS(O)_2$—, $R_2P$—, $R_2N$—, $R_2C$=N—, NC—, RC(O)O—, ROC(O)—, RC(O)N(R)—, or $R_2NC(O)$—, or two of the $R^S$ are taken together to form an unsubstituted $(C_1-C_{18})$alkylene, wherein each R independently is an unsubstituted $(C_1-C_{18})$alkyl; and optionally, $R^{C1}$ or $R^S$ may have an additional interaction with $M^A$.

20. The catalyst system of embodiment 19, further comprising (D) an activator.

21. The catalyst system of embodiment 19 or 20, wherein $M^A$ is a metal of any of Groups 3 to 6.

22. The catalyst system of any of embodiments 19-21, wherein $M^A$ is a metal of Group 3.

23. The catalyst system of any of embodiments 19-22, wherein $M^A$ is scandium.

24. The catalyst system of any of embodiments 19-23, wherein Z1 is $(C_1-C_{40})$hydrocarbyl, $(C_1-C_{40})$heterohydrocarbyl, $Si(R^{C1})_3$, or a hydrido group.

25. The catalyst system of any of embodiments 19-24, wherein Z1 is a substituted benzyl or substituted heteroarylbenzyl.

26. The catalyst system of any of embodiments 19-25, wherein Z1 is selected from the group consisting of:

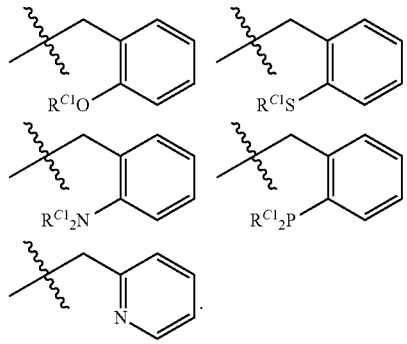

27. The catalyst system of any of embodiments 19-26, wherein the metal-ligand complex of Formula (I) is selected from the group consisting of:

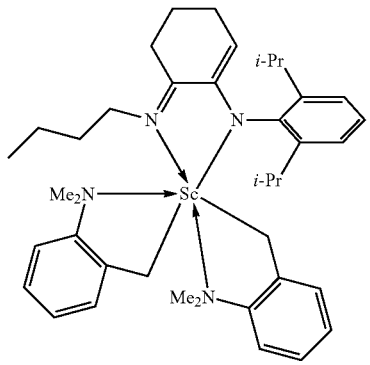

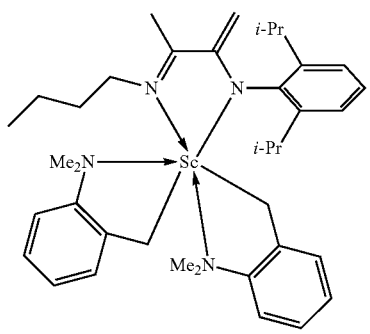

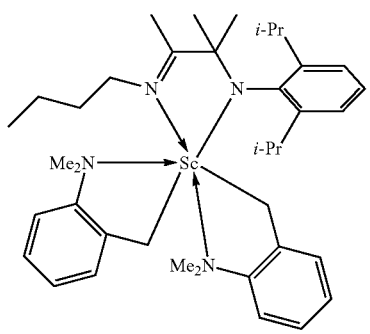

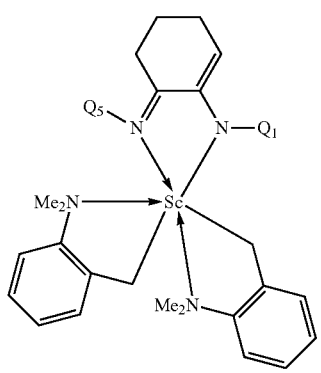

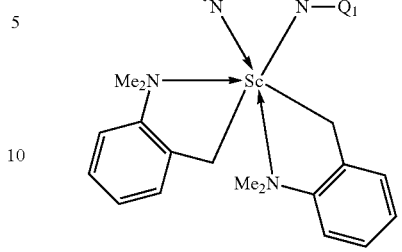

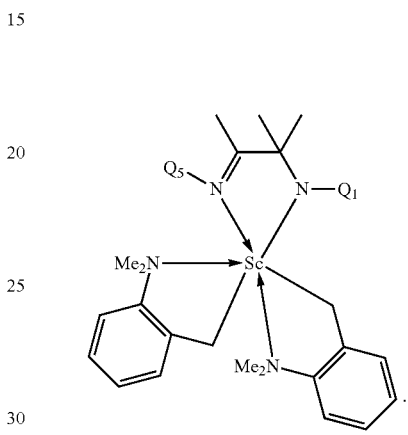

28. The catalyst system of any of embodiments 19-27, wherein the first olefin polymerization procatalyst (A) and the second olefin polymerization procatalyst (B) have respective reactivity ratios $r_{1A}$ and $r_{1B}$, such that the ratio $(r_{1A}/r_{1B})$ under polymerization conditions is 0.5 or less.

29. The catalyst system of any of embodiments 19-28, wherein the first olefin polymerization procatalyst (A) comprises a metal-ligand complex of Formula (II):

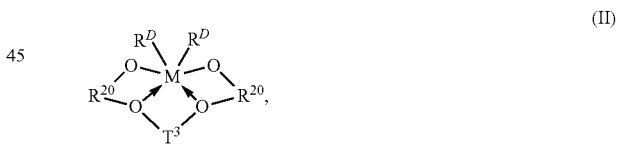

(II)

wherein:

M is zirconium or hafnium;

$R^{20}$ independently at each occurrence is a divalent aromatic or inertly substituted aromatic group containing from 5 to 20 atoms not counting hydrogen;

$T^3$ is a divalent hydrocarbon or silane group having from 3 to 20 atoms not counting hydrogen, or an inertly substituted derivative thereof; and $R^D$ independently at each occurrence is a monovalent ligand group of from 1 to 20 atoms, not counting hydrogen, or two $R^D$ groups together are a divalent ligand group of from 1 to 20 atoms, not counting hydrogen.

30. The catalyst system of any of the embodiments 19-29, wherein said metal-ligand complex of Formula (III) has the following structure:

103

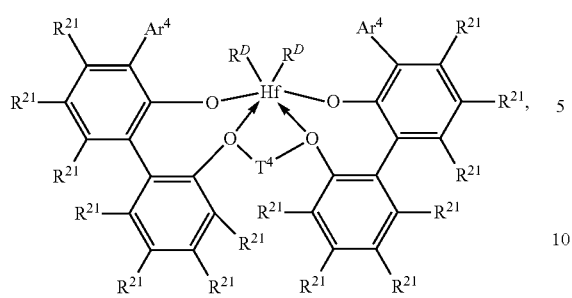

wherein:

Ar⁴ independently at each occurrence is $C_{6-20}$ aryl or inertly substituted derivatives thereof, especially 3,5-di(isopropyl)phenyl, 3,5-di(isobutyl)phenyl, dibenzo-1H-pyrrole-1-yl, naphthyl, anthracen-5-yl, 1,2,3,4,6,7,8,9-octahydroanthracen-5-yl;

$T^4$ independently at each occurrence is a propylene-1,3-diyl group, a bis(alkylene)cyclohexan-1,2-diyl group, or an inertly substituted derivative thereof substituted with from 1 to 5 alkyl, aryl or aralkyl substituents having up to 20 carbons each;

$R^{21}$ independently at each occurrence is hydrogen, halo, hydrocarbyl, trihydrocarbylsilyl, trihydrocarbylsilylhydocarbyl, alkoxy or amino of up to 50 atoms not counting hydrogen; and $R^D$, independently at each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

31. The catalyst system of any of embodiments 19-30, wherein said metal-ligand complex of Formula (III) has the following structure:

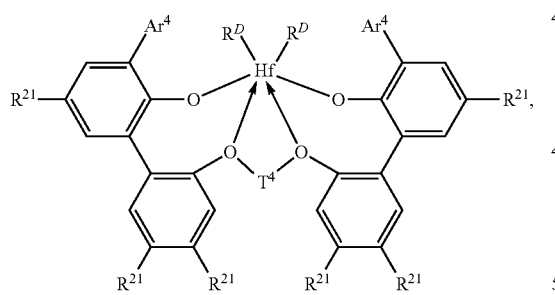

wherein,

Ar⁴ independently at each occurrence, is 3,5-di(isopropyl)phenyl, 3,5-di(isobutyl)phenyl, dibenzo-1H-pyrrole-1-yl, or anthracen-5-yl, $R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen;

$T^4$ is propan-1,3-diyl or bis(methylene)cyclohexan-1,2-diyl; and $R^D$, independently at each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

104

32. The catalyst system of any of embodiments 19-31, wherein said metal-ligand complex of Formula (III) is selected from the group consisting of:

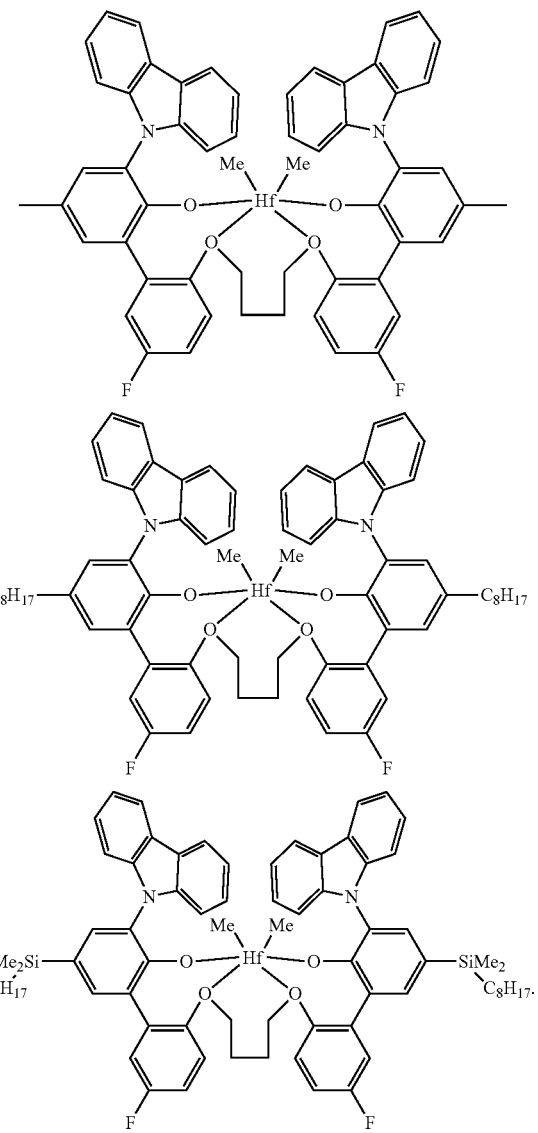

33. The catalyst system of any of embodiments 19-28, wherein the first olefin polymerization procatalyst (A) has the following structure:

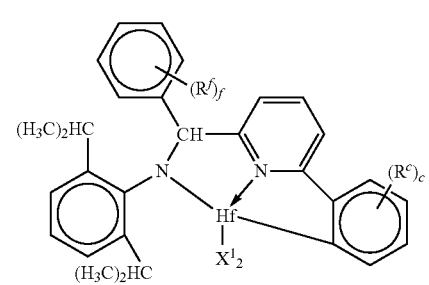

wherein $X^1$ at each occurrence is halide, N,N-dimethylamido, or $C_{1-4}$ alkyl, and preferably at each occurrence $X^1$ is methyl;

$R^f$ independently at each occurrence is hydrogen, halogen, C1-20 alkyl, or C6-20 aryl, or two adjacent $R^f$ groups are joined together thereby forming a ring, and f is 1-5; and $R^c$ independently at each occurrence is hydrogen, halogen, $C_{1-20}$ alkyl, or $C_{6-20}$ aryl, or two adjacent R groups are joined together thereby forming a ring, and c is 1-5.

34. The catalyst system of any of embodiments 19-28, wherein the first olefin polymerization procatalyst (A) has the following structure:

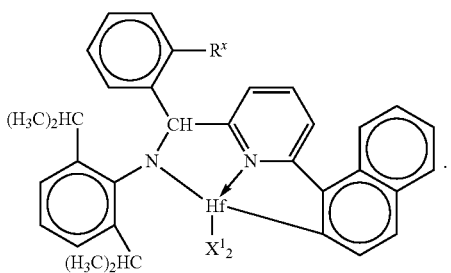

wherein $R^x$ is C1-4 alkyl or cycloalkyl, preferably methyl, isopropyl, t-butyl or cyclohexyl; and $X^1$ at each occurrence is halide, N,N-dimethylamido, or C1-4 alkyl, preferably methyl.

35. The catalyst system of any of embodiments 19-28, wherein the first olefin polymerization procatalyst (A) has the following structure:

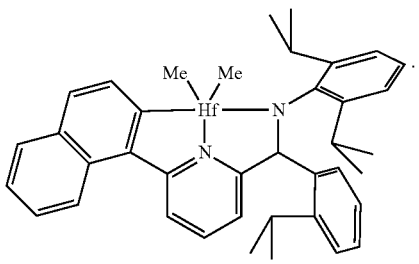

36. The catalyst system of any of embodiments 19-35, wherein the chain shuttling agent is an aluminum, zinc, or gallium compound containing at least one hydrocarbyl substituent having from 1 to 12 carbons.

37. A process for preparing a multi-block copolymer comprising contacting one or more addition polymerizable monomers under addition polymerization conditions with a composition according to any of embodiments 1-18 or an olefin polymerization catalyst system of embodiments 19-36.

38. A process for preparing a multi-block copolymer comprising contacting ethylene and at least one copolymerizable comonomer other than ethylene under addition polymerization conditions with a composition according to any of embodiments 1-18 or an olefin polymerization catalyst system of embodiments 19-36.

39. A process for preparing a multi-block copolymer comprising contacting ethylene and a C3-8 alpha-olefin under addition polymerization conditions with a composition according to any of embodiments 1-18 or an olefin polymerization catalyst system of embodiments 19-36.

40. The process according to any of embodiments 37-39, wherein the process is a continuous solution process.

41. The process of embodiment 40, wherein the process is carried out at a temperature of equal to or greater than 120° C.

42. A multi-block copolymer prepared by the process according to any of embodiments 37-41.

43. The multi-block copolymer of embodiment 42, wherein the multi-block copolymer comprises, in polymerized form, one or more addition polymerizable monomers, said copolymer containing therein two or more segments or blocks differing in comonomer content, crystallinity, tacticity, homogeneity, density, melting point or glass transition temperature.

44. A multi-block copolymer of embodiment 42, wherein the multi-block copolymer comprises, in polymerized form, ethylene and one or more copolymerizable comonomers, said copolymer containing therein two or more segments or blocks differing in comonomer content, crystallinity, tacticity, homogeneity, density, melting point or glass transition temperature.

45. A functionalized derivative of the multi-block copolymer of embodiment 42.

46. A multi-block copolymer of embodiment 42 comprising the same in the form of a film, at least one layer of a multilayer film, at least one layer of a laminated article, a foamed article, a fiber, a nonwoven fabric, an injection molded article, a blow molded article, a roto-molded article, or an adhesive.

The invention claimed is:
1. An olefin polymerization catalyst system comprising:
(A) a first olefin polymerization procatalyst,
(B) a second olefin polymerization procatalyst, and
(C) a chain shuttling agent,
wherein the second olefin polymerization procatalyst (B) comprises a metal-ligand complex of Formula (I):

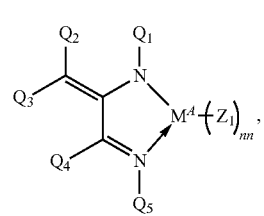

(I)

wherein:
each Z1 independently is $(C_1-C_{40})$hydrocarbon, $(C_1-C_{40})$ heterohydrocarbon, $(C_1-C_{40})$hydrocarbyl, $(C_1-C_{40})$heterohydrocarbyl, $Si(R^{C1})_3$, $Ge(R^{C1})_3$, $P(R^{C1})_2$, $N(R^{C1})_2$, $OR^{C1}$, $SR^{C1}$, CN, $CF_3$, $R^{C1}S(O)$—, $R^{C1}S(O)_2$—, $(R^{C1})_2 C=N$—, $R^{C1}C(O)O$—, $R^{C1}OC(O)$—, $R^{C1}C(O)$ N(R)—, $(R^{C1})_2NC(O)$—, halogen atom, or hydrogen atom;

each $R^{C1}$ independently is $(C_1-C_{30})$hydrocarbyl or $(C_1-C_{30})$heterohydrocarbyl;

each $M^A$ independently is a metal of Group 3 of a Periodic Table of the Elements, the metal being in a formal oxidation state of +2 or +3;

nn is an integer of 1 or 2;

each $Q^1$ independently is hydrogen, $(C_1-C_{40})$hydrocarbyl, or $(C_1-C_{40})$heterohydrocarbyl;

each of $Q^2$, $Q^3$, and $Q^4$ independently is hydrogen, $(C_1-C_{40})$hydrocarbyl, $(C_1-C_{40})$hydrocarbylO—, $(C_1-C_{40})$ hydrocarbylS—, $(C_1-C_{40})$hydrocarbylS(O)—, $(C_1-$ $C_{40}$)hydrocarbylS(O)$_2$—, ((C$_1$-C$_{40}$)hydrocarbyl)$_2$N—, ((C$_1$-C$_{40}$)hydrocarbyl)$_2$P—, or (C$_1$-C$_{40}$)heterohydrocarbyl;

each Q$^5$ independently is (C$_1$-C$_{40}$)hydrocarbyl or (C$_1$-C$_{40}$)heterohydrocarbyl;

wherein Q$^1$ and Q$^2$, Q$^2$ and Q$^3$, Q$^3$ and Q$^4$, and Q$^4$ and Q$^5$ optionally are taken together to form a (C$_1$-C$_{40}$)hydrocarbylene or (C$_1$-C$_{40}$)heterohydrocarbylene, or any three or four of Q$^1$ to Q$^5$ optionally are taken together to form a respective trivalent or tetravalent analog of (C$_1$-C$_{40}$)hydrocarbylene or (C$_1$-C$_{40}$)heterohydrocarbylene, and the remainder of Q$^1$ to Q$^5$, are as defined above;

each of the (C$_1$-C$_{40}$)hydrocarbyl, (C$_1$-C$_{40}$)heterohydrocarbyl, Si(R$^{C1}$)$_3$, Ge(R$^{C1}$)$_3$, P(R$^{C1}$)$_2$, N(R$^{C1}$)$_2$, OR$^{C1}$, SR$^{C1}$, R$^{C1}$S(O)—, R$^{C1}$S(O)$_2$—, (R$^{C1}$)$_2$C=N—, R$^{C1}$C(O)O—, R$^{C1}$OC(O)—, R$^{C1}$C(O)N(R)—, (R$^{C1}$)$_2$NC(O)—, (C$_1$-C$_{40}$)hydrocarbylene, and (C$_1$-C$_{40}$)heterohydrocarbylene groups independently is unsubstituted or substituted with one or more R$^S$ substituents; and each R$^S$ independently is a halogen atom, polyfluoroalkyl, perfluoroalkyl, polyfluoroaryl, perfluoroaryl, unsubstituted (C$_1$-C$_{18}$)alkyl, F$_3$C—, FCH$_2$O—, F$_2$HCO—, F$_3$CO—, oxo (=O), R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, and two R$^S$ are optionally taken together to form an unsubstituted (C$_1$-C$_{18}$)alkylene, wherein each R independently is an unsubstituted (C$_1$-C$_{18}$) alkyl; and optionally, R$^{C1}$ or R$^S$ may have an additional interaction with M$^A$.

2. The olefin polymerization catalyst system of claim 1, further comprising (D) an activator.

3. The olefin polymerization catalyst system of claim 1, wherein M is a metal of any of Groups 3 to 6.

4. The olefin polymerization catalyst system of claim 1, wherein M$^A$ is a metal of Group 3.

5. The olefin polymerization catalyst system of claim 1, wherein M$^A$ is scandium.

6. The olefin polymerization catalyst system of claim 1, wherein Z1 is (C$_1$-C$_{40}$)hydrocarbyl, (C$_1$-C$_{40}$)heterohydrocarbyl, Si(R$^{C1}$)$_3$, or a hydrogen atom.

7. The olefin polymerization catalyst system of claim 1, wherein Z1 is substituted benzyl or substituted heteroarylbenzyl.

8. The olefin polymerization catalyst system of claim 1, wherein Z1 is selected from the group consisting of:

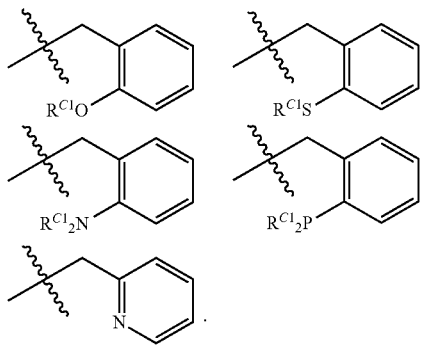

9. The olefin polymerization catalyst system of claim 1, wherein the metal-ligand complex of Formula (I) has the following structure:

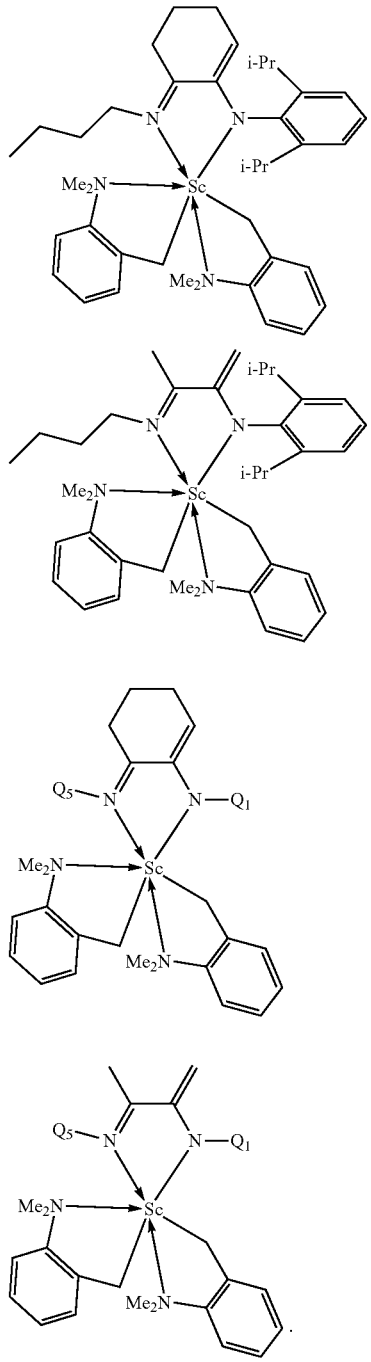

10. The olefin polymerization catalyst system of claim 1, wherein the first olefin polymerization procatalyst (A) and the second olefin polymerization procatalyst (B) have respective reactivity ratios $r_{1A}$ and $r_{1B}$, such that a ratio ($r_{1A}/r_{1B}$) under polymerization conditions is 0.5 or less.

11. The olefin polymerization catalyst system of claim 1, wherein the first olefin polymerization procatalyst (A) comprises a metal-ligand complex of Formula (II):

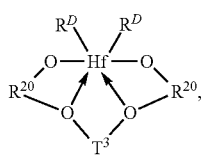
(II)

wherein:
M is zirconium or hafnium;
$R^{20}$ independently at each occurrence is a divalent aromatic or inertly substituted aromatic group containing from 5 to 20 atoms not counting hydrogen;
$T^3$ is a divalent hydrocarbon or silane group having from 3 to 20 atoms not counting hydrogen, or an inertly substituted derivative thereof; and
$R^D$ independently at each occurrence is a monovalent ligand group of from 1 to 20 atoms, not counting hydrogen, or two $R^D$ groups together are a divalent ligand group of from 1 to 20 atoms, not counting hydrogen.

12. The olefin polymerization catalyst system of claim 11, wherein said metal-ligand complex of Formula (II) has the following structure:

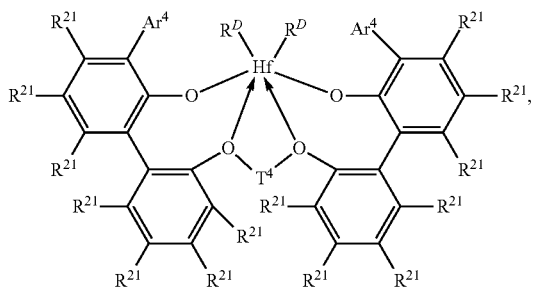

wherein:
$Ar^4$ independently at each occurrence is $C_{6-20}$ aryl or inertly substituted derivatives thereof;
$T^4$ independently at each occurrence is a propylene-1,3-diyl group, a bis(alkylene)cyclohexan-1,2-diyl group, or an inertly substituted derivative thereof substituted with from 1 to 5 alkyl, aryl or aralkyl substituents having up to 20 carbons each;
$R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen; and
$R^D$, independently at each occurrence is halo or a hydrocarbyl or trihydrocarbylsilyl group of up to 20 atoms not counting hydrogen, or 2 $R^D$ groups together are a divalent hydrocarbylene, hydrocarbadiyl or trihydrocarbylsilyl group of up to 40 atoms not counting hydrogen.

13. The olefin polymerization catalyst system of claim 11, wherein said metal-ligand complex of Formula (II) has the following structure:

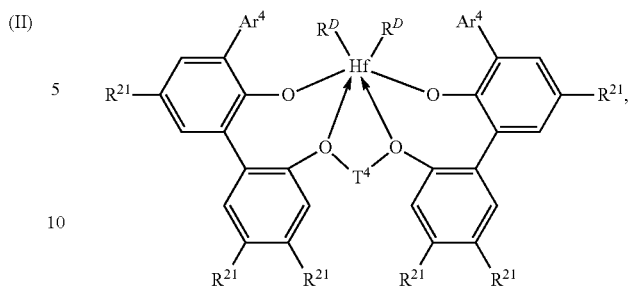

wherein,
$Ar^4$ independently at each occurrence, is 3,5-di(isopropyl)phenyl, 3,5-di(isobutyl)phenyl, dibenzo-1H-pyrrole-1-yl, or anthracen-5-yl,
$R^{21}$ independently at each occurrence is hydrogen, halo, hydrocarbyl, trihydrocarbylsilyl, trihydrocarbylsilylhydrocarbyl, alkoxy or amino of up to 50 atoms not counting hydrogen;
$T^4$ is propan-1,3-diyl or bis(methylene)cyclohexan-1,2-diyl; and
$R^D$, independently at each occurrence is halo or a hydrocarbyl or trihydrocarbylsilyl group of up to 20 atoms not counting hydrogen, or 2 $R^D$ groups together are a hydrocarbylene, hydrocarbadiyl or hydrocarbylsilanediyl group of up to 40 atoms not counting hydrogen.

14. The olefin polymerization catalyst system of claim 11, wherein said metal-ligand complex of Formula (II) is selected from the group consisting of:

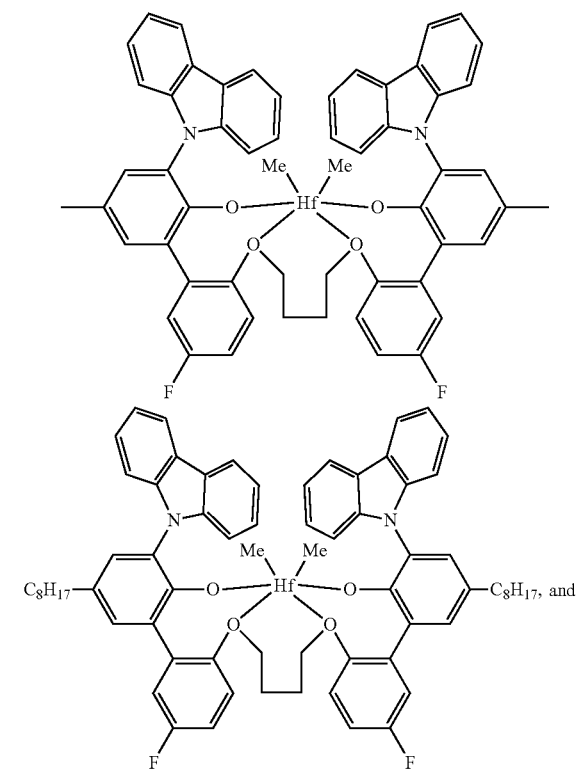

-continued

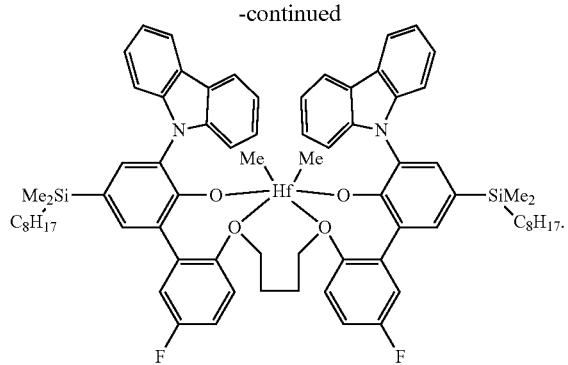

15. The olefin polymerization catalyst system of claim 1, wherein the first olefin polymerization procatalyst (A) has the following structure:

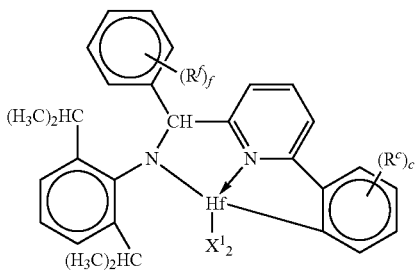

wherein $X^1$ at each occurrence is halide, N,N-dimethylamido, or $C_{1-4}$ alkyl;

$R^f$ independently at each occurrence is hydrogen, halogen, C1-20 alkyl, or C6-20 aryl, or two adjacent $R^f$ groups are joined together thereby forming a ring, and f is 1-5; and $R^c$ independently at each occurrence is hydrogen, halogen, $C_{1-20}$ alkyl, or $C_{6-20}$ aryl, or two adjacent $R^c$ groups are joined together thereby forming a ring, and c is 1-5.

16. The olefin polymerization catalyst system of claim 1, wherein the first olefin polymerization procatalyst (A) has the following structure:

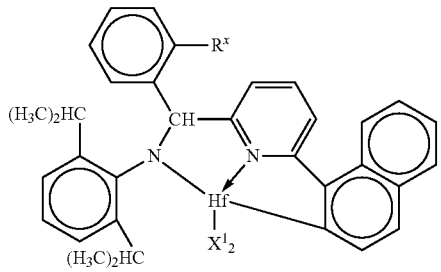

wherein $R^x$ is C1-4 alkyl or cycloalkyl; and $X^1$ at each occurrence is halide, N,N-dimethylamido, or C1-4 alkyl.

17. The olefin polymerization catalyst system of claim 1, wherein the first olefin polymerization procatalyst (A) has the following structure:

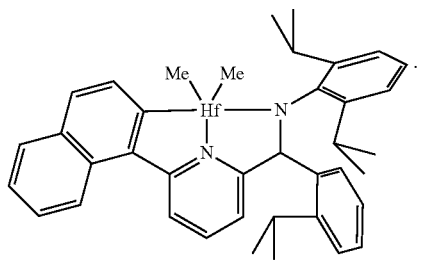

18. The olefin polymerization catalyst system of claim 1, wherein the chain shuttling agent is an aluminum, zinc, or gallium compound containing at least one hydrocarbyl substituent having from 1 to 12 carbons.

* * * * *

UNITED STATES PATENT AND TRADEMARK OFFICE
CERTIFICATE OF CORRECTION

| | | |
|---|---|---|
| PATENT NO. | : 11,208,502 B2 | Page 1 of 1 |
| APPLICATION NO. | : 16/494150 | |
| DATED | : December 28, 2021 | |
| INVENTOR(S) | : Patton et al. | |

It is certified that error appears in the above-identified patent and that said Letters Patent is hereby corrected as shown below:

On the Title Page

Item (54) and in the Specification, Column 1, Line 1, Delete:
"CATALYST SYSTEM FOR MULTI-BLOCK COPLOYMER FORMATION"
And insert:
--CATALYST SYSTEM FOR MULTI-BLOCK COPOLYMER FORMATION.--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*